(12) United States Patent
Chou et al.

(10) Patent No.: US 11,061,604 B2
(45) Date of Patent: Jul. 13, 2021

(54) METHOD AND STORAGE SYSTEM ARCHITECTURE FOR ACCESSING DATA BY MEANS OF A COMPATIBLE MODULE

(71) Applicant: Infortrend Technology, Inc., New Taipei (TW)

(72) Inventors: Ching-Hao Chou, New Taipei (TW); Michael Gordon Schnapp, New Taipei (TW); Ching-Hai Hung, New Taipei (TW)

(73) Assignee: Infortrend Technology, Inc., New Taipei (TW)

( * ) Notice: Subject to any disclaimer, the term of this patent is extended or adjusted under 35 U.S.C. 154(b) by 0 days.

(21) Appl. No.: 16/583,276

(22) Filed: Sep. 26, 2019

(65) Prior Publication Data

US 2020/0272354 A1 Aug. 27, 2020

Related U.S. Application Data

(60) Provisional application No. 62/737,926, filed on Sep. 28, 2018.

(51) Int. Cl.
*G06F 3/06* (2006.01)
*G06F 9/50* (2006.01)

(52) U.S. Cl.
CPC ............ *G06F 3/0653* (2013.01); *G06F 3/061* (2013.01); *G06F 3/064* (2013.01); *G06F 3/0607* (2013.01);
(Continued)

(58) Field of Classification Search
CPC ...... G06F 3/0607; G06F 3/061; G06F 3/0635; G06F 3/0655; G06F 3/0659; G06F 3/0689
See application file for complete search history.

(56) References Cited

U.S. PATENT DOCUMENTS 6,108,684 A * 8/2000 DeKoning .............. G06F 9/505
718/100
7,389,393 B1 * 6/2008 Karr ...................... G06F 3/0613
711/103
(Continued)

FOREIGN PATENT DOCUMENTS

CN 103984642 A 8/2014
TW 200627170 8/2006
(Continued)

*Primary Examiner* — Tracy A Warren
(74) *Attorney, Agent, or Firm* — Winston Hsu

(57) ABSTRACT

A data storage system architecture for accessing data, having a plurality of data storage subsystems coupling to a host for receiving an I/O request from the host, is provided. Each of the plurality of the data storage subsystems has: a redundant array of independent disks layer (RAID layer) for generating a plurality of media extents; a virtualization module for generating one or more virtual volumes (VVs); an on-board load balance (OBLB) module for offering a data access interface between the host and the data storage system architecture to parse the I/O request into at least one sub-I/O request; and a media extent server (ME server) module to receive the at least one sub-I/O request and to determine the validity of the at least one sub-I/O request. Accordingly, the host is able to issue I/O requests to any one of the data storage subsystems.

41 Claims, 30 Drawing Sheets

(52) U.S. Cl.
CPC .......... *G06F 3/0614* (2013.01); *G06F 3/0635* (2013.01); *G06F 3/0647* (2013.01); *G06F 3/0655* (2013.01); *G06F 3/0659* (2013.01); *G06F 3/0665* (2013.01); *G06F 3/0689* (2013.01); *G06F 9/505* (2013.01)

(56) References Cited

U.S. PATENT DOCUMENTS

| | | |
|---|---|---|
| 9,037,799 B2 | 5/2015 | Biswas |
| 9,489,293 B2 | 11/2016 | Kimmel |
| 2006/0015692 A1* | 1/2006 | Schnapp .............. G06F 11/2089 711/154 |
| 2010/0199040 A1* | 8/2010 | Schnapp ............... G06F 3/0605 711/114 |
| 2013/0318297 A1* | 11/2013 | Jibbe ....................... G06F 3/067 711/114 |
| 2019/0205031 A1* | 7/2019 | Shalev ................. G06F 3/0605 |

FOREIGN PATENT DOCUMENTS

| | | |
|---|---|---|
| TW | I467370 B | 1/2015 |
| TW | I475379 B | 3/2015 |

* cited by examiner

RA DLT0

| Data location table | | | | | | |
|---|---|---|---|---|---|---|
| Virtual address/Size → | | Physical address/Size | | | | |
| LBA | Size → | RAID ID | ME ID | LBA | Size | VCSN |
|  |  | → |  |  |  |  |

RB DLT0

| Data location table | | | | | | |
|---|---|---|---|---|---|---|
| Virtual address/Size → | | Physical address/Size | | | | |
| LBA | Size → | RAID ID | ME ID | LBA | Size | VCSN |
|  |  | → |  |  |  |  |

RC DLT0

| Data location table | | | | | | |
|---|---|---|---|---|---|---|
| Virtual address/Size → | | Physical address/Size | | | | |
| LBA | Size → | RAID ID | ME ID | LBA | Size | VCSN |
|  |  | → |  |  |  |  |

Fig. 19B

RA DLT0

| Data location table ||||||| 
|---|---|---|---|---|---|---|
| Virtual address/Size → | | Physical address/Size |||||
| LBA | Size | → RAID ID | ME ID | LBA | Size | VCSN |
|  |  | → |  |  |  |  |

RB DLT0

| Data location table ||||||| 
|---|---|---|---|---|---|---|
| Virtual address/Size → | | Physical address/Size |||||
| LBA | Size | → RAID ID | ME ID | LBA | Size | VCSN |
| 0 | 20000 | RB | ME22 | 20000 | 10000 | 11 |
|  |  | RC | ME32 | 10000 | 10000 | 02 |

RC DLT0

| Data location table ||||||| 
|---|---|---|---|---|---|---|
| Virtual address/Size → | | Physical address/Size |||||
| LBA | Size | → RAID ID | ME ID | LBA | Size | VCSN |
|  |  | → |  |  |  |  |

Fig. 19C

RA DLT0

Data location table

| Virtual address/Size → | | | Physical address/Size | | | |
|---|---|---|---|---|---|---|
| LBA | Size → | RAID ID | ME ID | LBA | Size | VCSN |
| 20000 | 30000 | RA | ME11 | 07000 | 10000 | 07 |
| | | RB | ME21 | 20000 | 10000 | 52 |
| | | RC | ME31 | 30000 | 10000 | 31 |

RB DLT0

Data location table

| Virtual address/Size → | | | Physical address/Size | | | |
|---|---|---|---|---|---|---|
| LBA | Size → | RAID ID | ME ID | LBA | Size | VCSN |
| 0 | 20000 | RB | ME22 | 20000 | 10000 | 11 |
| | | RC | ME32 | 10000 | 10000 | 02 |

RC DLT0

Data location table

| Virtual address/Size → | | | Physical address/Size | | | |
|---|---|---|---|---|---|---|
| LBA | Size → | RAID ID | ME ID | LBA | Size | VCSN |
| | | | | | | |

Fig. 19D

RA DLT0

| Data location table | | | | | |
|---|---|---|---|---|---|
| Virtual address/Size ➡ | | Physical address/Size | | | |
| LBA | Size ➡ | RAID ID | ME ID | LBA | Size |
| 20000 | 30000 | RA | ME11 | 07000 | 10000 |
|  |  | RB | ME21 | 20000 | 10000 |
|  |  | RC | ME31 | 30000 | 10000 |

RB DLT0

| Data location table | | | | | |
|---|---|---|---|---|---|
| Virtual address/Size ➡ | | Physical address/Size | | | |
| LBA | Size ➡ | RAID ID | ME ID | LBA | Size |
| 0 | 20000 | RB | ME22 | 20000 | 10000 |
|  |  | RC | ME32 | 10000 | 10000 |

RC DLT0

| Data location table | | | | | |
|---|---|---|---|---|---|
| Virtual address/Size ➡ | | Physical address/Size | | | |
| LBA | Size ➡ | RAID ID | ME ID | LBA | Size |
|  |  |  |  |  |  |

Fig. 22

METHOD AND STORAGE SYSTEM ARCHITECTURE FOR ACCESSING DATA BY MEANS OF A COMPATIBLE MODULE

BACKGROUND OF THE INVENTION

1. Field of the Invention

The present invention relates to a method for data access, and more particularly, to a method for data access across platforms.

2. Description of the Prior Art

Please refer to FIG. 1 which shows a conventional data storage system architecture 1 (hereinafter called "storage system architecture") in the prior art. In the conventional storage system architecture 1, there are two RAID subsystems (redundant array of independent disks subsystem, hereinafter called "RAID subsystem") 20a and 20b respectively connected to a host 10 through two communication channels, where the communication channels can be LAN (local area network), WAN (wide area network), SAN (storage area network), internet, communication interconnect, or any other communication channels that can make these RAID subsystems 20a and 20b communicate with each other.

The host 10 of the conventional storage system architecture 1 is installed with an application program 13 (or called an application module such as a host-based load balance driver), so that the host 10 has a load balance function and a multi-path function and so on. However, since communications between the host 10 and the RAID subsystems 20a and 20b must be handled by the application program 13, the application program 13 will have a heavy workload, and further there will be a bottleneck problem with the application program, which is a problem that storage industry are facing now.

Furthermore, the application program 13 has to maintain and manage a data location table in order to handle, one by one, data access like data access location translation between the host 10 and the RAID subsystems 20a and 20B through the data location table. As the data access amount and the RAID subsystem number increase, the data location table will be getting more complex; therefore, there will be another bottleneck, which is also another problem that storage industry will be facing.

From the viewpoint of users, the users may not be willing to install the above associated application programs on their hosts, which is another problem that storage industry should be facing.

Also, the developers who develop operating system platforms that are executed on the host, may not allow some other people to install any other application programs on the operating system platforms, which, therefore, is another problem that storage industry will be facing.

In addition, developing various application programs for different operating system platforms which are incompatible with one another, is very inconvenient and time-consuming. Therefore, this is another problem that the storage industry is facing. In conclusion, how to provide a cross-platform associated application program which is not limited to be installed on the host side is a problem to be solved by the storage industry.

SUMMARY OF THE INVENTION

In light of the above problems, one object of the invention is to provide a storage system architecture for accessing data and the method thereof that can have cross-platform function and subsystem side load-balanced data access function to eliminate the problems of the conventional storage system architecture, such as the data access bottleneck.

According to one embodiment of the invention, a method for accessing data in a storage system architecture comprising a plurality of data storage subsystems is provided. The method comprising steps of: providing an on-board load balance (OBLB) module in each of the plurality of data storage subsystems; receiving, by one data storage subsystem of the plurality of data storage subsystems, an I/O request issued from a host; determining whether the one storage subsystem that receives the I/O request, is able to parse the I/O request according to data location information in the OBLB module of the one storage subsystem that receives the I/O request; and when the one storage subsystem that receives the I/O request is able to parse the I/O request according to the data location information in the OBLB module of the one data storage subsystem that receives the I/O request, the method further comprises steps of: parsing, by the one data storage subsystem that receives the I/O request, the I/O request into at least one first sub-I/O request according to the data location information in the OBLB module of the one data storage subsystem that receives the I/O request; dispatching, by the one data storage subsystem that receives the I/O request, the at least one first sub-I/O request to at least one first data storage subsystem of the plurality of data storage subsystems, which is associated with the at least one first sub-I/O request; executing, by the at least one first data storage subsystem associated with the at least one first sub-I/O request, the at least one first sub-I/O request; returning, by the at least one first data storage subsystem associated with the at least one first sub-I/O request, at least one first sub-execution result back to the one data storage subsystem that receives the I/O request; collecting, by the one data storage subsystem that receives the I/O request, the at least one first sub-execution result from the at least one first data storage subsystem; and returning, by the one data storage subsystem that receives the I/O request, a main execution result comprising the at least one first sub-execution result from the at least one first data storage subsystem, back to the host.

According to one embodiment of the present invention, the method for accessing data in a storage system architecture comprising the plurality of data storage subsystems further comprises steps of: when the one data storage subsystem that receives the I/O request is not able to parse the I/O request according to the data location information in the OBLB module of the one data storage subsystem that receives the I/O request, steps of: dispatching, by the one data storage subsystem that receives the I/O request, the I/O request to a master data storage subsystem for the I/O request; parsing, by the master data storage subsystem, the I/O request into at least one second sub-I/O request and dispatching the at least one second sub-I/O request to at least one second data storage subsystem of the plurality of data storage subsystems, which is associated with the at least one second sub-I/O request; executing, by the at least one second data storage subsystem associated with the at least one second sub-I/O request, the at least one second sub-I/O request; returning, by the at least one second data storage subsystem associated with the at least one second sub-I/O request, at least one second sub-execution result back to the master data storage subsystem in response to the at least one second sub-I/O request; collecting, by the master data storage subsystem, the at least one second sub-execution result from the at least one second data storage subsystem; returning, by the master data storage subsystem, a main execution result comprising the at least one second sub-execution result from the at least one second data storage subsystem back to the one data storage subsystem that receives the I/O request; and returning, by the one data storage subsystem that receives the I/O request, the main execution result back to the host.

According to one embodiment of the present invention, the method for accessing data in a storage system architecture comprising the plurality of data storage subsystems further comprises steps of: inquiring, by the one data storage subsystem that receives the I/O request, information from the master data storage subsystem for the I/O request in order to update the data location information in the OBLB module of the one data storage subsystem that receives the I/O request.

According to one embodiment of the present invention, the information from the master data storage subsystem, provided in the method for accessing data in a storage system architecture comprising the plurality of data storage subsystems, is location cross reference information.

According to one embodiment of the present invention, the method for accessing data in a storage system architecture comprising the plurality of data storage subsystems further comprises steps of: when the one data storage subsystem that receives the I/O request is not able to parse the I/O request according to the data location information in the OBLB module of the one data storage subsystem that receives the I/O request, steps of: inquiring, by the one data storage subsystem that receives the I/O request, information from a master data storage subsystem for the I/O request in order to update the data location information in the OBLB module of the one data storage subsystem that receives the I/O request; updating, by the one data storage subsystem that receives the I/O request, the data location information in the OBLB module of the one data storage subsystem that receives the I/O request according to the inquired information from the master data storage subsystem; parsing, via the updated data location information in the OBLB module of the one storage subsystem that receives the I/O request, the I/O request into at least one third sub-I/O request and dispatching the at least one third sub-I/O request to at least one third data storage subsystem of the plurality of data storage subsystems, which is associated with the at least one third sub-I/O request; executing, by the at least one third data storage subsystem associated with the at least one third sub-I/O request, the at least one third sub-I/O request; returning, by the at least one third data storage subsystem associated with the at least one third sub-I/O request, at least one third sub-execution result back to the one data storage subsystem that receives the I/O request; collecting, by the one data storage subsystem that receives the I/O request, the third sub-execution result from the at least one third data storage subsystem; and returning, by the one data storage subsystem that receives the I/O request, a main execution result comprising the at least one third sub-execution result back to the host.

According to one embodiment of the present invention, the method for accessing data in a storage system architecture comprising the plurality of data storage subsystems further comprises steps of: updating, by a master data storage subsystem of the plurality of data storage subsystem, the data location information in the OBLB module in each of the plurality of data storage subsystem regularly or on demand.

According to one embodiment of the present invention, the data location information, provided in the method for accessing data in a storage system architecture comprising the plurality of data storage subsystems, further comprises a VV ID (virtual volume identification), a virtual LBA, a size, a RAID ID (RAID identification), a ME ID (media extent identification), a physical LBA, and a block size.

Another embodiment of the invention provides a method for accessing data in a storage system architecture comprising a plurality of data storage subsystems. The above-mentioned method comprises steps of: providing an on-board load balance (OBLB) module in each of the plurality of data storage subsystems; receiving, by one data storage subsystem of the plurality of data storage subsystems, an I/O request issued from a host; determining, by the one data storage subsystem that receives the I/O request, whether the one data storage subsystem is able to parse the I/O request according to data location information in the OBLB module of the one data storage subsystem that receives the I/O request; and when the one data storage subsystem that receives the I/O request is able to parse the I/O request according to the data location information in the OBLB module of the one data storage subsystem that receives the I/O request, the method further comprises steps of: parsing, by the one data storage subsystem that receives the I/O request, the I/O request into at least one first sub-I/O request according to the data location information in the OBLB module of the one data storage subsystem that receives the I/O request; dispatching, by the one data storage subsystem that receives the I/O request, the at least one first sub-I/O request to at least one first data storage subsystem of the plurality of data storage subsystems, which is associated with the at least one first sub-I/O request; determining, by each one of the at least one first data storage subsystem associated with the at least one first sub-I/O request, whether a Validity Check Information (VCI) contained in a corresponding one of the at least one first sub-I/O request is valid or not; when it is determined that the VCI contained in the corresponding one of the at least one first sub-I/O request is valid, the method further comprises steps of: executing, by one of the at least one first data storage subsystem associated with the valid first sub-I/O request, the corresponding valid first sub-I/O request; returning, by the one of the at least one first data storage subsystem associated with the valid first sub-I/O request, a first sub-execution result back to the one data storage subsystem that receives the I/O request from the host; collecting, by the one data storage subsystem that receives the I/O request, the first sub-execution result from the one of the at least one first data storage subsystem; and returning, by the one data storage subsystem that receives the I/O request, a main execution result comprising the first sub-execution result back to the host.

According to one embodiment of the present invention, the VCI, provided in method for accessing data in a storage system architecture comprising a plurality of data storage subsystems, is a Validity Check Sequence Number (VCSN).

According to one embodiment of the present invention, the method for accessing data in a storage system architecture comprising a plurality of data storage subsystems further comprises steps of: when it is determined that the VCI contained in the corresponding one of the at least one first sub-I/O request is not valid, steps of: dispatching, by one of the at least one first data storage subsystem associated with the invalid first sub-I/O request, the invalid first sub-I/O request corresponding to the one of the at least one first data storage subsystem associated with the invalid first sub-I/O request, to a master data storage subsystem for the I/O request; and handling, by the master data storage subsystem, the invalid first sub-I/O request from the one of the at least one first data storage subsystem associated with the invalid first sub-I/O request.

According to one embodiment of the present invention, the VCI contained in the invalid first sub-I/O request is not valid is due to a reason selected from a group comprising: a data migration or a snapshot.

According to one embodiment of the present invention, the step of handling, by the master data storage subsystem, the invalid first sub-I/O request from the one of the at least one first data storage subsystem associated with the invalid first sub-I/O request in the method for accessing data in a storage system architecture comprising a plurality of data storage subsystems, further comprises steps of: parsing, by the master data storage subsystem, the invalid first sub-I/O request into at least one fourth sub-I/O request; dispatching, by the master data storage subsystem, the at least one fourth sub-I/O request to at least one fourth data storage subsystem of the plurality of data storage subsystems, which is associated with the at least one fourth sub-I/O request; executing, by the at least one fourth data storage subsystem associated with the at least one fourth sub-I/O request, the at least one fourth sub-I/O request; returning, by the at least one fourth data storage subsystem associated with the at least one fourth sub-I/O request, at least one fourth sub-execution result back to the master data storage subsystem in response to the at least one fourth sub-I/O request; and collecting, by the master data storage subsystem, the at least one fourth sub-execution result from the at least one fourth data storage subsystem into an execution result of the invalid first sub-I/O request.

According to one embodiment of the present invention, the method for accessing data in a storage system architecture comprising a plurality of data storage subsystems further comprises steps of: returning, by the master data storage subsystem, the execution result of the invalid first sub-I/O request back to the one data storage subsystem that receives the I/O request from the host; and returning, by the one data storage subsystem that receives the I/O request from the host, the main execution result comprising the execution result of the invalid first sub-I/O request back to the host.

According to one embodiment of the present invention, the method for accessing data in a storage system architecture comprising a plurality of data storage subsystems further comprises steps of: returning, by the master data storage subsystem, the execution result of the invalid first sub-I/O request back to the first data storage subsystem associated with the invalid first sub-I/O request; returning, by the first data storage subsystem associated with the invalid first sub-I/O request, the execution result of the invalid first sub-I/O request back to the one data storage subsystem that receives the I/O request from the host; and returning, by the one data storage subsystem that receives the I/O request from the host, the main execution result comprising the execution result of the invalid first sub-I/O request back to the host.

According to one embodiment of the present invention, the method for accessing data in a storage system architecture comprising a plurality of data storage subsystems further comprises steps of: returning, by the master data storage subsystem, the execution result of the invalid first sub-I/O request back to the one data storage subsystem that receives the I/O request from the host; collecting, by the one data storage subsystem that receives the I/O request, the first sub-execution result from the one of the at least one first data storage subsystem and the execution result of the invalid first sub-I/O request from the master data storage subsystem; and returning, by the one data storage subsystem that receives the I/O request from the host, the main execution result comprising the first sub-execution result of the valid first sub-I/O request and the execution result of the invalid first sub-I/O request back to the host.

According to one embodiment of the present invention, the method for accessing data in a storage system architecture comprising a plurality of data storage subsystems further comprises steps of: returning, by the master data storage subsystem, the execution result of the invalid first sub-I/O request back to the first data storage subsystem associated with the invalid first sub-I/O request; returning, by the first data storage subsystem associated with the invalid first sub-I/O request, the execution result of the invalid first sub-I/O request back to the one data storage subsystem that receives the I/O request from the host; collecting, by the one data storage subsystem that receives the I/O request, the first sub-execution result from the one of the at least one first data storage subsystem associated with the valid first sub-I/O request and the execution result of the invalid first sub-I/O request from the first data storage subsystem associated with the invalid first sub-I/O request; and returning, by the one data storage subsystem that receives the I/O request from the host, the main execution result comprising the first sub-execution result of the valid first sub-I/O request and the execution result of the invalid first sub-I/O request back to the host.

According to one embodiment of the present invention, the method for accessing data in a storage system architecture comprising a plurality of data storage subsystems further comprises a step of: informing, by each one of the at least one first data storage subsystem associated with the at least one first sub-I/O request, the one data storage subsystem that receives the I/O request, of whether the VCI contained in a corresponding one of the at least one first sub-I/O request is valid or not.

According to one embodiment of the present invention, the method for accessing data in a storage system architecture comprising a plurality of data storage subsystems further comprises steps of: informing, by the one data storage subsystem that receives the I/O request, the one of the at least one first data storage subsystem associated with the valid first sub-I/O request, to execute the corresponding valid first sub-I/O request, when the VCI contained in the corresponding one of the at least one first sub-I/O request is valid; and informing, by the one data storage subsystem that receives the I/O request, the one of the at least one first data storage subsystem associated with the invalid first sub-I/O request, not to execute the corresponding invalid first sub-I/O request, when the VCI contained in the corresponding one of the at least one first sub-I/O request is not valid.

According to one embodiment of the present invention, the method for accessing data in a storage system architecture comprising a plurality of data storage subsystems further comprises steps of: when it is determined that any of the VCI contained in the at least one first sub-I/O request is not valid, steps of: informing, by the one data storage subsystem that receives the I/O request, the at least one first data storage subsystem associated with the at least one first sub-I/O request, not to execute the at least one first sub-I/O request; dispatching, by the one data storage subsystem, the I/O request to a master data storage subsystem for the I/O request; parsing, by the master data storage subsystem, the I/O request into at least one fifth sub-I/O request, and dispatching the at least one fifth sub-I/O request to at least one fifth data storage subsystem of the plurality of data storage subsystems, which is associated with the at least one of fifth sub-I/O request; executing, by each one of the at least one fifth data storage subsystem associated with the at least one fifth sub-I/O request, corresponding one of the at least one fifth sub-I/O request to obtain at least one fifth sub-execution result corresponding to the at least one fifth sub-I/O request, and returning the at least one fifth sub-execution result back to the master data storage subsystem; collecting, by the master data storage subsystem, the at least one fifth sub-execution result from the at least one fifth data storage subsystem; returning, by the master data storage subsystem, the at least one fifth sub-execution result back to the one data storage subsystem that receives the I/O request from the host; and returning, by the one data storage subsystem that receives the I/O request from the host, the main execution result comprising the at least one fifth sub-execution result back to the host.

According to one embodiment of the present invention, the VCI contained in the at least one first sub-I/O request is not valid is due to a reason selected from a group comprising: a data migration or a snapshot.

According to one embodiment of the present invention, the method for accessing data in a storage system architecture comprising a plurality of data storage subsystems further comprises steps of: when it is determined that any of the VCI contained in the at least one first sub-I/O request is not valid, steps of: informing, by the one data storage subsystem that receives the I/O request, the at least one first data storage subsystem associated with the at least one first sub-I/O request, not to execute the at least one first sub-I/O request; inquiring, by the one data storage subsystem that receives the I/O request, information from the master data storage subsystem for the I/O request in order to update the data location information in the OBLB module of the one data storage subsystem; updating, by the one data storage subsystem that receives the I/O request, the data location information in the OBLB module of the one data storage subsystem according to the inquired information from the master data storage subsystem; parsing, via the updated data location information in the OBLB module of the one storage subsystem that receives the I/O request, the I/O request into at least one sixth sub-I/O request and dispatching the at least one sixth sub-I/O request to at least one sixth data storage subsystem of the plurality of data storage subsystems, which is associated with the at least one sixth sub-I/O request; executing, by the at least one sixth data storage subsystem associated with the at least one sixth sub-I/O request, the at least one sixth sub-I/O request to obtain at least one sixth sub-execution result, when it is determined that the VCI contained in the at least one sixth sub-I/O request is valid; returning, by the at least one sixth data storage subsystem associated with the at least one sixth sub-I/O request, the at least one sixth sub-execution result back to the one data storage subsystem in response to the at least one sixth sub-I/O request; collecting, by the one data storage subsystem that receives the I/O request, the at least one sixth sub-execution result from the at least one sixth data storage subsystem; and returning, by the one data storage subsystem that receives the I/O request, a main execution result comprising the at least one sixth sub-execution result back to the host.

According to one embodiment of the present invention, the method for accessing data in a storage system architecture comprising a plurality of data storage subsystems further comprises steps of: when it is determined that any of the VCI contained in the at least one first sub-I/O request is not valid, steps of: informing, by the one data storage subsystem that receives the I/O request, the at least one first data storage subsystem associated with the at least one first sub-I/O request, not to execute the corresponding at least one first sub-I/O request; inquiring, by the one data storage subsystem that receives the I/O request, information from the master data storage subsystem for the I/O request in order to update the data location information in the OBLB module of the one data storage subsystem; updating, by the one data storage subsystem that receives the I/O request, the data location information in the OBLB module of the one data storage subsystem according to the inquired information from the master data storage subsystem; parsing, via the updated data location information in the OBLB module of the one storage subsystem that receives the I/O request, the I/O request into at least one sixth sub-I/O request and dispatching the at least one sixth sub-I/O request to at least one sixth data storage subsystem of the plurality of data storage subsystems, which is associated with the at least one sixth sub-I/O request; dispatching, by the one data storage subsystem, the I/O request to the master data storage subsystem, when it is determined that the VCI contained in the at least one sixth sub-I/O request is not valid; parsing, by the master data storage subsystem, the I/O request into at least one seventh sub-I/O request, and dispatching the at least one seventh sub-I/O request to at least one seventh data storage subsystem of the plurality of data storage subsystems, which is associated with the at least one seventh sub-I/O request; executing, by the at least one seventh data storage subsystem associated with the at least one of seventh sub-I/O request, the at least one seventh sub-I/O request to obtain at least one seventh sub-execution result, and returning the at least one seventh sub-execution result back to the master data storage subsystem; collecting, by the master data storage subsystem, the at least one seventh sub-execution result from the at least one seventh data storage subsystem; returning, by the master data storage subsystem, the at least one seventh sub-execution result back to the one data storage subsystem that receives the I/O request from the host; and returning, by the one data storage subsystem that receives the I/O request from the host, a main execution result comprising the at least one seventh sub-execution result back to the host.

According to one embodiment of the present invention, the VCI contained in the at least one first sub-I/O request is not valid is due to a reason selected from a group comprising: a data migration or a snapshot.

According to one embodiment of the present invention, the information from the master data storage subsystem is location cross reference information.

According to one embodiment of the present invention, the information from the master data storage subsystem is location cross reference information.

According to one embodiment of the present invention, the data location information comprises a VV ID (virtual volume identification), a virtual LBA, a size, a RAID ID (RAID identification), a ME ID (media extent identification), a physical LBA, a block size, and the VCI.

Another embodiment of the invention provides a storage system architecture for accessing data. The storage system architecture comprising a plurality of data storage subsystems, each of which is coupled to a host for receiving an I/O request issued from the host, the storage system architecture comprising: a redundant array of independent disks layer (RAID layer) provided in each of the data storage subsystems to map a plurality of physical storage devices (PSDs) into a plurality of media extents (MEs); a virtualization module provided in at least one of the data storage subsystems to manage the media extents (MEs) to form a virtual pool that comprises one or more virtual volumes (VVs) which are generated and presented to the host; an on-board load balance (OBLB) module provided in each of the data storage subsystems to offer a data access interface for the host where the on-board load balance (OBLB) module has data location information used to parse the I/O request issued from the host into at least one sub-I/O request; and a media extent server (ME server) module provided in each of the data storage subsystems to receive the at least one sub-I/O request and to determine the validity of the at least one sub-I/O request; wherein the I/O request issued from the host is received and parsed by one data storage subsystem of the plurality of data storage subsystems, and the at least one sub-I/O request is sent to and executed by one or more first data storage subsystems which have data targeted by the sub-I/O request.

According to one embodiment of the present invention, the on-board load balance (OBLB) module further has one or more data location tables (DLTs), respectively corresponding to the virtual volumes (VVs), to store the data location information.

According to one embodiment of the present invention, the one of the data storage subsystems having the virtualization module is a master data storage subsystem used for managing the one or more virtual volumes (VVs).

According to one embodiment of the present invention, the virtualization module, the on-board load balance (OBLB) module, and the media extent server (ME server) module are three independent modules.

According to one embodiment of the present invention, the on-board load balance (OBLB) module is integrated with the virtualization module.

According to one embodiment of the present invention, the media extent server (ME server) module is integrated with the virtualization module.

According to one embodiment of the present invention, the media extent server (ME server) module is integrated with the on-board load balance (OBLB) module.

According to one embodiment of the present invention, the virtualization module, the media extent server (ME server) module, and the on-board load balance (OBLB) module are integrated into the same module.

According to one embodiment of the present invention, the media extent server (ME server) module has one or more data location validity tables used to determine whether a validity check information (VCI) contained in the at least one sub-I/O request is valid or not.

According to one embodiment of the present invention, the one or more data location validity tables are respectively corresponding to the one or more virtual volumes (VVs).

According to one embodiment of the present invention, the VCI is a validity check sequence number (VCSN).

According to one embodiment of the present invention, the one data storage subsystem is different from one of the one or more first data storage subsystems.

According to one embodiment of the present invention, the one data storage subsystem is included in the one or more first data storage subsystems.

According to one embodiment of the present invention, an execution result of the I/O request is returned by the one data storage subsystem to the host through collecting at least one sub-execution result of the at least one sub-I/O request from the one or more first data storage subsystems.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 19A to FIG. 19D show how internal data changes in the data location tables (DLTs) when performing the data access load balance function according to the embodiments shown in FIG. 17 and FIG. 18 implemented by the storage system architecture of the present invention.

FIG. 22 shows the DLTs of the eleventh and twelfth embodiments when performing the data access load balance function in the storage system architecture of the present invention.

DETAILED DESCRIPTION

A storage virtualization technology is a technology that virtualizes physical storage space; in other words, the storage virtualization technology can combine different sections of physical storage devices (PSDs) into a logical storage entity (also, called logical media unit, LMU) that host can access. In addition to the virtualization of RAID (redundant array of independent disks), the storage virtualization technology and RAID (redundant array of independent disks) technology can combine small physical storage devices into a bigger, fault-tolerant, and high efficient LMU.

A storage virtualization controller (SVC) is used to establish a mapping relationship between a host and the LMU, so that the LMU can be accessed by the host. When the SVC receives an I/O request from the host, the SVC will parse and interpret the I/O request into one or more related I/O operations that is associated with the PSD. This process can be indirect, for example, use of cache, delay (such as write-back), anticipate (such as read-ahead), group and so on in order to enhance efficiency and other characteristics; therefore, the I/O request does not correspond to a physical storage device I/O request in a one-to-one manner.

The storage virtualization controller comprises two different types, i.e., the internal storage virtualization controller and the external storage virtualization control (also called the stand-alone storage virtualization control), in which the external storage virtualization controller, in addition to being connected to the host, can also be connected to devices located outside the host. In general, the external storage virtualization controller typically runs in a manner that is independent from the host.

Figure 1:
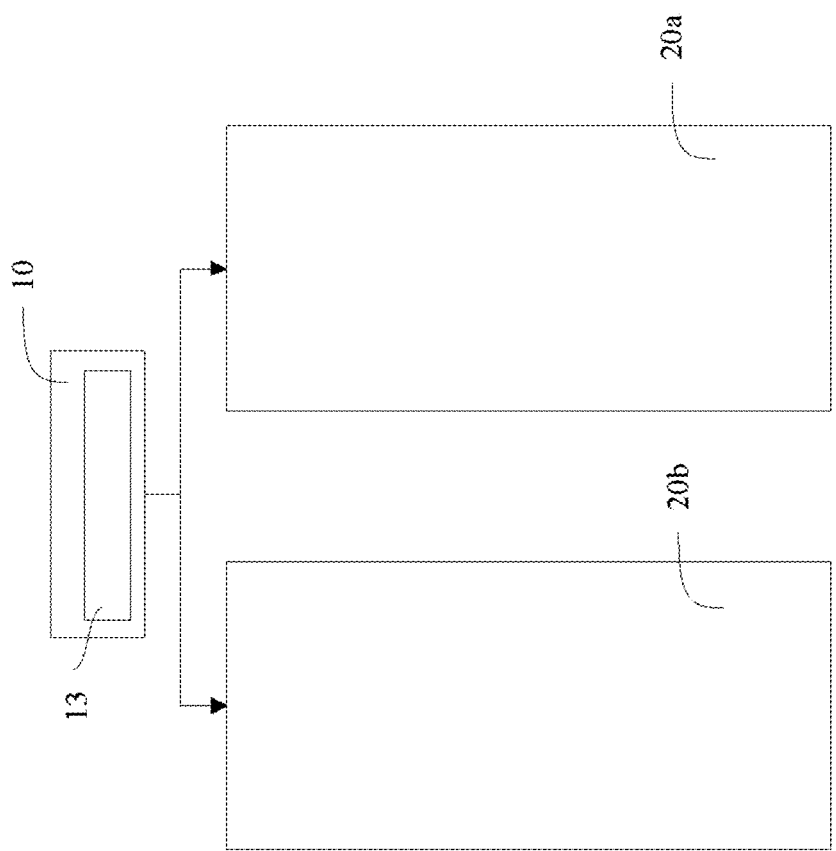
FIG. 1 shows a schematic diagram of a conventional data storage system architecture 1 in the prior art.
Figure 2:
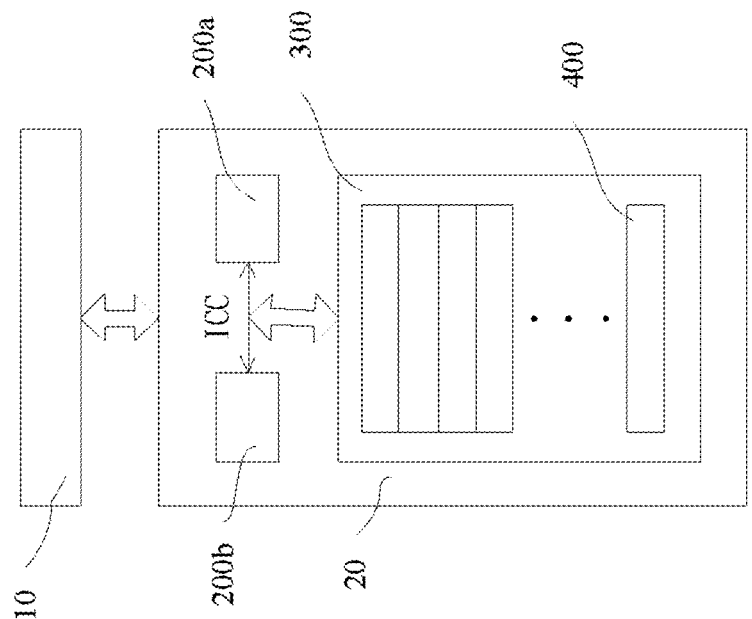
FIG. 2 shows a schematic diagram of a data storage system architecture 2 according to the present invention.

Please refer to FIG. 2 which shows a schematic diagram of the storage system architecture 2 according to the present invention. The storage system architecture 2 comprises a host 10 and a RAID subsystem 20 which is connected to the host 10 through a channel. The RAID subsystem 20 comprises a pair of storage virtualization controllers (SVCs) 200a, 200b and a physical storage disk array 300 (PSD array) that comprises a plurality of physical storage devices (PSDs) 400, where one of the plurality of PSD 400 can be a hard disk drive (HDD), a compact disk (CD), a video compact disk (VCD), a digital versatile disc (DVD), a tape, a solid state drive (SSD), a flash memory, an electrically erasable programmable read only memory (EEPROM) and so on, and the pair of SVCs 200a, 200b are set up as a redundant pair of the storage virtualization controllers. In addition, according to another embodiment of the present invention, one RAID subsystem may have only one storage virtualization controller.

In actual application, it is common that a pair of storage virtualization controllers are configured as a redundant pair, the purpose of which is that when one of the redundant storage virtualization controllers is out of order or malfunctions, the other one of the redundant storage virtualization controllers will take over the work of the malfunctioned storage virtualization controller, so that the host can keep accessing data.

The redundant storage virtualization controllers are commonly divided into two types, i.e., the active-standby type and the active-active type. In the active-standby type, one (also called the primary storage virtualization controller) of the redundant pair presents, manages, and handles all I/O requests to all LMU of the storage virtualization RAID subsystem, while the other (also called the secondary storage virtualization controller) of the redundant pair is stand by and waiting for taking over the work of the primary storage virtualization controller, as long as the primary storage virtualization controller does not work and does not provide any service. In the active-active type, the two storage virtualization controllers of the redundant pair present, manage, handle all I/O requests to all LMU of the storage virtualization RAID subsystem, and the both are ready at any time to take over the work of the other one in case that one of the two storage virtualization controllers stops providing services (for example, malfunction), where the active-active type provides a better performance than the active-standby type, because both the redundant storage virtualization controllers of the active-active type are active and therefore provide more resources, such as the CPU (central processing unit) time and the internal bus bandwidths and so on, which is able to handle and process more I/O requests in comparison with single storage virtualization controller.

However, no matter the active-standby type or active-active type, a basic function of the redundant storage virtualization computer system is that when one of the redundant storage virtualization controllers is out of order or malfunctions, the other one can take over the work of the malfunctioned one, such as, keeping data access from storage devices. Therefore, it is necessary to establish an inter-controller communication channel (ICC) between the two storage virtualization controllers in the redundant storage virtualization computer system. Through the inter-controller communication channel (ICC), messages can be transmitted, where the ICC can be the Fibre Channel Arbitrated Loop (FC-AL), the Parallel Small Computer System Interface (SCSI), the Serial Advanced Technology Attachment (SATA), or any other communication links able to provide the similar function.

Figure 3:
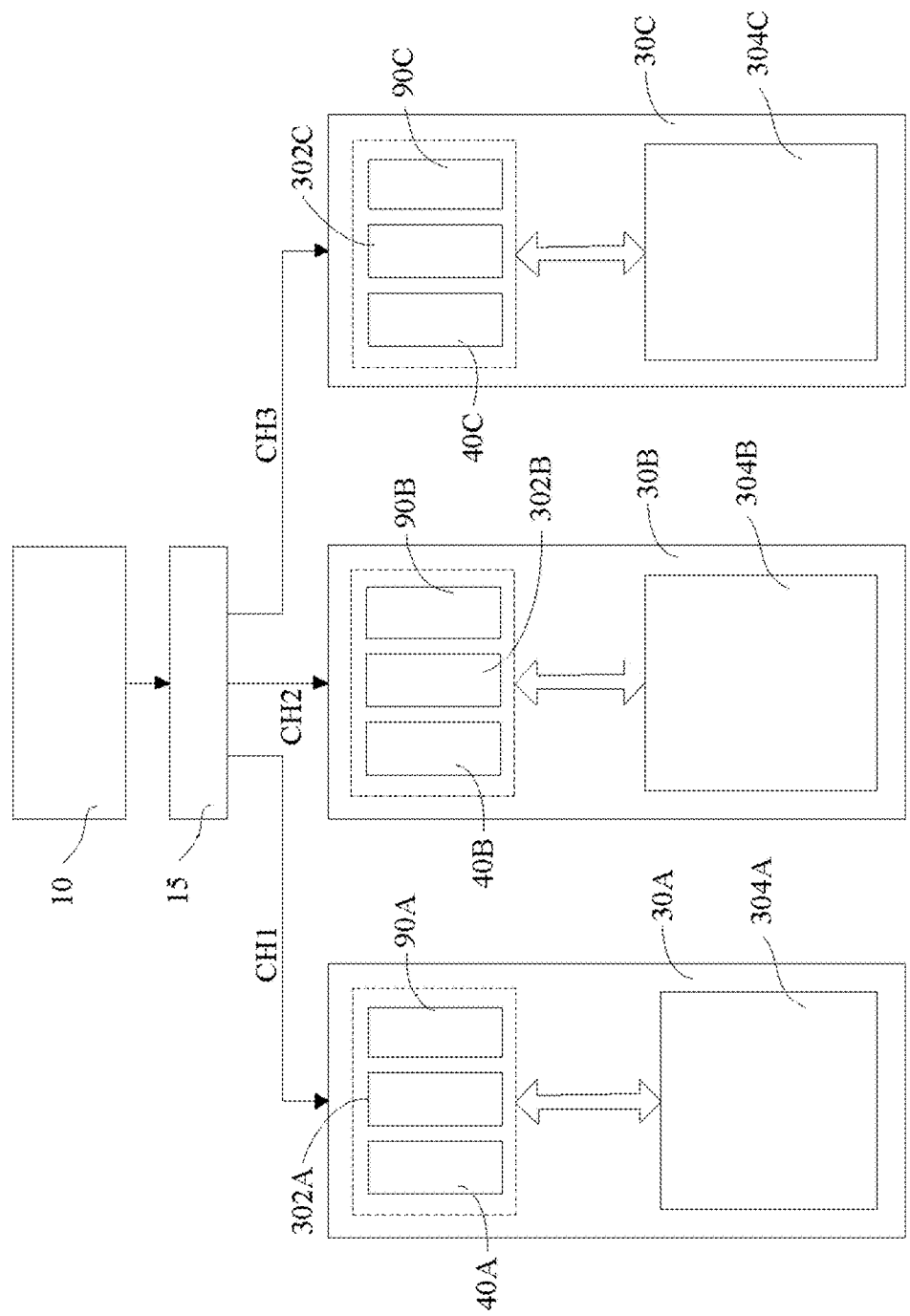
FIG. 3 shows a schematic diagram of a data storage system architecture 3 according to one embodiment of the present invention.

Please refer to FIG. 3. FIG. 3 shows a schematic diagram of a storage system architecture 3 according to one embodiment of the present invention. The storage system architecture 3 comprises a host 10 that has a multiple path function, a switch 15, at least one channel (CH, for example, the first one CH1, the second one CH2, and the third one CH3), and three RAID subsystems (for example, the RAID subsystems 30A, 30B, and 30C). The RAID subsystem 30A comprises a virtualization layer 302A, a RAID layer 304A, an OBLB module (on board load balance module) 40A, and a ME server module (media extent server module) 90A, where the OBLB module 40A and the ME server module 90A can be integrated with the virtualization layer 302A (not shown), or can be independent from the virtualization layer 302A. That is, according to one embodiment of the present invention, the OBLB module 40A, the ME server module 90A and the virtualization layer 302A are three individual modules that are independent from one another as shown in FIG. 3. According to another embodiment of the present invention, the OBLB module 40A is integrated with the virtualization layer 302A, but the ME server module 90A is another individual one (not shown). According to another embodiment of the present invention, the OBLB module 40A is independent from the virtualization layer 302A, while the ME server module 90A is integrated with the virtualization layer 302A (not shown). According to another embodiment of the present invention, both the OBLB module 40A and the ME server module 90A are integrated with the virtualization layer 302A (not shown). According to another embodiment of the present invention, the OBLB module 40A and the ME server module 90A are integrated into one module which is independent from the virtualization layer 302A (not shown). Likewise, the RAID subsystem 30B comprises a virtualization layer 302B, a RAID layer 304B, an OBLB module 40B, and a ME server module 90B, and the RAID subsystem 30C comprises a virtualization layer 302C, a RAID layer 304C, an OBLB module 40C and a ME server module 90C. Similarly, the OBLB module 40B and the ME server module 90B can be respectively integrated with the virtualization layer 302B (not shown), or can be independent from the virtualization layer 302B; the OBLB module 40C and the ME server module 90C can be respectively integrated with the virtualization layer 302C (not shown), or can be independent from the virtualization layer 302C.

Before illustrating the storage system architecture 3, the multi-pathing functionality and the load balance function are introduced first. The multi-pathing functionality is a kind of accessing technologies, i.e., to establish paths between the host 10 and each of the RAID subsystems 30A, 30B, 30C so that when one of the multiple paths is failed, the host 10 can issue a host command through another functional path(s) to replace the failed one, wherein the host command can be an I/O request. Therefore, the host 10 can still access data from storage devices through the alternate path(s), i.e., to establish redundant paths between the host 10 and one of these RAID subsystems 30A, 30B, 30C. If one or more storage virtualization controllers (SVCs) are failed, which results in failure of one of the redundant paths, then the survival SVC(s) will switch to the functional path and take over I/O requests originally executed by the failed SVC(s), so that the host 10 can keep accessing data from these RAID subsystems 30A, 30B, 30C. Under such a configuration, the host 10 does not need to know which functional SVC will take over the I/O requests executed by the failed SVC. Such a redundant SVC configuration is so-called the transparent redundant SVC configuration, and such a takeover configuration is so-called the transparent redundant SVC takeover configuration. When the host 10 issues host I/O requests, it may issue the host commands (i.e., the host I/O requests) to these virtualization layers 302A, 302B, and 302C in turn, so that the virtualization layers receives the host I/O requests evenly in order to prevent a bottleneck when very few nodes receive the most of the host I/O requests. Therefore, the workload of the RAID subsystems 30A, 30B, and 30C can be balanced, and the performance of the whole system will not rely on the I/O request processing ability of a specific node, thus achieving the load balance function.

Hereinafter, the virtualization layer 302 (like the virtualization layers 302A, 302B and 302C), the RAID layer 304 (like the RAID layers 304A, 304B and 304C), the ME server module 90 (like the ME server modules 90A, 90B and 90C), and the OBLB module 40 (like the OBLB modules 40A, 40B and 40C) will be respectively explained. The function of the RAID layer 304 (like the RAID layers 304A, 304B and 304C) will be explained with reference to FIG. 4 and FIG. 5 and their associated paragraphs. Please refer to the paragraphs. The virtualization layers 302A, 302B and 302C, also called the "virtualization modules", are responsible for managing the media extents (MEs) presented by the RAID layers 304A, 304B and 304C, managing and recording validity check information (VCI), and forming a virtual pool (VP) of the MEs (media extents) from the RAID layers 304A, 304B and 304C in order to generate one or more virtual volumes (VVs) for being presented to the host 10, and moreover, managing the mapping relationships between virtual addresses and physical addresses. The virtualization layers 302A, 302B, 302C are also responsible for driving various procedures used for implementing "data service" functions, for example, volume replication, virtual volume snapshot, data migration and so on. Regarding the volume replication of the data service procedure, it may comprise two kinds of volume replication methods, i.e., volume copy and volume mirror, where the volume mirror is used to keep data synchronized from a source volume to a destination volume, while the volume copy enables the data status of a source volume at a specific point in time to be maintained in a destination volume after a split command is issued, and it stops the synchronization relationship between the source volume and the destination volume after that specific point in time. Regarding the virtual volume snapshot of the data service procedure, it is used to maintain the data status of a source volume (also called a base volume) at a specific point in time as a snapshot volume, i.e., a snapshot of the source volume. Moreover, only when the source volume is written with data or the data is updated, the snapshot procedure will copy the original data to be over-written or to be updated, into a snapshot image (that is called a "copy-on-write" procedure) instead of copying the whole data of the source volume. Therefore, the snapshot volume at each point in time is consisted of the associated snapshot image and of the data in the source volume, which are not copied into the snapshot image. Regarding the data migration of the data service procedure, it is used to move data from one or more source volumes, to one or more destination volumes, the details of which will be explained and described in FIG. 8 and FIG. 9. These RAID subsystems 30A, 30B 30C parse a host I/O request into at least one sub-I/O request, and the media extent modules 90A, 90B, 90C are used to verify the validity of the at least one sub-I/O request according to validity check information (VCI) so as to determine the correctness of the location information carried by the I/O request.

Therefore, the storage system architecture 3 can define, according to the system demand, the virtual pool formed by the storage space of the RAID subsystems 30A, 30B 30C, into one or more virtual volumes which are provided to the host 10 for use. In other words, the host 10 can directly communicate with each of the RAID subsystems 30; that is, the multi-pathing functionality and the load balance function are equipped in the storage system architecture 3. In addition, according to one embodiment of the present invention, the validity check information (VCI) can be achieved by a validity check sequence number (VCSN), and the detailed descriptions of the VCSN's embodiment will be explained in FIG. 15 and FIG. 16.

Figure 4:
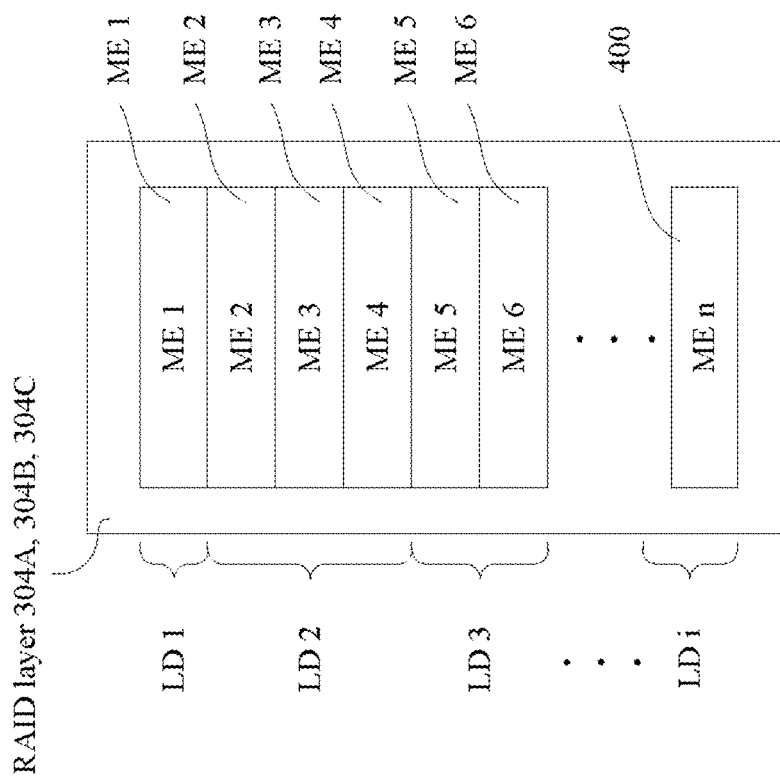
FIG. 4 shows a relationship between logical drives (LDs) and media extents (MEs) mapped by RAID layer according to one embodiment of the present invention.
Figure 5:
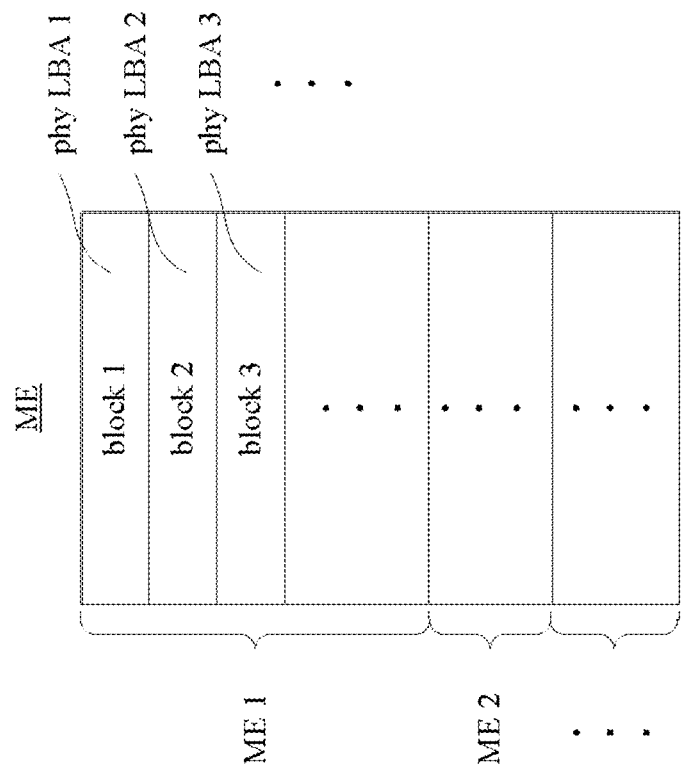
FIG. 5 shows a relationship between the media extents (MEs) and blocks according to one embodiment of the present invention.

Please refer to FIG. 4 and FIG. 5. FIG. 4 shows the RAID layers (for example, RAID layers 304A, 304B and 304C) that map logical drives (LDs) to media extents (MEs) according to one embodiment of the present invention. FIG. 5 shows relationships between the media extents (MEs) and blocks according to one of embodiments of the present invention. As shown in FIG. 4 and FIG. 5, in these RAID layers 304, 304A, 304B, 304C, each block (or called "sector") of one or more PSDs corresponds to a physical logical block address (phy LBA, or called "LBA"), where these phy LBAs are continuously addressing, for example, phy LBA 1, phy LBA 2 and phy LBA 3 etc. as shown in FIG. 5. One ME consists of one or more blocks, for example, ME 1, ME 2, ME 3, ME 4, ME 4, ME 5 and ME 6 etc. as shown in FIG. 4 and FIG. 5, and one logical drive (LD) consists of one or more MEs, for example, LD 1, LD 2, LD 3, . . . , and LD i as shown in FIG. 4. Here, each of LDs can be further partitioned into one or more partitions, for example, partition 1, partition 2, partition 3, partition 4, partition 5, partition 6, . . . , partition n, and etc. These virtualization layers (such as virtualization layers 302A, 302B, 302C) in FIG. 3 are used to manage the MEs presented by the RAID layers (for example, the RAID layers 304A, 304B, 304C) and accordingly produce one or more virtual pools (VPs) (not shown). The VP consists of one or more MEs, which may be just from single one of RAID subsystems 30A, 30B, 30C or from one or more of the RAID subsystems 30A, 30B, 30C. Then the virtualization layers 302A, 302B, 302C generate one or more virtual volumes (VVs) from the virtual pool (VP) (not shown), and present these virtual volumes to the host 10 for accessing data by issuing host I/O requests. In the present invention, the virtual volume consists of one or more MEs, which may be from single one of the RAID subsystems or from one or more of the RAID subsystems. However, regardless of which one of the aforesaid consisting ways is used, for the host 10, the host I/O requests can always be sent to the VVs to be accessed, through any of the first CH 1, the second CH 2 and the third CH 3.

Figure 6:
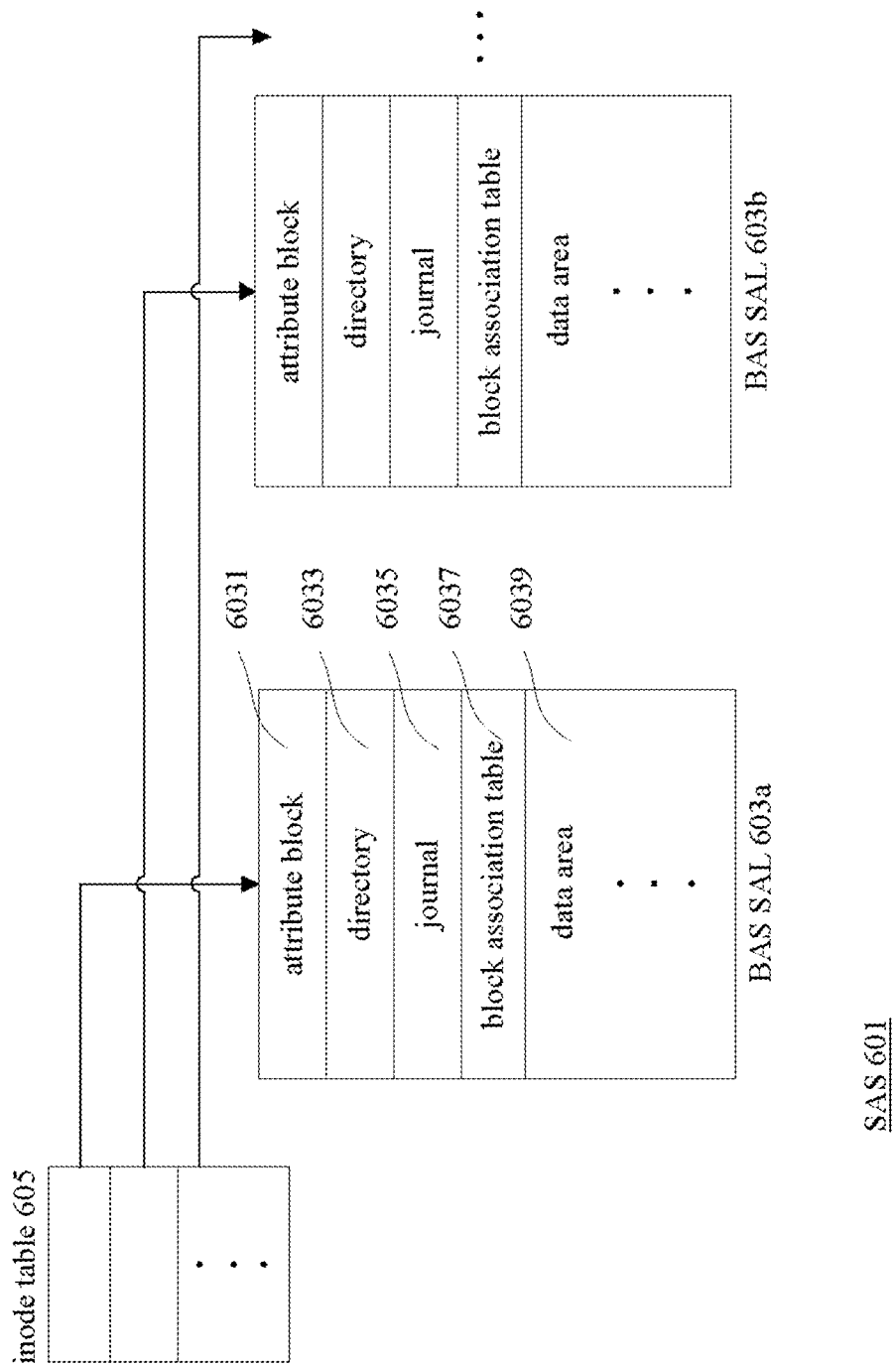
FIG. 6 shows a data structure of a section allocation system (SAS) used for virtual pools (VP) according to one embodiment of the present invention.

Please refer to FIG. 6 which shows a data structure of a section allocation system (SAS) 601 used for the virtual pools according to one embodiment of the present invention. The SAS 601 is a file-system-like data structure which comprises one or more block association set section allocation lists (BAS SAL) 603a, 603b, and which comprises an inode table 605. The inode table 605 is used to record information about location for storing contents of the BAS SAL 603a, 603b, i.e., pointers that point to the contents of the BAS SAL 603a, 603b, so that the system can exactly acquire the contents of the BAS SAL 603a, 603b through the inode table 605. As to the BAS SAL 603a, 603b, for example, the BAS SAL 603a, 603b can be regarded as a file in the SAS, in which there may be several sorts of files and the BAS SAL 603a, 603b belong to one specific application of these several sorts of files. According to one embodiment of the present invention, the BAS SAL is a data structure of the VV, and each of the BAS SALs maps one VV, and comprises a attribute block 6031 for recording the identification (ID), the size, and associated setting information of the BAS SAL 603a, 603b, a directory field 6033 for indexing and managing the information about each physical block in the BAS SAL 603a, 603b, a journal field 6035 for storing an operating journal that is used to recover the system in case of error or power off, a block association table (BAT) field 6037 for storing reference information that is used to point to data area 6039, and the data area 6039 used for storing data provided to the host for data access, in which the location information of the stored data is stored in the respective BATs 6037 of the BAS SALs 603a, 603b. According to one embodiment of the present invention, the virtualization layers (for example, the virtualization layers 302A, 302B, 302C) manage the MEs presented by the RAID layers (for example, RAID layers 304A, 304B, 304C), and accordingly generate one or more virtual pools (VPs). Then, the virtualization layers 302A, 302B, 302C generate one or more VVs from the VPs, in which the one or more VVs individually correspond to the BAS SALs (for example, 603a, 603b). Accordingly, the BAS SALs and the BATs are respectively built up, and the VVs that are associated with the BAS SALs is mapped on channel/identification/logical unit number (CH/ID/LUN) of one channel connected to the host 10, and then are presented to the host 10. In the embodiment of the present invention, the storage space that the VP assigns to the VV is based on the fact that a physical section is the smallest unit, where the physical section comprises one or more blocks (or called "sectors").

Figure 7:
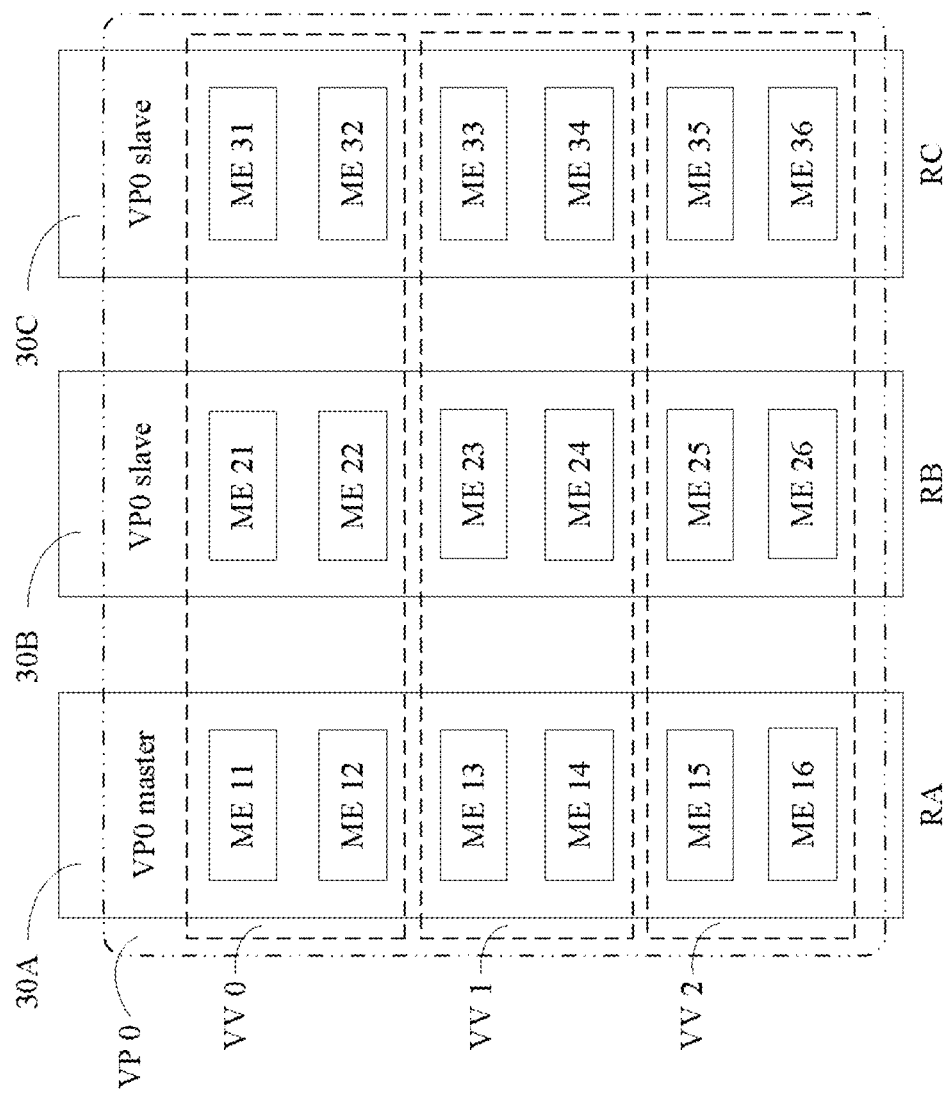
FIG. 7 shows a relationship among a virtual pool (VP), virtual volumes (VVs), and media extents (MEs) in the storage system architecture 3 with one master RAID subsystem according to one embodiment of the present invention.

Please refer to FIG. 3 and FIG. 7, where FIG. 7 shows an embodiment of a storage system architecture 3 comprising one master RAID subsystem and shows the relationships among the VP, the VVs, and the MEs. This embodiment uses the validity check sequence number (VCSN) to implement an I/O request validity verification method. In the present embodiment, the RAID subsystem that is equipped with the virtualization layer 302 can be configured as a master RAID subsystem 30, and other RAID subsystems that are managed by the master RAID subsystem are called "slave" RAID subsystems 30. In other embodiments, it is not necessary for the RAID subsystem that is equipped with the virtualization layer 302, to be configured as the master RAID subsystem 30. According to one embodiment of the present invention, the RAID subsystem 30A as shown in FIG. 3 is equipped with the virtualization layer 302A; therefore, the RAID subsystem 30A is configured as the master RAID subsystem of the virtual pool VP0, and the rest of the RAID subsystems 30B, 30C are the slave RAID subsystems to the virtual pool VP0. In the embodiment of FIG. 7, the virtual pool VP0 generates three virtual volumes, i.e., VV0, VV1, and VV2. In this embodiment, the virtual volume VV0 comprises media extents ME11, ME12, ME21, ME22, ME31, and ME32, the virtual volume VV1 comprises media extents ME13, ME14, ME23, ME24, ME33, and ME34, and the virtual volume VV2 comprises media extents ME15, ME16, ME25, ME26, ME35, and ME36, as shown in FIG. 7.

Figure 8:
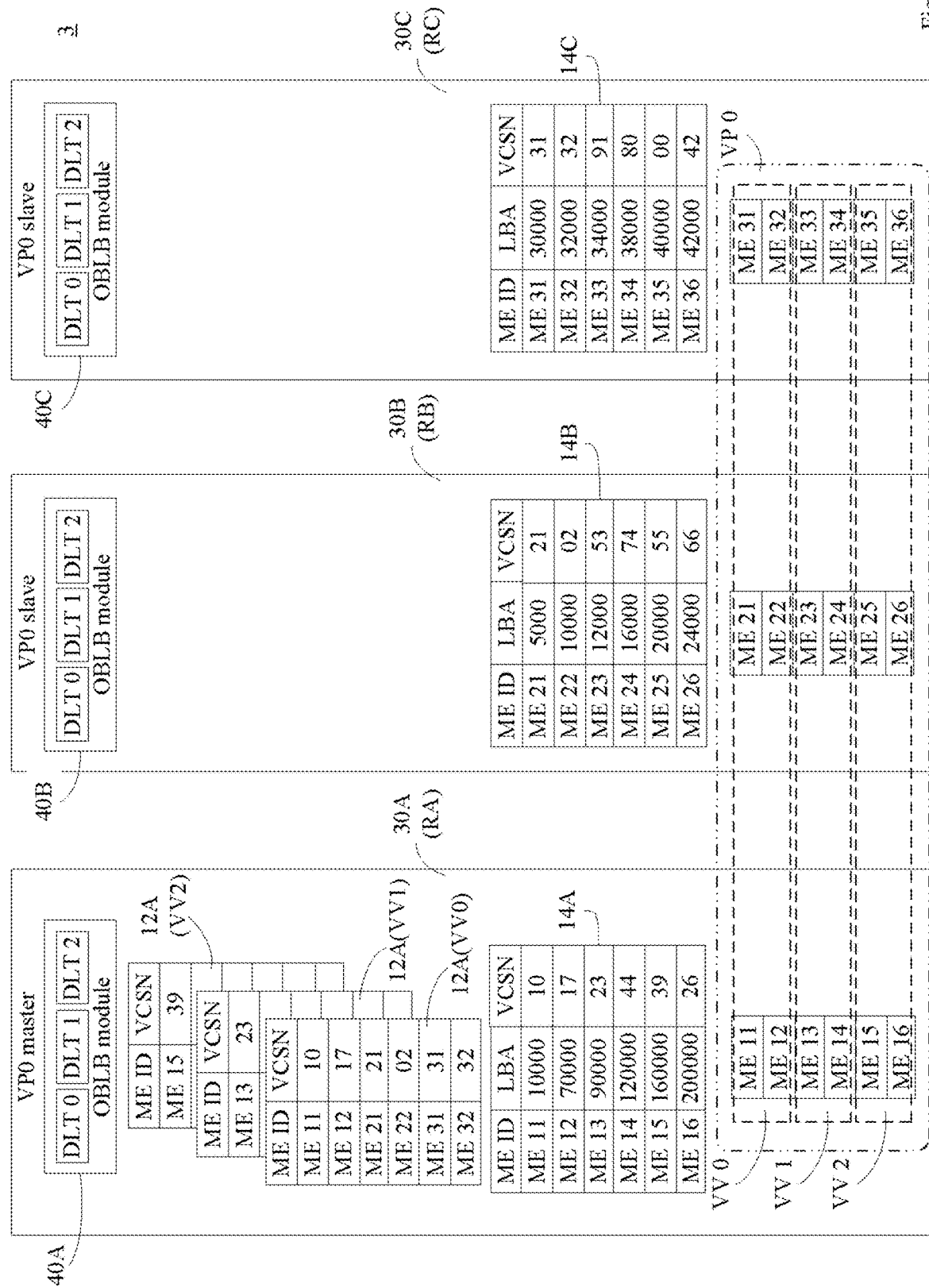
FIG. 8 shows relationships among validity check sequence number tables (VCSN tables), data location tables (DLTs), virtual pools (VPs), and media extents (MEs) according to the storage system architecture 3 of FIG. 7, which is one embodiment of the present invention.
Figure 9:
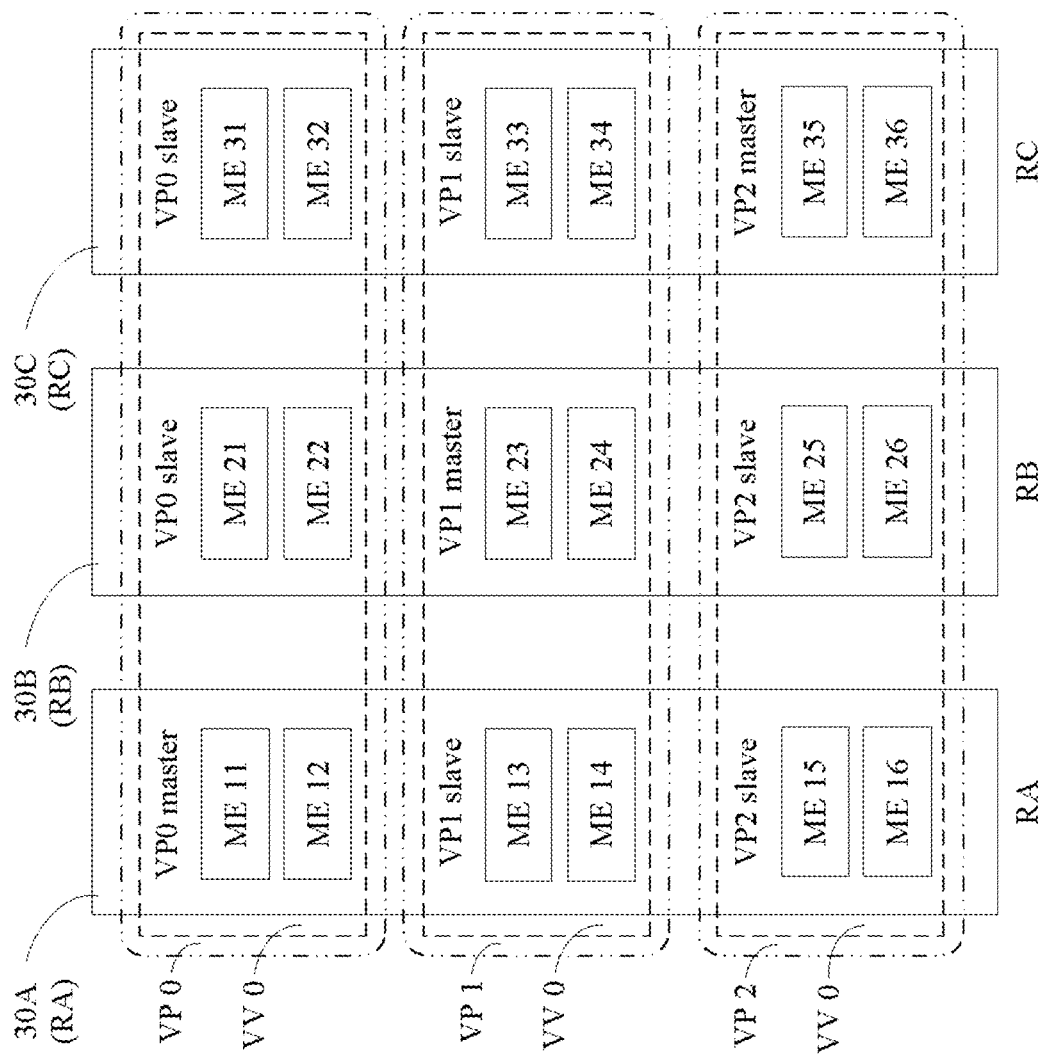
FIG. 9 shows relationships among virtual pools (VPs), virtual volume (VVs) and media extents (MEs) in the storage system architecture with plural master RAID subsystems according to another embodiment of the present invention.

Please refer to FIG. 8 and FIG. 9 which respectively show the VCSN tables 12A, data location validity (DLV) tables 14A to 14C, the relationships between the VPs and MEs in the storage system architecture 3, thus illustrating the way of how to implement the I/O request validity verification method through using a specific embodiment of the validity check information (VCI) (for example, validity check sequence numbers (VCSNs)). According to one embodiment of the present invention, the virtualization layers 302A, 302B and 302C respectively set their own dedicated data location validity (DLV) tables 14A, 14B and 14C, which record the migration status of their own stored data. The purpose of recording the VCSNs on the VCSN tables 12A and on the DLV tables 14A to 14C in the storage system architecture 3 is to prevent a host I/O request from being executed to accessed wrong data, when the host I/O request (read/write command) is about to access the ME in the RAID subsystem 30 that is performing data migration functionality (for example, data migrating between any two MEs in these RAID subsystems 30A, 30B, 30C). Therefore, each ME in the RAID subsystems 30A, 30B, 30C is provided with a VCSN, and before migrating data of a section from one ME in one of the RAID subsystems to another ME in another one of the RAID subsystems, the virtualization layer 302 in the RAID subsystem which has the ME where the data will migrate out, will change the VCSN of the ME where the data migrates out, and will update its own DLV table 14, and then will inform the manager that manages the VV (i.e., the master RAID subsystem 30 for the VV) to which the ME where the data migrates out, belongs, so that the master RAID subsystem 30 can master the latest data distribution status, thus facilitating the judgement of the VCSNs about subsequently-received host I/O requests that require to read/write data. According to FIG. 3, FIG. 7 and FIG. 8 which illustrate one embodiment of the present invention, if the data in the ME 22 of the RAID subsystem 30B is about to migrate to the ME 31 of the RAID subsystem 30C, the RAID subsystem 30B, to which the ME 22 belongs, will change the VCSN of the ME 22 where the data will migrate out, and will update its own DLV table 14B, and then will inform the manager (i.e., the RAID subsystem 30A that is the master RAID subsystem 30), so that the RAID subsystem 30A can update the VCSN tables 12A and can master the latest data distribution status, thus facilitating the judgement of the VCSNs about subsequently-received host I/O requests that require to read/write data.

One of the reasons for the data migration operation is that the number of the media extents in the RAID subsystems 30A, 30B, 30C is increased because of adding a new PSD into the RAID subsystems 30A, 30B, 30C, or that the number of the media extents in the RAID subsystems 30A, 30B, 30C is decreased because of removing an original PSD from the RAID subsystems 30A, 30B, 30C. Therefore, the data stored in the RAID subsystems 30A, 30B, 30C will migrate by the data migration operation in response to the changes of the number of the media extents (i.e., migrating data from one ME to another ME) in order to prevent one of the RAID subsystems 30A, 30B, 30C from having a heavy access load, which is also the manifestation of the load balance function. Another one of the reasons for the data migration operation is that there may be data stored in one of the RAID subsystems 30A, 30B, 30C are "hot data" that are often accessed by the host 10, and/or there may be data stored in one of the RAID subsystems 30A, 30B, 30C are the "cold data" that are seldom accessed by the host 10, which will cause access load imbalance among the RAID subsystems 30A, 30B, 30C. Therefore, the data migration operation (i.e., migrating the "hot data" from the originally-stored ME to one or more other MEs) will be performed on the data stored in the RAID subsystems 30A, 30B, 30C according to demand of the load balance in order to prevent these RAID subsystems 30A, 30B, 30C from having a heavy access load, and thus the load balance function is achieved.

Again, please refer to FIG. 3, FIG. 7 and FIG. 8 which show one embodiment of the present invention. The virtualization layers 302A, 302B, 302C of the RAID subsystems 30A, 30B, 30C respectively generate an initial value of the VCSN corresponding to each ME of the virtual volumes VV0, VV1, and VV2, store the initial value of the VCSN of each ME, respectively into their own DLV tables 14A, 14B and 14C, and form the VCSN tables 12A according to the DLV table 14A, 14B and 14C. Afterwards, if there are data in one section of one ME in one of the RAID subsystems 30 needed to migrate to another ME of another one of the RAID subsystems 30, the virtualization layer 302 of the RAID subsystem 30 where the data migrate out, will change the VCSN of the ME where the data will migrate out, and update its own DLV table 14, and then will inform the manager that manages the VV (i.e., the master RAID subsystem 30 for the VV0) to which the ME where the data will migrates out, belongs, thus facilitating the judgement of the VCSNs about subsequently-received host I/O requests that require to read/write data.

Please refer to FIG. 3, FIG. 7 and FIG. 8 again. In one embodiment of the present invention, the way how to change the VCSN is that when data in one section of some ME migrate out of that some ME due to aforesaid reasons (for example, changing the number of the MEs or resulting in the access load imbalance caused by the hot data/cold data), the virtualization layer 302 of the RAID subsystem, to which that some ME where the data migrate out, belongs, will update the VCSN of that some ME by an increment, for example, updating by one number or by one unit, both of which are determined according to demand. Then, the virtualization layer 302 of the RAID subsystem, to which that some ME where the data migrates out belongs, will update its own DLV table 14 by the updated VCSN, and inform the manager that manages the VV (i.e., the master RAID subsystem 30A for the VV), to which that some ME where the data migrate out, belongs. Afterwards, if data in that some ME migrate out to another ME again, the virtualization layer 302 of the RAID subsystem, to which that some ME belongs, will update the VCSN of that some ME by an increment again, for example, updating by one number or by one unit, both of which are determined according to demand. Again, one embodiment of the present invention based on FIGS. 3, 7 and 8, the way how to update/change the VCSN is that everytime data migrate out of one ME, the VCSN of that one ME is increased by one or a certain number (for example, 2, 3, or 4 etc. but not limited to these examples). Again, according to one embodiment illustrated by FIGS. 3, 7 and 8, the way how to update/change the VCSN is that everytime data migrate out of one ME, the VCSN of that one ME is decreased by one or a certain number (for example, 2, 3, or 4 etc. but not limited to these examples).

Please refer to FIG. 3, FIG. 7, and FIG. 8, in which FIG. 8 shows relationships among the VCSN tables 12, the DLV tables 14A to 14C, the VP, and the MEs according to the storage system architecture 3 shown in FIG. 7. In order to allow the host 10 to issue host I/O requests to any one of the RAID subsystems 30A, 30B, 30C, the RAID subsystems 30A, 30B, 30C are respectively equipped with the on board load balance modules (the OBLB module) 40A, 40B, and 40C which are used to parse the host I/O request into one or more sub-I/O requests and then to send the sub-I/O requests to associated RAID subsystem(s) 30. In one embodiment of the present invention, these OBLB modules 40A, 40B, and 40C have the data location tables (DLT tables) DLT 0, DLT 1, and DLT 2, which are respectively correspond to the virtual volumes VV0, VV1 and VV2. These DLT tables DLT 0, DLT 1 and DLT 2 respectively record data location information associated with the virtual volumes VV0, VV1, VV2 generated by the virtual pool VP0. In this embodiment, since the RAID subsystem 30A is the master RAID subsystem, the media extent module (ME module) 90A in the RAID subsystem 30A is provided with the VCSN tables 12A (VV0), 12A (VV1), and 12A (VV2), which respectively correspond to the virtual volumes VV0, VV1, and VV2, in order to check the validity of one or more sub-I/O requests that have been received, where the VCSN table 12A (VV0), 12A (VV1), and 12A (VV2), which are respectively associated with the virtual volumes VV0, VV1, and VV2, store the MEs and the VCSN maximum values, for example, the VCSN table 12A (VV0) stores information about the media extents ME 15, ME 16, ME 25, ME 26, ME 35, and ME 36 and their VCSN maximum values that are 39, 26, 55, 66, 00, and 42. In one embodiment of the present invention, the DLV tables 14 are provided in the ME modules 90 of the RAID subsystems 30; furthermore, each ME server modules 90 in the RAID subsystems 30 (for example, the ME server module 90A in the RAID subsystem 30A, the ME server module 90B in the RAID subsystem 30B, and the ME server module 90C in the RAID subsystem 30C) is only provided with the DLV table 14 that records the LBAs and the VCSN maximum values of its own media extents, for being used to check validity of the VCSNs of one or more sub-I/O requests received by the RAID subsystems 30. According to the embodiment shown in FIG. 8, the ME server module 90B records the VCSN maximum value (21) of ME 21, the VCSN maximum value (02) of ME 22, the VCSN maximum value (53) of ME 23, the VCSN maximum value (74) of ME 24, the VCSN maximum value (55) of ME 25, and the VCSN maximum value (66) of ME 26. The ME server module 90C records the VCSN maximum value (31) of ME 31, the VCSN maximum value (32) of ME 32, the VCSN maximum value (91) of ME 33, the VCSN maximum value (80) of ME 34, the VCSN maximum value (00) of ME 35, and the VCSN maximum value (42) of ME 36.

Please refer to FIG. 3 and FIG. 9, where FIG. 9 shows relationships among the VPs, VVs, and MEs according to another embodiment based on the storage system architecture 3 with a plurality of master subsystems. Likewise, this embodiment uses the VCSNs to implement the I/O request validity verification method, and in this embodiment, the RAID subsystem that is equipped with the virtualization layer 302 can be configured as a master RAID subsystem 30, and the rest of the RAID subsystems 30 that are managed by the master RAID subsystem are called slave RAID subsystems. As shown in FIG. 3, the RAID subsystem 30A is provided with the virtualization layer 302A; therefore, the RAID subsystem 30A is configured as the master RAID subsystem for the virtual pool VP0 that generates the virtual volume VV0 of the VP0, and the rest of RAID subsystems 30B and 30C are the slave RAID subsystems for the VP0, in which the virtual volume VV0 of the virtual pool VP0 includes the media extents ME 11, ME 12, ME 21, ME 22, ME 31 and ME 32. Likewise, the RAID subsystem 30B is provided with the virtualization layer 302B; therefore, the RAID subsystem 30B is configured as the master RAID subsystem for the virtual pool VP1 that generates the virtual volume VV0 of the VP1, and the rest of the RAID subsystems 30A and 30C are the slave RAID subsystems for the VP1, in which the virtual volume VV0 of the virtual pool VP1includes the media extents ME 13, ME 14, ME 23, ME 24, ME 33, and ME 34. Likewise, the RAID subsystem 30C is provided with the virtualization layer 302C; therefore, the RAID subsystem 30C is configured as the master RAID subsystem for the virtual pool VP2 that generates the virtual volume VV0 of the virtual pool VP2, and the rest of the RAID subsystems 30A and 30B are the slave subsystems for the virtual pool VP2, in which the virtual volume VV0 of the virtual pool VP2 includes the media extents ME 15, ME 16, ME 25, ME 26, ME 35, ME 36.

Figure 10:
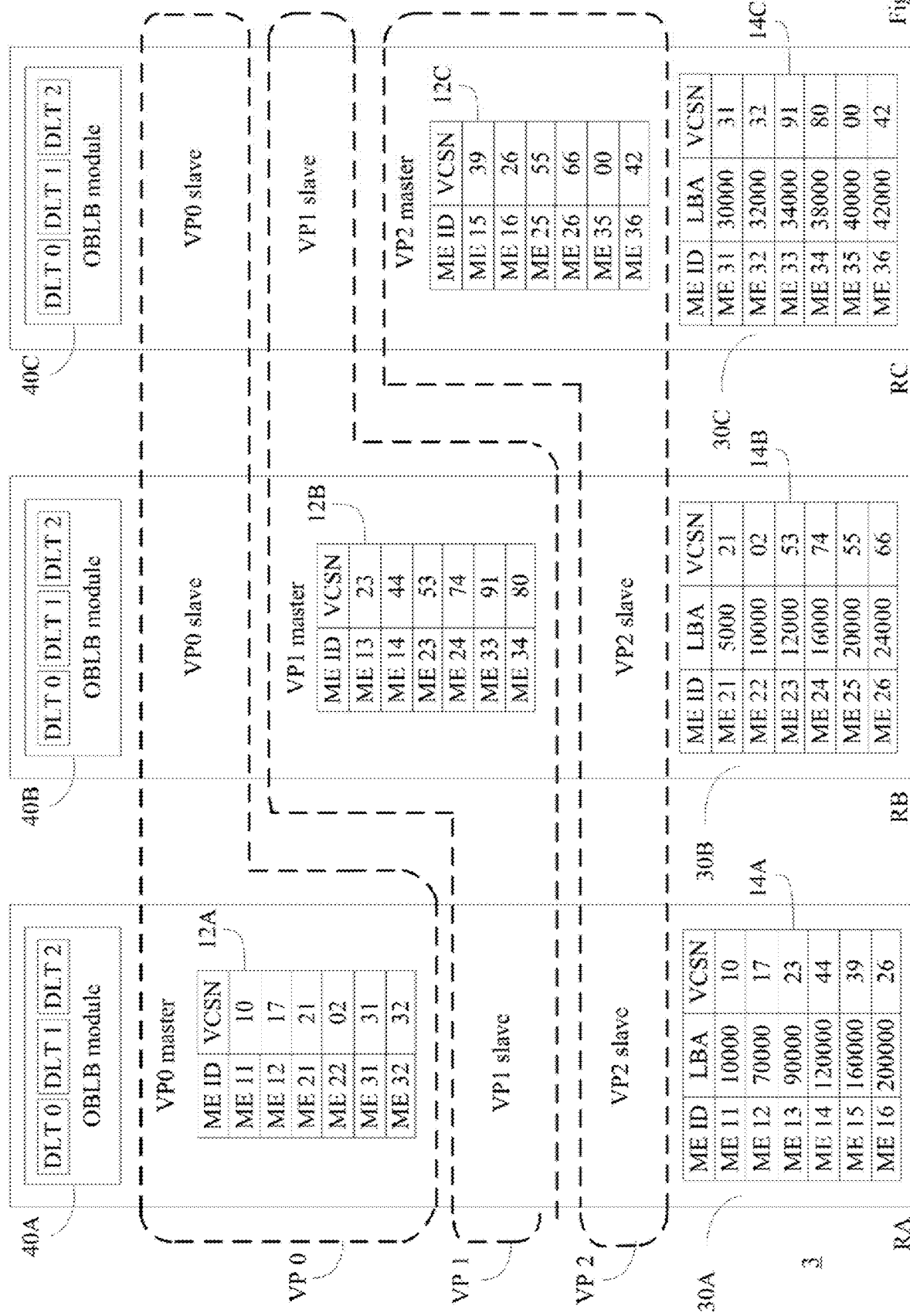
FIG. 10 shows relationships among validity check sequence number tables (VCSN tables), data location tables (DLTs), virtual pools (VPs), and media extents (MEs) according to the storage system architecture in FIG. 9, which is another embodiment of the present invention.

Please refer to FIG. 3, FIG. 9 and FIG. 10, where FIG. 10 shows relationships among the VCSN tables 12, the DLV tables 14, the VPs and the MEs according to the storage system architecture 3 of FIG. 9, which is another embodiment of the present invention. In order to allow the host 10 to issue host I/O request to any one of the RAID subsystems 30A, 30B, 30C; therefore, the RAID subsystems 30A, 30B, 30C are respectively equipped with the OBLB modules 40A, 40B, and 40C which are used to parse the host I/O requests into one or more sub-I/O requests, and then transfer the sub-I/O request(s) to associated RAID subsystems. For example, each of the OBLB modules 40A, 40B and 40C has the data location tables DLT0, DLT 1 and DLT 2, which respectively correspond to the virtual volume VV0 of the virtual pool VP0, to the virtual volume VV0 of the virtual pool VP1, and to the virtual volume VV0 of the virtual pool VP2. These data location tables DLT 0, DLT 1, and DLT 2 are respectively used to record data distribution location information about the virtual volume VV0 of the virtual pool VP0, the virtual volume VV0 of the virtual pool VP1, and the virtual volume VV0 of the virtual pool VP2. According to one embodiment of the present invention, the virtualization layers 302A, 302B and 302C of the RAID subsystems 30A, 30B, 30C further include their own DLV tables 14A, 14B and 14C which are used to record the status of stored data (for example, data migration). Because these RAID subsystems 30A, 30B, 30C respectively act as the master subsystems for different virtual pools VP0, VP1 and VP2, the ME server modules 90A, 90B, 90C of these RAID subsystems 30A, 30B, 30C are provided with their own VCSN tables 12A, 12B, 12C, which are used to execute and/or parse one or more host I/O requests that come from other RAID subsystems and cannot be parsed by other RAID subsystems. Moreover, the ME server modules 90A, 90B, 90C are individually provided with the DLV tables 14, which record the logical block addresses (LBAs) and VCSN maximum values of their own media extents, for being used to check validity of the VCSNs of one or more sub-I/O requests received by the RAID subsystems. According to one embodiment that uses the VCSN to implement the I/O request validity verification method, the RAID subsystem 30C that acts as a slave RAID subsystem for the virtual volume VV0 in the virtual pool VP0, has the ME server module 90C which stores the DLV table 14 C that records the VCSN maximum value (31) of ME 31, the VCSN maximum value (32) of ME 32, the VCSN maximum value (91) of ME 33, the VCSN maximum value (80) of ME 34, the VCSN maximum value (00) of ME 35, and the VCSN maximum value (42) of ME 36. According to one embodiment that uses the VCSN to implement the I/O request validity verification method, the RAID subsystem 30A that acts as a slave RAID subsystem for the virtual volume VV0 in the virtual pool VP2, has the ME server module 90A which stores the DLV table 14A that records the VCSN maximum value (10) of ME 11, the VCSN maximum value (17) of ME 12, the VCSN maximum value (23) of ME 13, the VCSN maximum value (44) of ME 14, the VCSN maximum value (39) of ME 15, and the VCSN maximum value (26) of ME 16. According to another embodiment, these ME server modules 90A, 90B and 90C check the validity of the host I/O requests through using information about the MEs, LBAs and VCSNs stored in the DLV tables 14 of the virtualization layers 302A, 302B and 302C of the RAID subsystems 30A, 30B, 30C.

Figure 11:
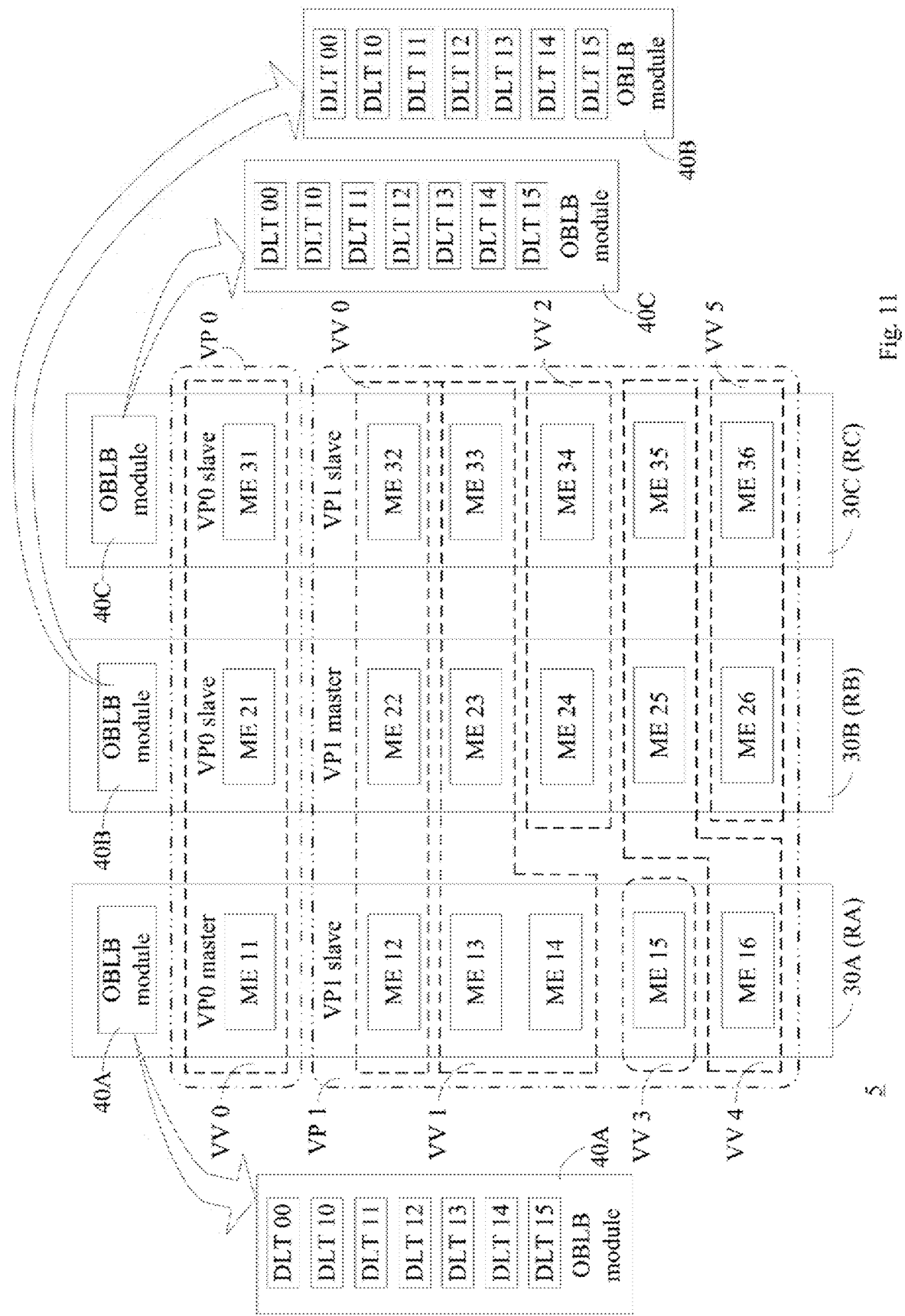
FIG. 11 shows a relationship among virtual pools (VPs), virtual volumes (VVs), and media extents (MEs) in the storage system architecture with plural master RAID subsystems according to another embodiment of the present invention.

Please refer to FIG. 3 and FIG. 11, in which FIG. 11 shows another embodiment of the storage system architecture 3 with a plurality of master RAID subsystems, and also shows relationships among the VPs, the VVs and MEs. Likewise, this embodiment uses the VCSN to implement the I/O request validity verification method, and in this embodiment, the RAID subsystem that is provided with the virtualization layer 302 can be configured as a master RAID subsystem 30, and the rest of the RAID subsystems that are managed by the master RAID subsystem 30, are called the slave RAID subsystems. As shown in FIG. 3 and FIG. 11, the RAID subsystem 30A has the virtualization layer 302A which manages the virtual pool VP0 that presents the virtual volume VV0; therefore, the RAID subsystem 30A is the master RAID subsystem for the virtual pool VP0, and the rest of the RAID subsystems 30B and 30C are the slave RAID subsystems for the virtual pool VP0 and for its virtual volume VV0, in which the virtual volume VV0 of the virtual pool VP0 includes media extents ME 11, ME 21, ME 31. Likewise, the RAID subsystem 30B has the virtualization layer 302B which manages the virtual pool VP1 that presents the virtual volumes VV0, VV1, VV2, VV3, VV4, and VV5; therefore, the RAID subsystem 30B is the master RAID subsystem for the virtual pool VP1, and the rest of the RAID subsystems 30A and 30C are the slave RAID subsystems for the virtual pool VP1 and for its virtual volumes VV0, VV1, VV2, VV3, VV4, and VV5, in which the virtual volume VV0 of the virtual pool VP1 includes media extents ME 12, ME 22, ME 32, and the virtual volume VV1 of the virtual pool VP1 includes media extents ME 13, ME 14, ME 23, ME 33, and the virtual volume VV2 of the virtual pool VP1 includes media extents ME 24, ME 34, and the virtual volume VV3 of the virtual pool VP1 includes a media extent ME 15, and the virtual volume VV4 of the virtual pool VP1 includes media extents ME 16, ME 25, and ME 35, and the virtual volume VV5 of the virtual pool VP1 includes media extents ME 26 and ME 36. In addition, in order to allow the host 10 to issue host I/O requests to any one of the RAID subsystems 30A, 30B, 30C, these RAID subsystems 30A, 30B, 30C has the OBLB modules 40A, 40B and 40C, respectively, which are used to parsed the host I/O requests into one or more sub-I/O requests, and then transfer to associated RAID subsystem(s). Taking the embodiment in FIG. 11 for example, the OBLB module 40C has a data location table DLT 00 corresponding to the virtual volume VV0 of the virtual pool VP0, and has data location tables DLT 10, DLT 11, DLT 12, DLT 13, DLT 14, and DLT 15 respectively corresponding to the virtual volumes VV0 to VV 5 of the virtual pool VP1, where the data location table DLT 00 is used to record the location cross reference information about the virtual volume VV0 generated by the virtual pool VP0, and the data location tables DLT 10, DLT 11, DLT 12, DLT 13, DLT 14, and DLT 15 are used to record the location cross reference information about the virtual volumes VV0, VV1, VV2, VV3, VV4, and VV5 of the virtual pool VP1.

From the embodiment shown in FIG. 7, FIG. 8, FIG. 9, FIG. 10 and FIG. 11, it is understood that one VP can generate one or more VVs according to demand, but is not limited to the fact that one VP only generates one VV, or that one VP generates a specific number of VVs.

Figure 12:
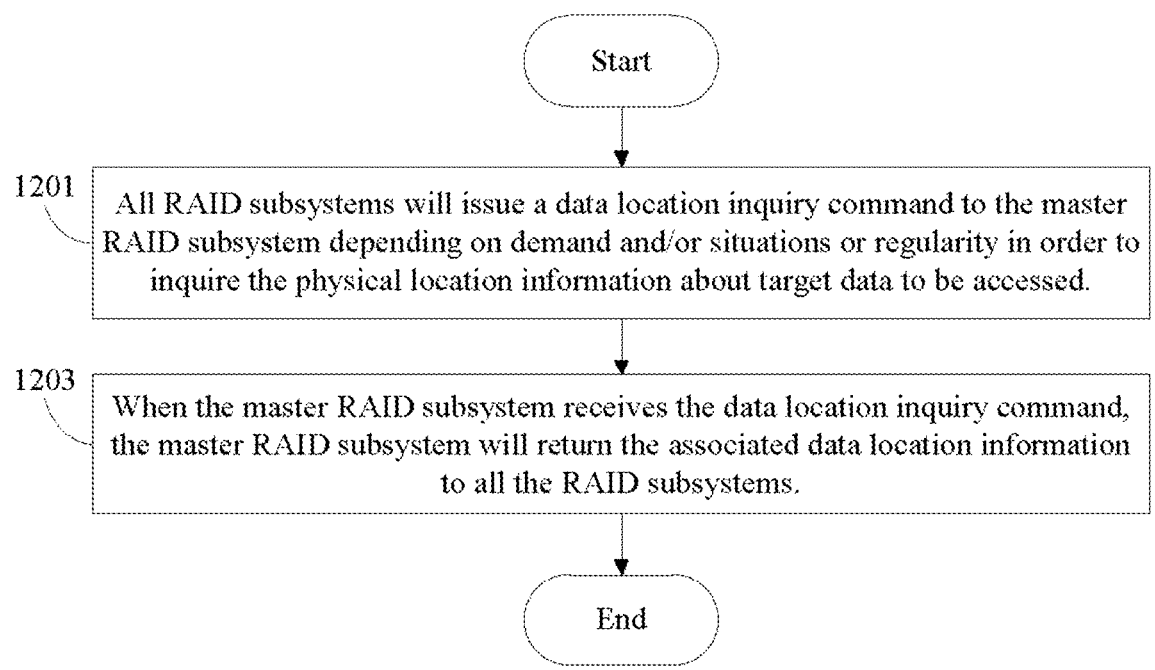
FIG. 12 is a flowchart regarding a background operation about how to execute a data access load balance function in the storage system architecture according to one embodiment of the present invention.

Please refer to FIG. 3, FIG. 9, FIG. 10 and FIG. 12, where FIG. 12 is a flowchart regarding a background operation about how to perform a data access load balance function in the storage system architecture according to one embodiment of the present invention. Here, the storage system architecture 3 is taken as example, which uses the VCSN to implement the I/O request validity verification method. In order to handle the host I/O requests (for example, SCSI commands) from the host 10, the RAID subsystem 30A (the master RAID subsystem) will scan the MEs managed by itself in order to recognize related information about the configurations/locations and data distributions, which are associated with these MEs, and accordingly generates a list for recording the data distribution, ME attributes and the virtualization layer to which belongs. Then, all RAID subsystems (for example, including the RAID subsystem 30A acting as the master RAID subsystem, the RAID subsystem 30B acting as the slave RAID subsystem, and the RAID subsystem 30C acting as the slave RAID subsystem) will issue a data location inquiry command to the RAID subsystem 30A (i.e., the master RAID subsystem) depending on demand and/or situations, and/or periodically issues the data location inquiry command to the RAID subsystem 30A, in order to inquire the physical location information about target data to be accessed (step 1201). The data location inquiry command can be a command, for example, a SCSI (Small Computer System Interface) command used to inquire the location information of stored data, but not limited to this. The data location inquiry command inquires information including virtual volume identification (VV ID), virtual logical block address (virtual LBA), data size, RAID identification (RAID ID), ME identification (ME ID), physical logical block address (physical LBA), block size to be accessed and the VCSN and so on. Regarding the aforesaid "depending on demand", one example is that when one RAID subsystem (for example, the RAID subsystem 30B that acts as the slave RAID subsystem and the RAID subsystem 30C that acts as the slave RAID subsystem) receives a host I/O request from the host 10 but cannot handle the host I/O request, the RAID subsystem that receives the host I/O request needs to inquire the master RAID subsystem (for example, the RAID subsystem 30A) about the physical location information about the target data to be accessed by the host I/O request, in order to update itself s information. Regarding the aforesaid "depending on situations", one example is that when one RAID subsystem (for example, the RAID subsystem 30B that acts as the slave RAID subsystem and the RAID subsystem 30C that acts as the slave RAID subsystem) is in a light load condition and is even in an idle condition, in order to take advantage of system resources effectively, the RAID subsystem will inquire the master RAID subsystem (for example, the RAID subsystem 30A) during the light load period or the idle period, about the latest physical data distribution status in order to update itself's information. Moreover, regarding "regularity", one example is that one RAID subsystem (for example, the RAID subsystem 30B that acts as the slave RAID subsystem and the RAID subsystem 30C that acts as the slave RAID subsystem) regularly inquires the master RAID subsystem (for example, the RAID subsystem 30A) about the latest physical data distribution status in order to update itself's information.

When the RAID subsystem 30A (the master RAID subsystem) receives the data location inquiry command, the RAID subsystem 30A will respond the related information to all the RAID subsystems (for example, responding the related information to the RAID subsystem 30A (the master RAID subsystem), the RAID subsystem 30B (the slave RAID subsystem) or the RAID subsystem 30C (the slave RAID subsystem) (step 1203). The related information includes a data location descriptor, and the data location descriptor further includes location cross reference information, for example, including a virtual volume identification (VV ID), a virtual logical block address (virtual LBA), a data size, a RAID identification (RAID ID), a media extent identification (ME ID), a physical logical block address (physical LBA), a block size, and a VCSN. Afterwards, all RAID subsystems (for example, the RAID subsystem 30A (the master RAID subsystem), the RAID subsystem 30B (the slave RAID subsystem) or the RAID subsystem 30C (the slave RAID subsystem)) will create, according to the location cross reference information, the data location tables (DLTs) as shown in FIG. 19A to 19D or FIG. 22, in their own OBLB modules (for example, the OBLB module 40A, the OBLB module 40B, and the OBLB module 40C) in order to establish the data location information of their own OBLB modules. According to one embodiment of the present invention, the RAID subsystem 30A is the master RAID subsystem for the virtual volume VV0 of the virtual pool VP0; therefore, the RAID subsystem 30A (the master RAID subsystem) will scan the media extents ME 11 to ME 12, ME 21 to ME 22, and ME 31 to ME 32 comprised in the virtual volume VV0 in order to recognize the related configurations/locations and data distribution about these media extents ME 11 to ME 12, ME 21 to ME 22, and ME 31 to ME 32, and will accordingly generate a list for recording the data distribution, ME attributes and the virtualization layer to which they belong. Then, all RAID subsystems which are associated with the virtual volume VV0 of the virtual pool VP0 (for example, the RAID subsystem 30A (the master RAID subsystem, the RAID subsystem 30B (the slave RAID subsystem), and the RAID subsystem 30C (the slave RAID subsystem)) will send a data location inquiry command to the RAID subsystem 30A (the master RAID subsystem) depending on demand, situations, or regularity in order to inquire the physical location information of target data to be accessed and the location cross reference information (as shown in step 1201 of FIG. 12), where the data location inquiry command inquires information about the RAID ID, the ME ID, the physical LBA, the block size and the VCSN. After the RAID subsystem 30A (the master RAID subsystem) receives the data location inquiry command, the RAID subsystem 30A will reply with related information to all the RAID subsystems (i.e., the RAID subsystems 30A, 30B, 30C) as shown in step 1203 of FIG. 12. The related information replied by the RAID subsystem 30A includes a data location descriptor which further comprises the location cross reference information including, for example, the RAID ID, the ME ID, the physical LBA, the block size, and the VCSN. Afterwards, all the RAID subsystems (i.e., these RAID subsystems 30A, 30B, 30C) will create, according to the location cross reference information, data location tables RA DLT0, RB DLT0 and RC DLT0 in their own OBLB modules 40A, 40B and 40C as shown in FIGS. 19A-19D or FIG. 22, in order to establish the data location information into the data location table (DLT) through using the location cross reference information that is retrieved by the data location inquiry command depending on demand, situations, or regularity.

Figure 13A:
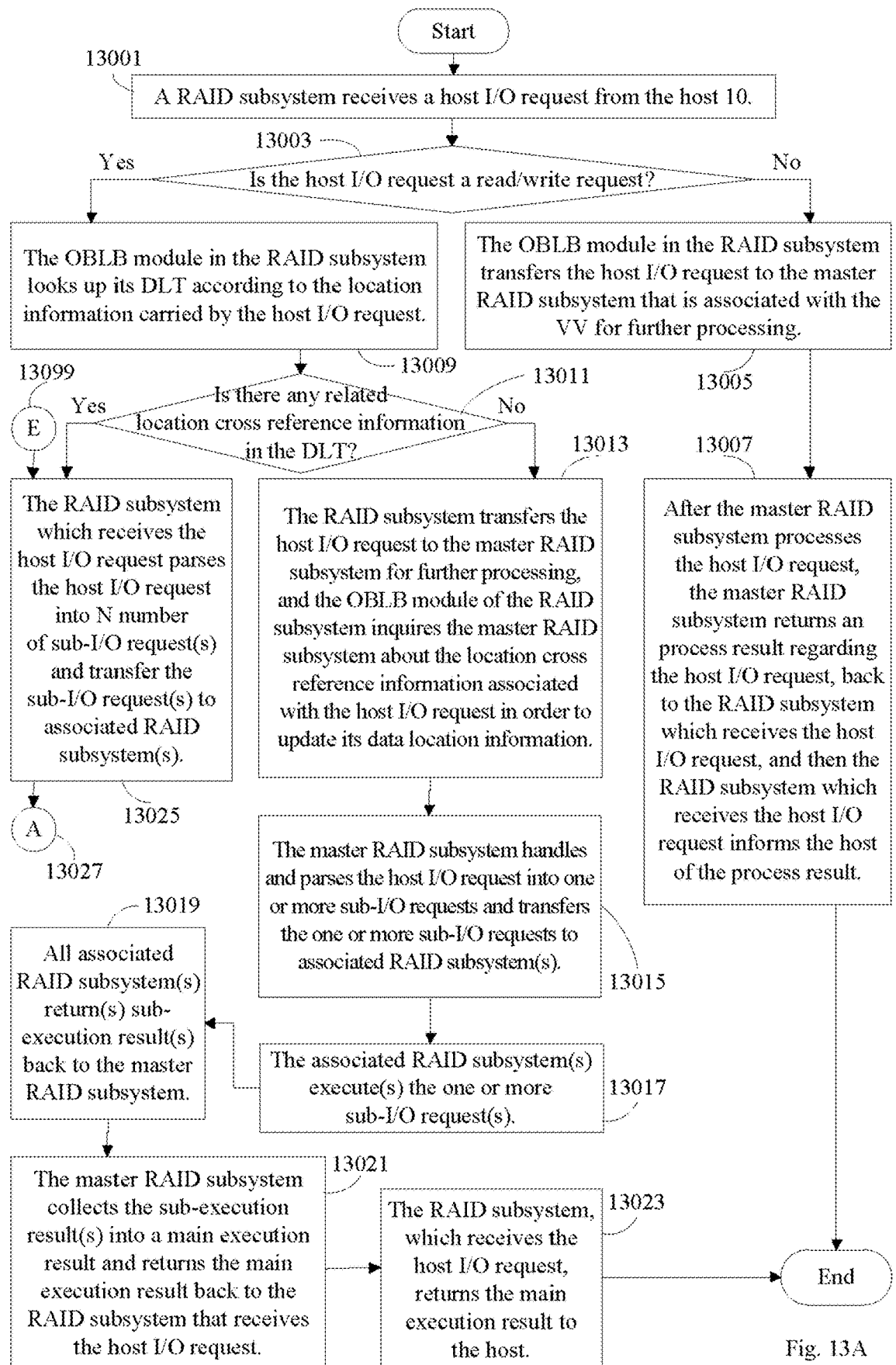
FIG. 13A is the first part of the flowchart of the first, second, third, fourth, and fifth embodiments about how to execute a data access load balance function in the storage system architecture according to one embodiment of the present invention.
Figure 13B:
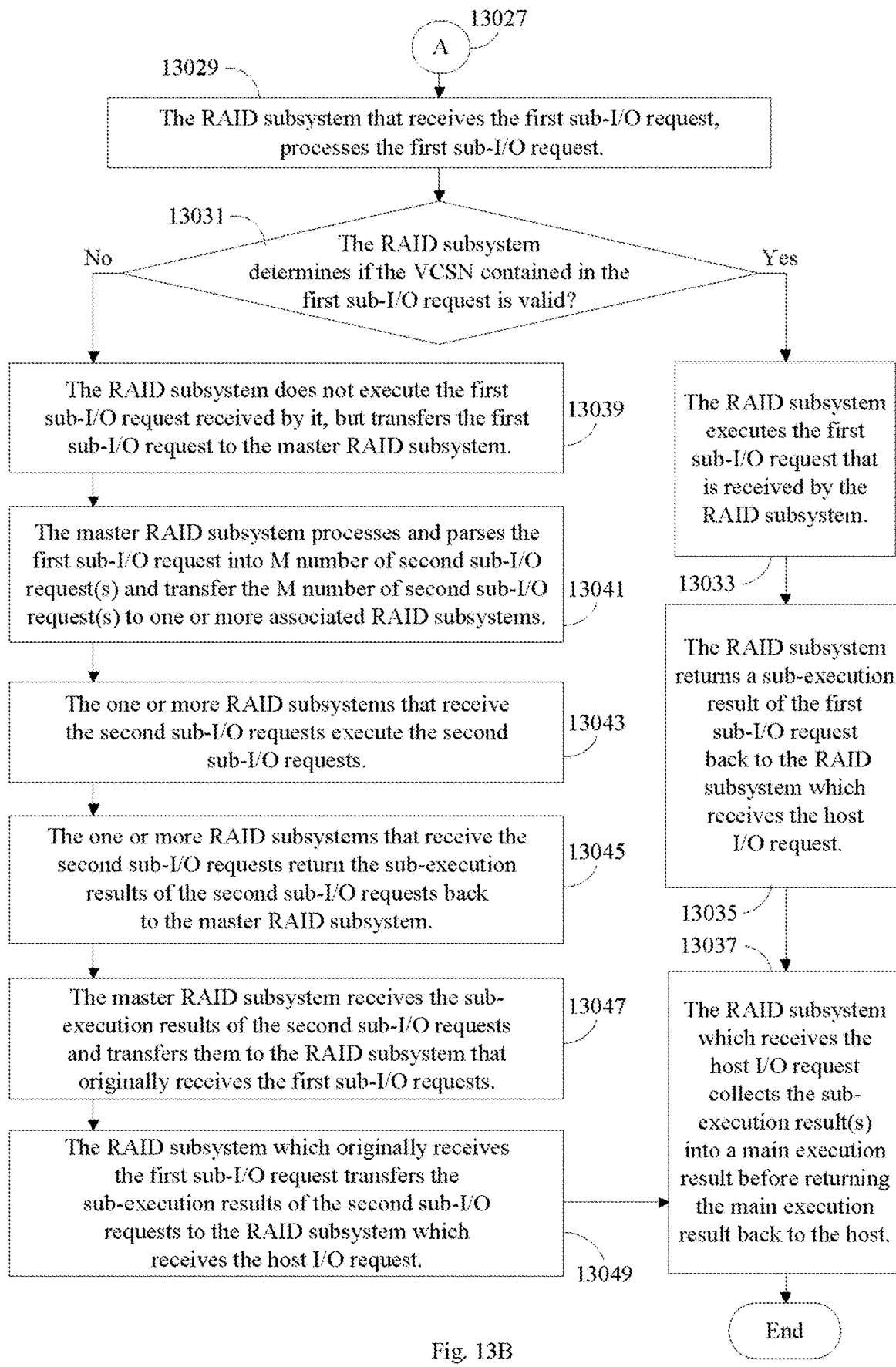
FIG. 13B is the second part of the flowchart of the first and sixth embodiments about how to execute a data access load balance function in the storage system architecture according to one embodiment of the present invention.

Please refer to FIG. 13A and FIG. 13B, which show the first embodiment of the present invention that uses the VCSN to implement the I/O request validity verification method, where FIG. 13A is the first flowchart of the first embodiment for performing the data access load balance function in the storage system architecture of the present invention; FIG. 13B is the second flowchart of the first embodiment for performing the data access load balance function in the storage system architecture of the present invention. The first flowchart of the first embodiment shown in FIG. 13A and the second flowchart of the first embodiment shown in FIG. 13B are combined into a whole process of the first embodiment that performs the data access load balance function in the storage system architecture of the present invention. Here, take the storage system architecture 3 for example. According to one embodiment of the present invention, when the RAID subsystem 30B which acts as the slave RAID subsystem, receives a host command (i.e., an I/O request) (for example, a SCSI command) from the host 10 (step 13001), the RAID subsystem 30B will determine if the host I/O request is an access command (for example, a read request, or a write request)(step 13003). If the host I/O request is a read/write request, the OBLB module 40B in the RAID subsystem 30B will look up the DLT which belongs to the OBLB module 40B according to the location information carried by the host I/O request (step 13009) in order to determine if there is any related location cross reference information in the data location information recorded in the aforesaid DLT (step 13011). If it is determined that, in the DLT of the RAID subsystem 30B (the slave RAID subsystem), there is the location cross reference information that is associated with the host I/O request, then the RAID subsystem 30B (the slave RAID subsystem) will parse, according to the location cross reference information related to the host I/O request, the host I/O request into N number of sub-command(s) (i.e., sub-I/O request(s)) and transfer the sub-I/O request(s) to associated RAID subsystem(s) for further execution (step 13025), where the value of N can be 1 or any integer greater than 1 (for example, if the N number is 3, then that means that the host I/O request is parsed into 3 sub-I/O requests). According to one embodiment of the present invention, the host I/O request is parsed into 3 sub-I/O requests (i.e., the first sub-I/O request 1, the first sub-I/O request 2, and the first sub-I/O request 3) based on the location cross reference information associated with the host I/O request, and then the first sub-I/O request 1, the first sub-I/O request 2, and the first sub-I/O request 3 are respectively transferred to the RAID subsystem 30A (the master RAID subsystem), the RAID subsystem 30B (the slave RAID subsystem) and the RAID subsystem 30C (the slave RAID subsystem) for further executing these three sub-I/O requests (step 13025). On the other hand, if in the data location information recorded in the DLT, no related location cross reference information associated with the host I/O request is found, then the RAID subsystem 30B (the slave RAID subsystem) will transfer the host I/O request to the RAID subsystem 30A (the master RAID subsystem), and the RAID subsystem 30A (the master RAID subsystem) will further handle the host I/O request (step 13013). At the same time, because the data location information in the DLT of the RAID subsystem 30B (the slave RAID subsystem) does not have related location cross reference information associated with the host I/O request, the OBLB module 40B of the RAID subsystem 30B (the slave RAID subsystem) will inquire the RAID subsystem 30A (the master RAID subsystem) about the related location cross reference information that is associated with the host I/O request in order to update its data location information (step 13013). Then, the RAID subsystem 30A (the master RAID subsystem) will handle and parse, according to a virtual-to-physical section index mapping table (V2P table) stored in the virtualization layer 302A, the host I/O request into one or more sub-I/O requests, and transfer the sub-I/O requests to associated RAID subsystem(s) (step 13015) for executing the one or more sub-I/O requests (step 13017). Afterwards, all associated RAID subsystem(s) will return sub-execution result(s) back to the RAID subsystem 30A (the master RAID subsystem) (step 13019), and the RAID subsystem 30A (the master RAID subsystem) collects the sub-execution result(s) into a main execution result and returns the main execution result to the RAID subsystem 30B (the slave RAID subsystem) (step 13021) that receives the host I/O request. Then, the RAID subsystem 30B (the slave RAID subsystem) returns the main execution result to the host 10 (step 13023). According to one embodiment of the present invention, the RAID subsystem 30A (the master RAID subsystem) parses the host I/O request transferred from the RAID subsystem 30B (the slave subsystem), into the first sub-I/O request 1, the first sub-I/O request 2 and the first sub-I/O request 3 (as shown in step 13015 of FIG. 13A), and then the first sub-I/O request 1, the first sub-I/O request 2 and the first sub-I/O request 3 are respectively transferred to the RAID subsystem 30A (the master RAID subsystem), the RAID subsystem 30B (the slave RAID subsystem), and the RAID subsystem 30C (the slave subsystem) for further executing them (as shown in step 13017 of FIG. 13A). Afterwards, the RAID subsystem 30A (the master RAID subsystem), the RAID subsystem 30B (the slave RAID subsystem), and the RAID subsystem 30C (the slave subsystem) respectively return their sub-execution results of the first sub-I/O request 1, the first sub-I/O request 2 and the first sub-I/O request 3, back to the RAID subsystem 30A (the master RAID subsystem) (as shown in step 13019 of FIG. 13A), and then the RAID subsystem 30A (the master RAID subsystem) returns the sub-execution results of the first sub-I/O request 1, the first sub-I/O request 2 and the first sub-I/O request 3, back to the RAID subsystem 30B (the slave RAID subsystem) (as shown in step 13021 of FIG. 13A), and then the RAID subsystem 30B (the slave RAID subsystem) collects the sub-execution results into a main execution result and sends the main execution result of the host I/O request, back to the host 10 (as shown in step 13023 of FIG. 13A). If in step 13003, it is determined that the host I/O request is not a read/write request, then the OBLB module 40B in the RAID subsystem 30B (the slave RAID subsystem) will transfer the host I/O request to the RAID subsystem 30A (the master RAID subsystem), and the RAID subsystem 30A (the master RAID subsystem) will further process it (in step 13005). After the RAID subsystem 30A (the master RAID subsystem) processes the host I/O request, the RAID subsystem 30A will send a process result back to the RAID subsystem 30B which receives the host I/O request, and then the RAID subsystem 30B which receives the host I/O request informs the host 10 of the process result (step 13007).

Please refer to FIGS. 13A and 13B again. After aforesaid step 13025 in FIG. 13A, the host I/O request is parsed into N number of the first sub-I/O request(s), and the N number of the first sub-I/O request(s) is(are) transferred to the associated RAID subsystem(s) for further processing. Next, the process flow enters into FIG. 13B through node A (step 13027 in FIG. 13A and FIG. 13B). As above mentioned, because the N number of the first sub-I/O request(s) is(are) respectively transferred to the associated RAID subsystem(s) for further processing, there might be one or more processing procedures each corresponding to a first sub-I/O request that are being processed in a parallel manner, and FIG. 13B (step 13029 to step 13037) only explains one of the processing procedures for one of the first sub-I/O request(s). Please refer to FIG. 13B. When one of the associated RAID subsystems receives the first sub-I/O request, the RAID subsystem processes the first sub-I/O request (step 13029). The RAID subsystem will first determine the validity of the VCSN contained in the first sub-I/O request that is received by the RAID subsystem (step 13031). If it is determined by the RAID subsystem that the VCSN contained in the first sub-I/O request is valid, then the RAID subsystem will execute the first sub-I/O request that is received by the RAID subsystem (step 13033), and then the RAID subsystem will return a sub-execution result of the first sub-I/O request, back to the RAID subsystem 30B which receives the host I/O request (step 13035), and the RAID subsystem 30B which receives the host I/O request will collect the sub-execution results sent back by all associated RAID subsystems, into a main execution result before returning the main execution result back to the host 10 (step 13037).

Please refer to FIG. 13B again. If in step 13031 it is determined that the VCSN comprised in the first sub-I/O request is invalid (step 13031), the RAID subsystem will not execute the first sub-I/O request received by it, but transfer the first sub-I/O request to the master RAID subsystem (the RAID subsystem 30A) (step 13039). Then, the master RAID subsystem (the RAID subsystem 30A) will process and parse, according to the V2P table (virtual-to-physical section index mapping table), the first sub-I/O request having an invalid VCSN, into M number of second sub-I/O request(s), and transfer the M number of second sub-I/O request(s) to one or more associated RAID subsystems (step 13041), where the value of M can be one or any integer greater than one (for example, if the M number is 2, then that means that the first sub-I/O request is parsed into 2 second sub-I/O requests). The one or more RAID subsystems that receive the second sub-I/O requests execute the second sub-I/O requests (step 13043), and then the one or more RAID subsystems return one or more sub-execution results of the second sub-I/O request(s), back to the master RAID subsystem (the RAID subsystem 30A) (step 13045). The master RAID subsystem (the RAID subsystem 30A) collects the sub-execution results of the second sub-I/O requests into a collected sub-execution result regarding the first sub-I/O request and transfers the collected sub-execution result to the RAID subsystem that originally receives the first sub-I/O request (step 13047). Then, the RAID subsystem which originally receives the first sub-I/O request transfers the collected sub-execution result to the RAID subsystem (the RAID subsystem 30B) which receives the host I/O request (step 13049). Afterwards, the RAID subsystem 30B that receives the host I/O request will wait for all the sub-execution results of the first sub-I/O requests to be collected into a main execution result, and then the RAID subsystem 30B will return the main execution result of the host I/O request back to the host (step 13037). For example, according to one embodiment of the present invention, the host I/O request is parsed by the RAID subsystem 30B into three first sub-I/O requests including a first sub-I/O request 1, a first sub-I/O request 2, and a first sub-I/O request 3, which are respectively transferred to the RAID subsystem 30A (the master RAID subsystem), the RAID subsystem 30B (the slave RAID subsystem), and the RAID subsystem 30C (the slave RAID subsystem). In case the RAID subsystem 30C (the slave RAID subsystem) determines that the VCSN comprised in the first sub-I/O request 3 is invalid. Therefore, the RAID subsystem 30C (the slave RAID subsystem) will not execute the first sub-I/O request 3 received by it, but transfers the first sub-I/O request 3 to the RAID subsystem 30A (the master RAID subsystem) (as step 13039 shown in FIG. 13B). The RAID subsystem 30A (the master RAID subsystem) processes and parses, according to the V2P table (virtual-to-physical section index mapping table), the first sub-I/O request 3 into at least one second sub-I/O request 3, and then transfers the at least one second sub-I/O request 3 to the associated RAID subsystem(s) (for example, the RAID subsystem 30B, the RAID subsystem 30C) (step 13041). Afterwards, each of the associated RAID subsystem(s) (for example, the RAID subsystem 30B, the RAID subsystem 30C) which receives the second sub-I/O request 3 executes its second sub-I/O request 3 (step 13043). After the execution is complete, the RAID subsystem (for example, the RAID subsystem 30B, the RAID subsystem 30C) that receives the second sub-I/O request 3 will return a sub-execution result of the second sub-I/O request 3 back to the RAID subsystem 30A (the master RAID subsystem) (step 13045). The RAID subsystem 30A (the master RAID subsystem) then collects and returns the sub-execution result(s) of the at least one second sub-I/O request 3 received by it back to the RAID subsystem 30C that receives the first sub-I/O request 3 (step 13047). Afterwards, the RAID subsystem 30C returns the collected sub-execution result of the first sub-I/O request 3 back to the RAID subsystem 30B that receives the host I/O request. Moreover, because the host I/O request is parsed into the first sub-I/O request 1, the first sub-I/O request 2, and the first sub-I/O request 3 by the RAID subsystem 30B that receives the host I/O request (step 13025), the RAID subsystem 30A (the master RAID subsystem) that receives the first sub-I/O request 1 with a valid VCSN, and the RAID subsystem 30B (the slave RAID subsystem) that receives the first sub-I/O request 2 with a valid VCSN, both respectively execute the first sub-I/O request 1 and the first sub-I/O request 2 (step 13033) in parallel, and respectively return their sub-execution results of the first sub-I/O request 1 and the first sub-I/O request 2, back to the RAID subsystem 30B that receives the host I/O request (step 13035). Last, the RAID subsystem 30B that receives the host I/O request will collect the sub-execution results comprising the ones of the first sub-I/O request 1, the first sub-I/O request 2, and the first sub-I/O request 3, into a main execution result of the host I/O request, and return the main execution result back to the host 10 (step 13037).

Figure 13C:
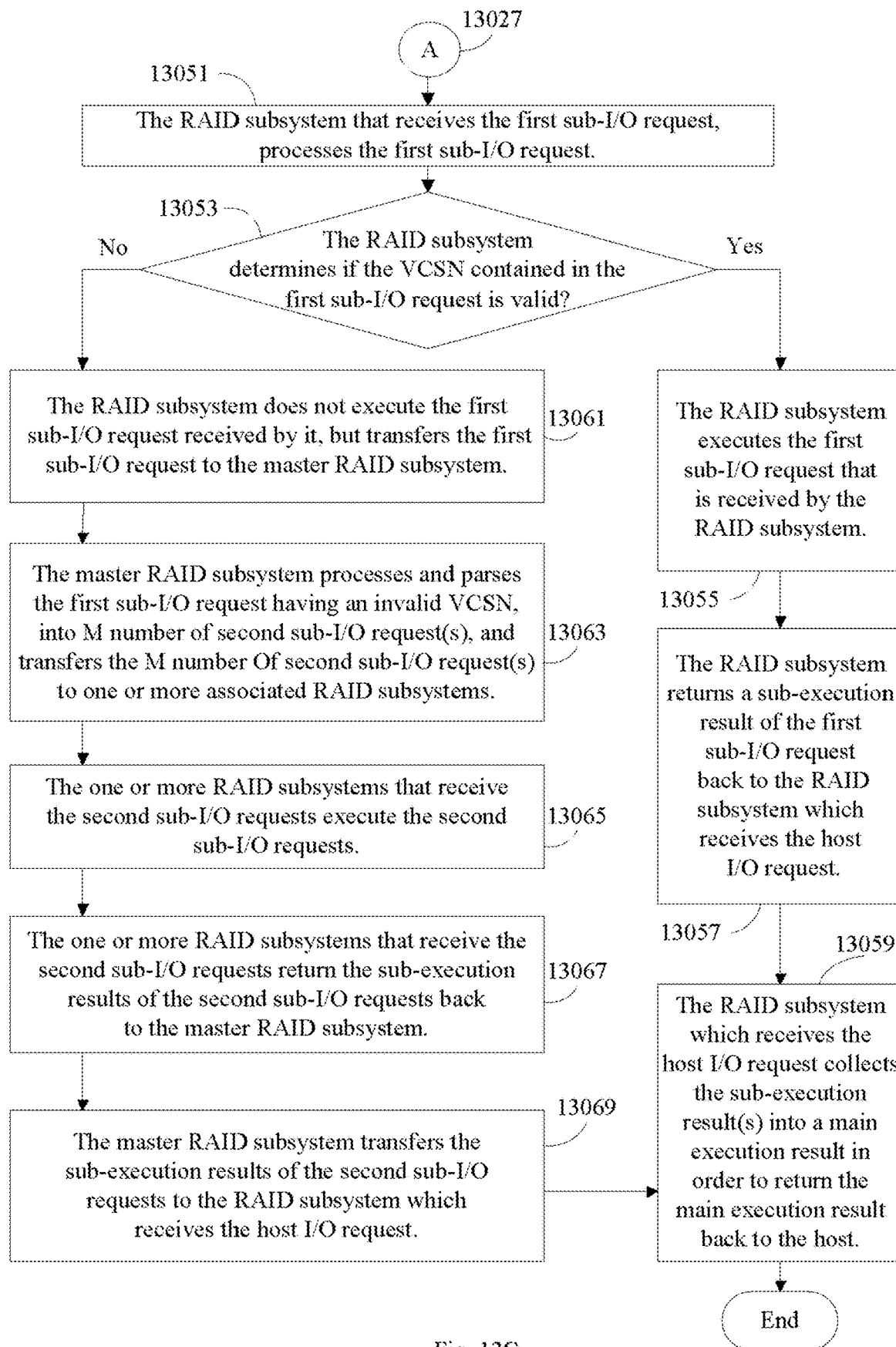
FIG. 13C is the second part of the flowchart of the second and seventh embodiments about how to execute a data access load balance function in the storage system architecture according to one embodiment of the present invention.

Please refer to FIGS. 13A and 13C, which show the second embodiment of the present invention that uses the VCSN to implement the I/O request validity verification method, where FIG. 13A is the first flowchart of the second embodiment for performing the data access load balance function in the storage system architecture of the present invention; FIG. 13C is the second flowchart of the second embodiment for performing the data access load balance function in the storage system architecture of the present invention. FIG. 13A and FIG. 13C, respectively illustrating the first and the second flowcharts of the second embodiment, together explain the second embodiment about how to perform the data access load balance function in the storage system architecture of the present invention. Because the first flowchart of the second embodiment and the first flowchart of the first embodiment are the same and already illustrated in FIG. 13A, please refer to the aforesaid detailed descriptions regarding FIG. 13A for the details of the first flowchart of the second embodiment and it will not be repeated here. Therefore, only the second flowchart of the second embodiment shown in FIG. 13C, which is different from the first embodiment, will be described below. Likewise, after step 13025 in FIG. 13A, the host I/O request is parsed into N number of first sub-I/O request(s), and the first sub-I/O request(s) is(are) transferred to associated RAID subsystem(s) for further processing. Next, the process flow enters FIG. 13C through note A (step 13027 in FIG. 13A and FIG. 13C). As the above mentioned, because the N number of the first sub-I/O request(s) is(are) respectively transferred to the associated RAID subsystem(s) for further processing, there might be one or more processing procedures each corresponding to a first sub-I/O request that are processed in a parallel manner, and FIG. 13C (step 13051 to step 13069) only describes one of the processing procedures for one of the first sub-I/O request(s). Please refer to FIG. 13C. When one of the associated RAID subsystems receives the first sub-I/O request, the RAID subsystem that receives the first sub-I/O request will process the first sub-I/O request (step 13051). The RAID subsystem will first determine the validity of the VCSN comprised in the first sub-I/O request received by the RAID subsystem (step 13053). If it is determined by the RAID subsystem that the VCSN comprised in the first sub-I/O request is valid, the RAID subsystem will execute the first sub-I/O request received by the RAID subsystem (step 13055), and then the RAID subsystem will return a sub-execution result of the first sub-I/O request back to the RAID subsystem 30B that receives the host I/O request (step 13057), so that the RAID subsystem 30B can collect the sub-execution result into a main execution result in order to return the main execution result of the host I/O request to the host 10 (step 13059).

Please refer to FIG. 13C again. On the contrary, if in step 13053 it is determined that the VCSN comprised in the first sub-I/O request received by the RAID subsystem is invalid, the RAID subsystem will not execute the first sub-I/O request received by it, but transfers the first sub-I/O request to the master RAID subsystem (the RAID subsystem 30A) (step 13061). Then, the master RAID subsystem (the RAID subsystem 30A) will process and parse, according to the V2P table (virtual-to-physical section index mapping table), the first sub-I/O request having an invalid VCSN, into M number of second sub-I/O request(s), and transfer the M number of second sub-I/O request(s) to one or more associated RAID subsystems (step 13063) for further execution. The one or more associated RAID subsystems that receive the second sub-I/O requests execute the second sub-I/O requests (step 13065), and then the RAID subsystems will return one or more sub-execution results of the second sub-I/O request(s), back to the master RAID subsystem (the RAID subsystem 30A) (step 13067). Next, the master RAID subsystem (the RAID subsystem 30A) collects and returns the sub-execution result(s) of the second sub-I/O request(s) received by it, back to RAID subsystem (the RAID subsystem 30B) that receives the host I/O request (step 13069), so that the RAID subsystem that receives the host I/O request (the RAID subsystem 30B) can return a main execution result back to the host 10 by collecting the sub-execution results of the second sub-I/O request(s) (step 13059). For example, according to one embodiment of the present invention, the host I/O request is parsed into three first sub-I/O requests including a first sub-I/O request 1, a first sub-I/O request 2 and a first sub-I/O request 3 by the RAID subsystem 30B which receives the host I/O request, and then the first sub-I/O request 1, the first sub-request 2 and the first sub-request 3 are respectively transferred to the RAID subsystem 30A (the master RAID subsystem), the RAID subsystem 30B (the slave subsystem), and the RAID subsystem 30C (the slave RAID subsystem). In case the RAID subsystem 30C (the slave RAID subsystem) determines that the VCSN comprised in the first sub-I/O request 3 is invalid. Therefore, the RAID subsystem 30C (the slave RAID subsystem) will not execute the first sub-I/O request 3 received by it, but transfers the first sub-I/O request 3 to the RAID subsystem 30A (the master RAID subsystem) (as step 13061 shown in FIG. 13 C). The RAID subsystem 30A (the master RAID subsystem) processes and parses, according to the V2P table (virtual-to-physical section index mapping table), the first sub-I/O request 3 into at least one second sub-I/O request 3, and then transfers the at least one second sub-I/O request 3 to the associated RAID subsystem(s) (for example, the RAID subsystem 30B) (step 13063). Afterwards, one of the associated RAID subsystem(s) (for example, the RAID subsystem 30B) that receives the second sub-I/O request 3, executes the second sub-I/O request 3 (step 13065). After the execution is complete, the RAID subsystem (for example, the RAID subsystem 30B) that receives the second sub-I/O request 3, returns a sub-execution result of the second sub-I/O request 3, back to the RAID subsystem 30A (the master RAID subsystem) (step 13067). The RAID subsystem 30A (the master RAID subsystem) returns the sub-execution result of the second sub-I/O request 3, back to the RAID subsystem 30B that receives the host I/O request. Moreover, because the host I/O request is parsed into the first sub-I/O request 1, the first sub-I/O request 2, and the first sub-request 3 (step 13025) by the RAID subsystem 30B (the slave RAID subsystem), the RAID subsystem 30A that receives the first sub-I/O request 1 with a valid VCSN and the RAID subsystem 30B that receives the first sub-I/O request 2 with a valid VCSN, both will respectively execute the first sub-I/O request 1 and the first sub-I/O request 2 (step 13055) in parallel, and respectively return their execution results of the first sub-I/O request 1 and the first sub-I/O request 2, back to the RAID subsystem 30B that receives the host I/O request (step 13057). Last, the RAID subsystem 30B that receives the host I/O request collects all sub-execution results of the first sub-I/O request 1, the first sub-I/O request 2, and the first sub-I/O request 3, into a main execution result and returns the main execution result back to the host 10 in response to the host I/O request (step 13059).

Figure 13D:
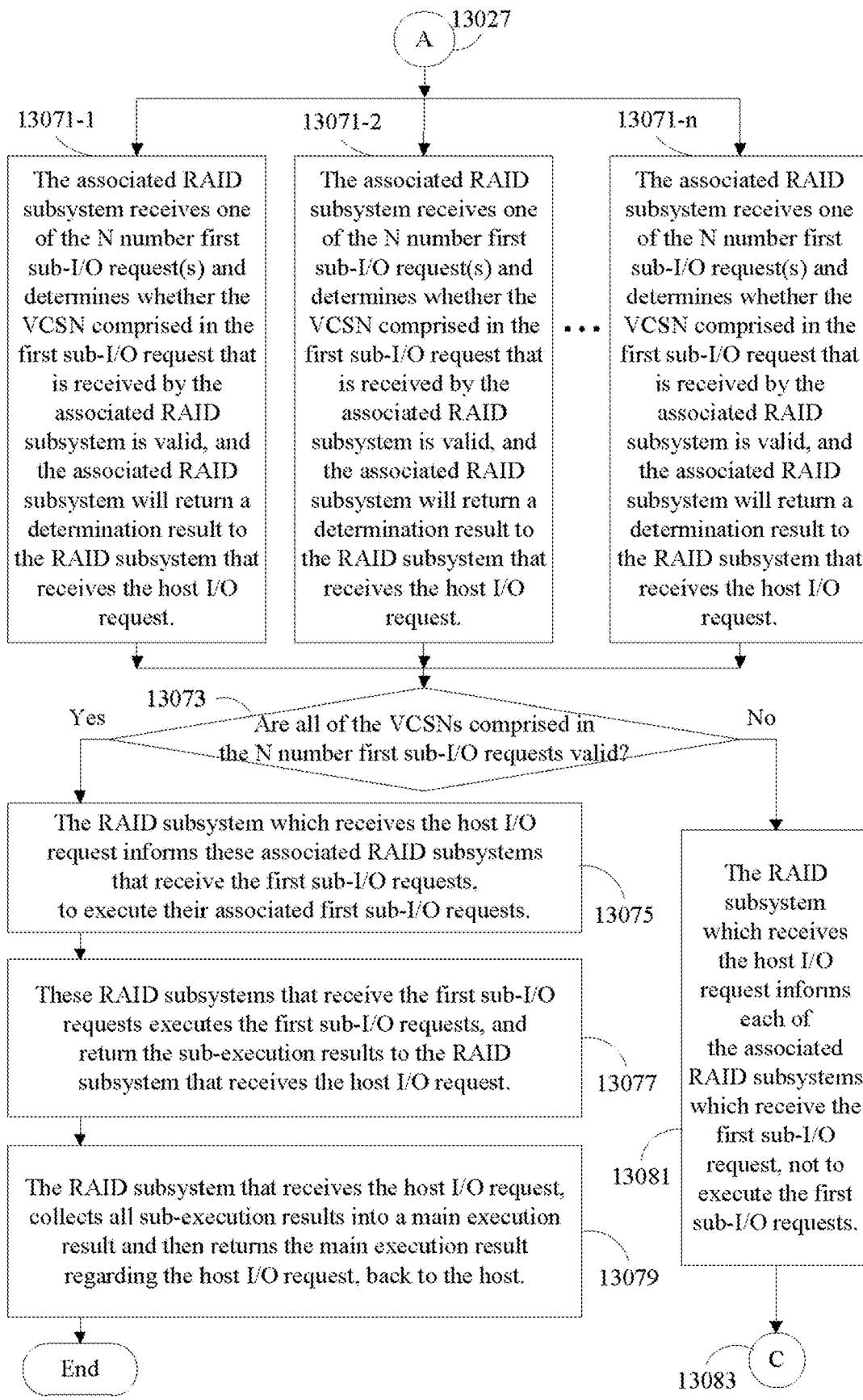
FIG. 13D is the second part of the flowchart of the third, fourth, fifth, eighth, ninth, and tenth embodiments about how to execute a data access load balance function in the storage system architecture according to one embodiment of the present invention.
Figure 13E:
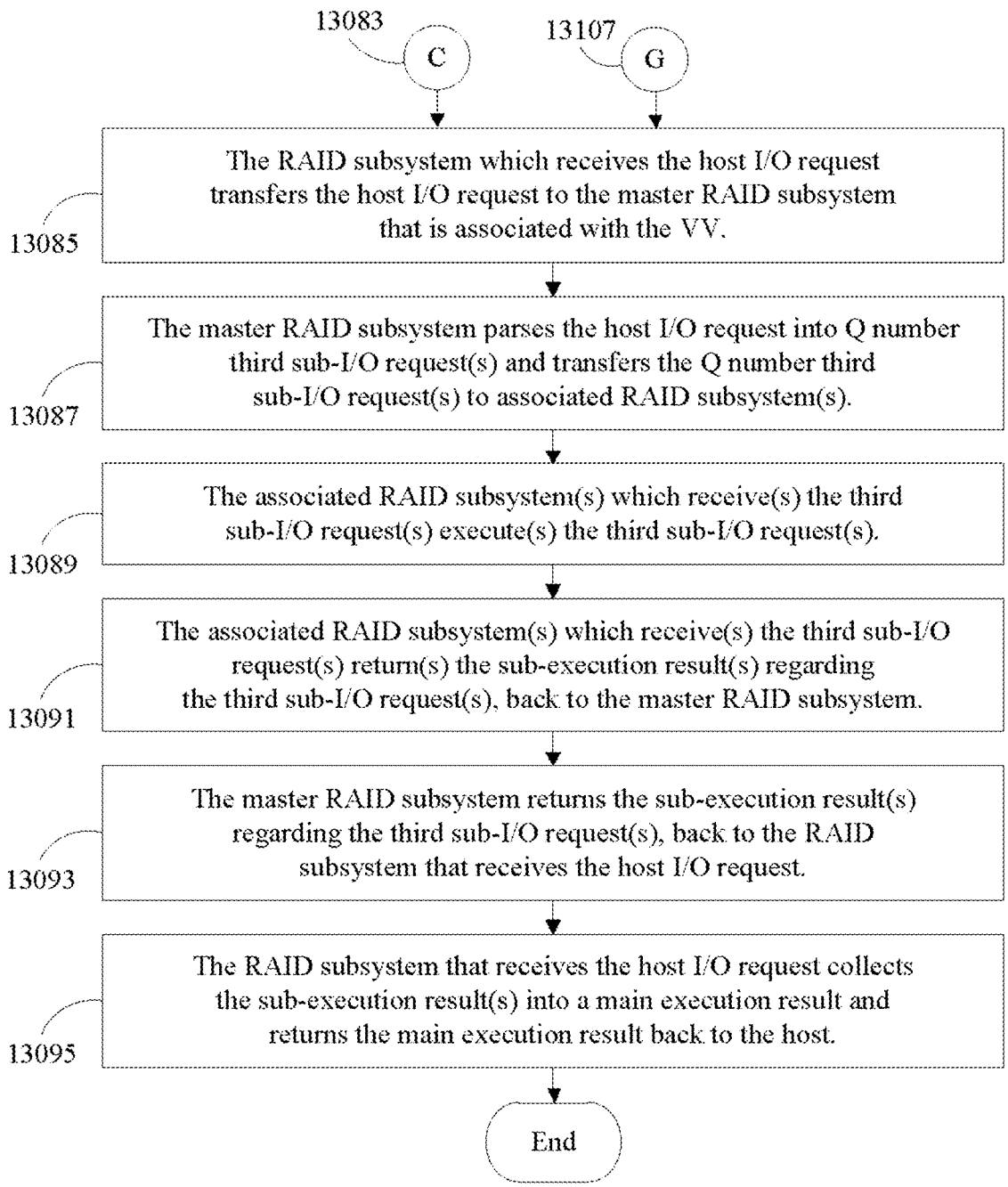
FIG. 13E is the third part of the flowchart of the third and eighth embodiments and the fourth part of the flowchart of the fifth and tenth embodiments about how to execute a data access load balance function in the storage system architecture according to one embodiment of the present invention.

Please refer to FIG. 13A, FIG. 13D, and FIG. 13E, which show the third embodiment of the present invention that uses the VCSN to implement the I/O request validity verification method, where FIG. 13A is the first flowchart of the third embodiment for performing the data access load balance function in the storage system architecture of the present invention; FIG. 13D is the second flowchart of the third embodiment for performing the data access load balance function in the storage system architecture of the present invention; FIG. 13E is the third flowchart of the third embodiment for performing the data access load balance function in the storage system architecture of the present invention. FIG. 13A, FIG. 13D, and FIG. 13E, respectively illustrating the first, the second, and the third flowcharts of the third embodiment, together explain the third embodiment about how to perform the data access load balance function in the storage system architecture of the present invention. Because the first flowchart of the third embodiment and the first flowchart of the first embodiment are the same and already illustrated in FIG. 13A, please refer to the aforesaid detailed descriptions regarding FIG. 13A for details of the first flowchart of the third embodiment and it will not be repeated here. Therefore, only the second flowchart (FIG. 13D) and the third flowchart (FIG. 13E) of the third embodiment, both of which are different from the first embodiment, will be further explained below. After the above-mentioned step 13025 of FIG. 13A, the process flow enters into the flowchart of FIG. 13D through node A (step 13027). In the embodiment of FIG. 13D, one or more procedures each associated with a first sub-I/O request are executed in parallel. Step 13071-1 to step 13071-n show the one or more procedures executed in parallel, each of which is respectively associated with one of the N number first sub-I/O request(s) (for example, the first sub-I/O request 1, the first sub-I/O request 2, the first sub-I/O request n). In each of the procedures executed in parallel, associated RAID subsystem receives one of the N number first sub-I/O requests and then determines whether the VCSN comprised in the first sub-I/O request that is received by the associated RAID subsystem is valid or not, where the number of n shown in FIG. 13D is equal to N in FIG. 13A. The associated RAID subsystems (i.e., the RAID subsystem that receives the first sub-I/O request 1, the RAID subsystem that receives the first sub-I/O request 2, . . . and the RAID subsystem that receives the first sub-I/O request n) will determine the validities of the first sub-I/O requests according to the VCSNs comprised in the first sub-I/O requests, and then will return determination results to the RAID subsystem that receives the host I/O request (step 13071-1 to step 13071-n) in order to assist the RAID subsystem that receives the host I/O request in determining the subsequent execution steps (step 13073). If in step 13073, the RAID subsystem determines, according to the determination results sent by the associated RAIDs, that all of the VCSNs comprised in the N number first sub-I/O requests (the first sub-I/O request 1, the first sub-I/O request 2, . . . , the first sub-I/O request n) are all valid, then the RAID subsystem which receives the host I/O request will inform these associated RAID subsystems that receive the first sub-I/O requests, to execute their associated first sub-I/O requests (step 13075). Then these RAID subsystems that receive the first sub-I/O requests will execute the first sub-I/O requests, and return the sub-execution results to the RAID subsystem that receives the host I/O request (step 13077). Then, the RAID subsystem that receives the host I/O request, collects all sub-execution results regarding the N number first sub-I/O requests (the first sub-I/O request 1, the first sub-I/O request 2, . . . , the first sub-I/O request n) into a main execution result regarding the host I/O request, and then returns the main execution result regarding the host I/O request, back to the host 10 (step 13079).

Please refer to FIG. 13D and FIG. 13E. If in step 13073, the RAID subsystem that receives the host I/O request determines, through the determination results sent by all the associated RAID subsystems, that at least one of the VCSNs of the N number first sub-I/O requests (the first sub-I/O request 1, the first sub-request 2, . . . , the first sub-request n) is determined to be invalid, and then the RAID subsystem which receives the host I/O request will inform each of the associated RAID subsystems (which receive the first sub-I/O request, for example) not to execute the first sub-I/O requests (step 13081). Next, the process flow enters, through node C (step 13083), into FIG. 13E (step 13083) that shows the third flowchart of the third embodiment. In the above step 13081, since the RAID subsystem that receives the host I/O request informs all associated RAID subsystems (i.e., the RAID subsystems receiving the first sub-I/O requests) not to execute the first sub-I/O requests, all these associated RAID subsystems (i.e., the RAID subsystems receiving the first sub-I/O request) will not execute the first sub-I/O requests. Instead, the RAID subsystem which receives the host I/O request transfers the host I/O request to the master RAID subsystem (the RAID subsystem 30A) that is associated with the VV targeted by the host I/O request (step 13085). The master RAID subsystem (the RAID subsystem 30A) parses the host I/O request into Q number third sub-I/O request(s) (for example, the third sub-I/O request 1, the third sub-I/O request 2, . . . , the third sub-I/O request q), and then will transfer the Q number third sub-I/O requests (for example, the third sub-I/O request 1, the third sub-I/O request 2, . . . , the third sub-I/O request q) to associated RAID subsystems (step 13087) in order to request the associated RAID subsystems (i.e., the RAID subsystems receiving the third sub-I/O requests) that are associated with the Q number third sub-I/O requests (for example, the third sub-I/O request 1, the third sub-I/O request 2, . . . , the third sub-request q) to execute the associated third sub-I/O requests (for example, the third sub-I/O request 1, the third sub-request 2, . . . , the third sub-request q) (step 13089), where the number of "q" shown with the third sub-I/O requests is equal to Q shown in FIG. 13E. Next, these associated RAID subsystems (i.e., the RAID subsystems which receive the third sub-I/O requests) return sub-execution results, back to the master subsystem (the RAID subsystem 30A) (step 13091). Then the master RAID subsystem (the RAID subsystem 30A) collects and returns the sub-execution results regarding the Q number sub-I/O requests (for example, the third sub-I/O request 1, the third sub-I/O request 2, . . . , the third sub-I/O request q) back to the RAID subsystem 30 that receives the host I/O request (step 13093). Last, the RAID subsystem that receives the host I/O request collects the sub-execution results into a main execution result and returns the main execution result back to the host 10 (step 13095). For example, according to one embodiment of the present invention, the host I/O request is received by the RAID subsystem 30B and then is parsed into the first sub-I/O request 1, the first sub-I/O request 2, and the first sub-I/O request 3. The first sub-I/O request 1, the first sub-I/O request 2, and the first sub-I/O request 3 are respectively transferred to the RAID subsystem 30A (the master RAID subsystem), the RAID subsystem 30B (the slave RAID subsystem), and the RAID subsystem 30C (the slave RAID subsystem), and then the RAID subsystem 30A, the RAID subsystem B and the RAID subsystem 30C determine whether or not the VCSNs comprised in the first sub-I/O request 1, the first sub-I/O request 2, and the first sub-I/O request 3 are valid. In the example, if the RAID subsystem 30C determines that the VCSN comprised in the first sub-I/O request 3 is invalid, the RAID subsystem 30C will return the invalid determination result back to the RAID subsystem 30B (i.e., the RAID subsystem receiving the host I/O request) (step 13071-1 to step 13071-*n*); therefore, the RAID subsystem 30B (i.e., the RAID subsystem receiving the host I/O request) informs all of the RAID subsystem 30A, 30B and 30C, which are associated with the first sub-I/O request, not to execute the first sub-I/O request 1, the first sub-I/O request 2, and the first sub-I/O request 3 received by the RAID subsystem 30A, 30B and 30C (step 13081). Instead, the RAID subsystem 30B (i.e., the RAID subsystem receiving the host I/O request) transfers the host I/O request to the RAID subsystem 30A (the master RAID subsystem) (step 13085 in FIG. 13 E). The RAID subsystem 30A (the master RAID subsystem) parses the host I/O request into a third sub-I/O request 1, a third sub-I/O request 2, and a third sub-I/O request 3 according to a V2P table that is stored in the virtualization layer 302A, and then the RAID subsystem 30A transfers the three third sub-I/O request respectively to the RAID subsystems 30A, 30B and 30C (step 13087 in FIG. 13E) for executing the three third sub-I/O requests (step 13089 in FIG. 13E). After executing the third sub-I/O request 1, the third sub-I/O request 2, and the third sub-I/O request 3, the RAID subsystems 30A, 30B and 30C return the sub-execution results (one of which is the sub-execution result generated by the RAID subsystem 30B when processing the third sub-I/O request 2) back to the master RAID subsystem (the RAID subsystem 30A) (step 13091 in FIG. 13E). Next, the master RAID subsystem (the RAID subsystem 30A) returns the sub-execution results regarding the third sub-I/O request 1, the third sub-request 2, and the third sub-I/O request 3 back to the RAID subsystem 30B that receives the host I/O request (step 13093 in FIG. 13E). Last, the RAID subsystem 30B that receives the host I/O request, returns an execution result regarding the host I/O request back to the host according to the sub-execution results from the master RAID subsystem (step 13095 in FIG. 13E).

Figure 13F:
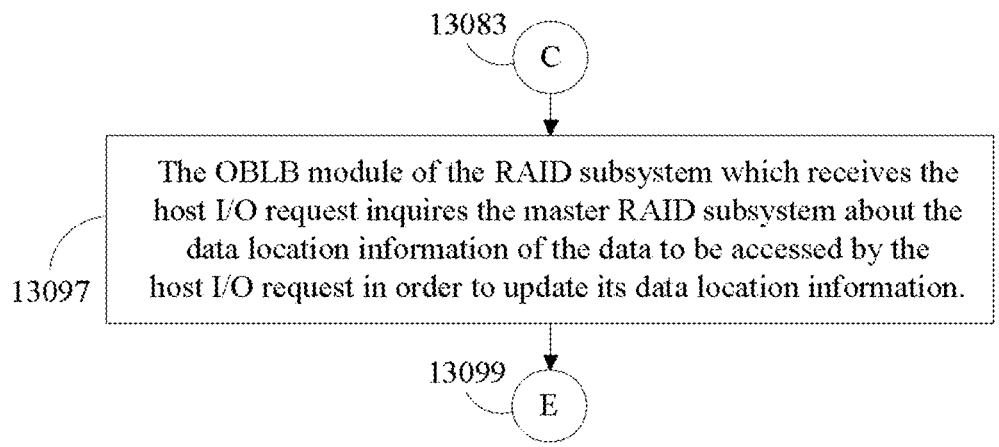
FIG. 13F is the third part of the flowchart of the fourth and ninth embodiments about how to execute a data access load balance function in the storage system architecture according to one embodiment of the present invention.

Please refer to FIG. 13A, FIG. 13D, and FIG. 13F, which show the fourth embodiment of the present invention that uses the VCSN to implement the I/O request validity verification method, where FIG. 13A is the first flowchart of the fourth embodiment for performing the data access load balance function in the storage system architecture of the present invention; FIG. 13D is the second flowchart of the fourth embodiment for performing the data access load balance function in the storage system architecture of the present invention; FIG. 13F is the third flowchart of the fourth embodiment for performing the data access load balance function in the storage system architecture of the present invention. FIG. 13A, FIG. 13D, and FIG. 13F, respectively illustrating the first, the second, and the third flowcharts of the fourth embodiment, together explain the fourth embodiment about how to perform the data access load balance function in the storage system architecture of the present invention. Because the first flowchart of the fourth embodiment and the first flowchart of the first embodiment both are the same and already illustrated in FIG. 13A, and because the second flowchart of the fourth embodiment and the second flowchart of the third embodiment both are the same and already illustrated in FIG. 13D, as to the detailed descriptions regarding the first flowchart and the second flowchart of the fourth embodiment, please refer to the above detailed descriptions regarding FIGS. 13A and 13D, which will not be repeated here. Therefore, only the third flowchart (FIG. 13F) of the fourth embodiment will be explained below. Please refer to FIG. 13D and FIG. 13F. After step 13083 in FIG. 13D described above, the process flow enters into FIG. 13F, which is the third flowchart of the fourth embodiment, through node C in order to perform the subsequent operations. In step 13081 of FIG. 13D, the RAID subsystem 30B (i.e., the RAID subsystem receiving the host I/O request) informs all of the associated RAID subsystems (i.e., the RAID subsystems receiving the first sub-I/O requests) not to execute the first sub-I/O requests. In this situation, the OBLB module (or other module) of the RAID subsystem 30B (i.e., the RAID subsystem receiving the host I/O request) inquires the RAID subsystem 30A (the master RAID subsystem) about the data location information of the data to be accessed by the host I/O request in order to update its DLT in the OBLB module (step 13097). Afterwards, the process flow goes back, through node E (step 13099) in FIG. 13F, to FIG. 13A which is the first flowchart of the fourth embodiment, so as to execute the subsequent steps.

Figure 13G:
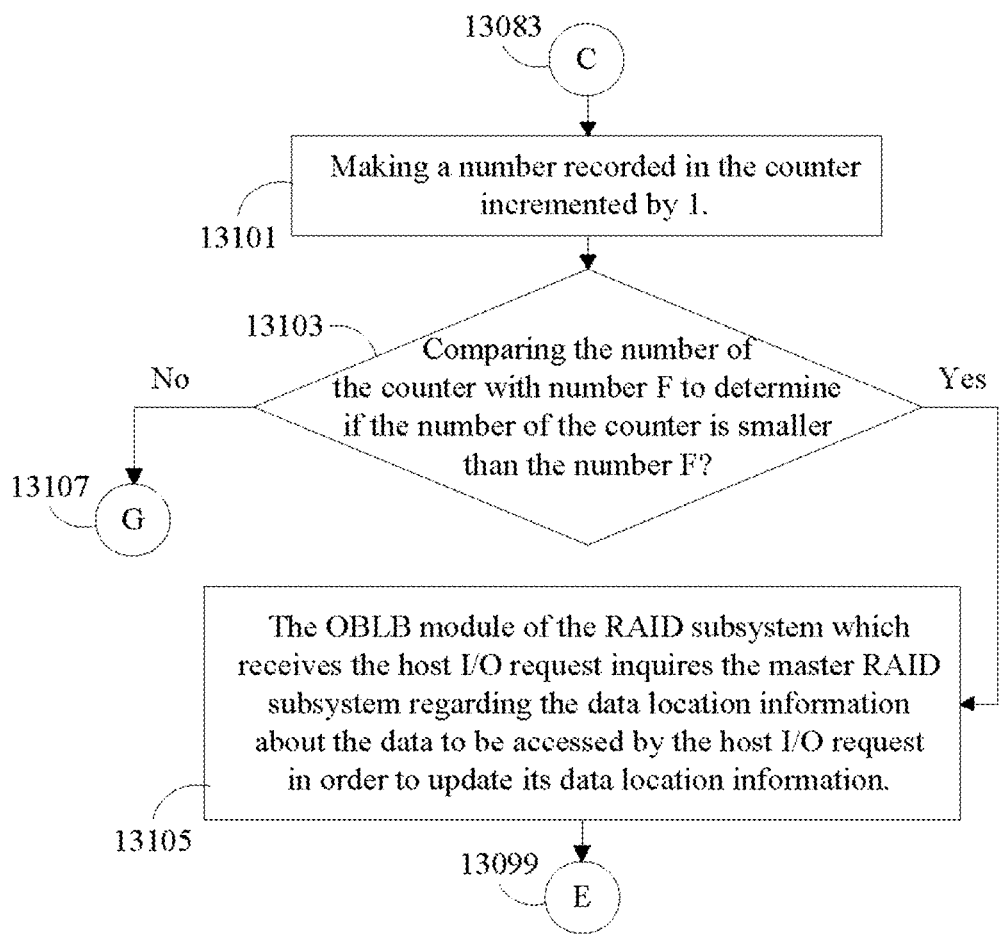
FIG. 13G is the third part of the flowchart of the fifth and ninth embodiments about how to execute a data access load balance function in the storage system architecture according to one embodiment of the present invention.

Please refer to FIG. 13A, FIG. 13D, FIG. 13E, and FIG. 13G which show the fifth embodiment of the present invention that uses the VCSN to implement the I/O request validity verification method, where FIG. 13A is the first flowchart of the fifth embodiment for performing the data access load balance function in the storage system architecture of the present invention; FIG. 13D is the second flowchart of the fifth embodiment for performing the data access load balance function in the storage system architecture of the present invention; FIG. 13G is the third flowchart of the fifth embodiment for performing the data access load balance function in the storage system architecture of the present invention; FIG. 13E is the fourth flowchart of the fifth embodiment for performing the data access load balance function in the storage system architecture of the present invention. FIG. 13A, FIG. 13D, FIG. 13G and FIG. 13E, respectively illustrating the first, the second, the third, and the fourth flowcharts of the fifth embodiment, together explain the fifth embodiment about how to perform the data access load balance function in the storage system architecture of the present invention. Because the first flowchart of the fifth embodiment and the first flowchart of the first embodiment both are the same and already illustrated in FIG. 13A, and because the second flowchart of the fifth embodiment and the second flowchart of the third embodiment both are the same and already illustrated in FIG. 13D, and because the fourth flowchart of the fifth embodiment and the third flowchart of the third embodiment both are the same and already illustrated in FIG. 13E, regarding the detailed descriptions of the first flowchart, the second flowchart and the fourth flowchart of the fifth embodiment, please refer to the above descriptions regarding FIG. 13A, FIG. 13D and FIG. 13E, which will not be repeated here. Therefore, only FIG. 13G of the third flowchart of the fifth embodiment will be explained below. In the fifth embodiment, the RAID subsystem that receives the host I/O request (the RAID subsystem 30B) further includes a counter for counting how many times of step 13081 in FIG. 13D are executed. Please refer to FIG. 13D and FIG. 13G. After step 13083 in FIG. 13D described above, the process flow enters into the third flowchart of the fifth embodiment through node C so as to execute the subsequent steps. In this embodiment, the RAID subsystem 30B (i.e., the RAID subsystem receiving the host I/O request) make a number recorded in the counter incremented by 1, and then compare the number with a number F (step 13103). If the comparison made in step 13103 shows that the number recorded in the counter is smaller than the number F, then the OBLB module 40B (or other modules) of the RAID subsystem 30B (i.e., the RAID subsystem receiving the host I/O request) will inquire the RAID subsystem 30A (the master RAID subsystem) regarding the data location information about the data to be accessed by the host I/O request in order to update its DLT in the OBLB module 40 (step 13105). Afterwards, through node E (step 13099), the process flow goes back to FIG. 13A which is the first flowchart of the fifth embodiment, in order to execute the subsequent steps. If the comparison made in step 13103 shows that the number recorded in the counter is not smaller than (larger than or equal to) the number F, through node G (step 13107), the process flow enters FIG. 13E which is the fourth flowchart of the fifth embodiment, in order to execute the subsequent steps. According to one embodiment of the present invention, the number F can be 1 or any other integer larger than 1. For example, if the number F is 3, it means that step 13081 in FIG. 13D is allowed to be executed for 3 times.

Figure 14:
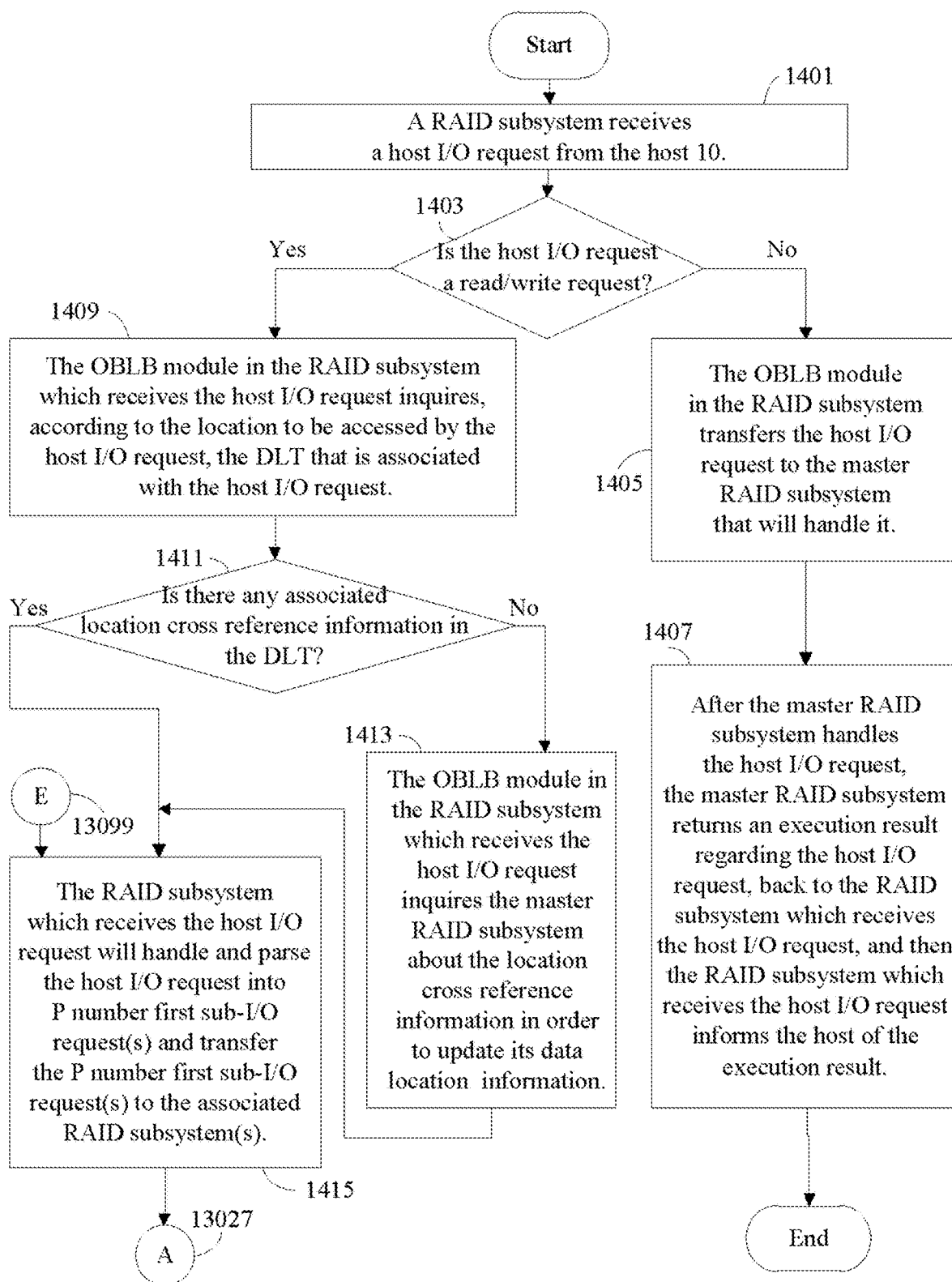
FIG. 14 is the first part of the flowchart of the sixth, seventh, eighth, ninth and tenth embodiments about how to execute a data access load balance function in the storage system architecture according to one embodiment of the present invention.

Please refer to FIG. 14 and FIG. 13B which show the sixth embodiment of the present invention that uses the VCSN to implement the I/O request validity verification method, where FIG. 14 is the first flowchart of the sixth embodiment for executing the data access load balance function in the storage system architecture of the present invention; FIG. 13B is the second flowchart of the sixth embodiment for executing the data access load balance function in the storage system architecture of the present invention. FIG. 14 and FIG. 13B, respectively illustrating the first and the second flowcharts of the sixth embodiment, together explain the sixth embodiment about how to execute the data access load balance function in the storage system architecture of the present invention. Because the second flowchart of the sixth embodiment and the second flowchart of the first embodiment both are the same and already illustrated in FIG. 13B, regarding the detailed descriptions of the second flowchart of the sixth embodiment, please refer to the above descriptions regarding FIG. 13B, which will not be repeated here. Therefore, only the first flowchart of FIG. 14 of the sixth embodiment will be explained below. Take the storage system architecture 3 for example to explain the sixth embodiment. According to one embodiment of the present invention, when the RAID subsystem 30B (i.e., the RAID subsystem receiving the host I/O request) receives a host I/O request (for example, a SCSI command) from the host 10 (step 1401), the RAID subsystem 30B will determine if the host I/O request is an access command (for example, a read command or a write command) (step 1403). If the host I/O request is not a read/write command, the OBLB module in the RAID subsystem 30B (i.e., the RAID subsystem receiving the host I/O request) will transfer the host I/O request to the RAID subsystem 30A (the master RAID subsystem), and the RAID subsystem 30A (the master RAID subsystem) will handle it (step 1405). After the RAID subsystem 30A (the master RAID subsystem) handles the host I/O request, the RAID subsystem 30A will return an execution result regarding the host I/O request, back to the RAID subsystem 30B (i.e., the RAID subsystem receiving the host I/O request), and then the RAID subsystem 30B (i.e., the RAID subsystem receiving the host I/O request) will inform the host 10 of the execution result (step 1407). On the other hand, if the host I/O request is a read/write command, the OBLB module 40B in the RAID subsystem 30B (i.e., the RAID subsystem receiving the host I/O request) will inquire the related DLT according to the host I/O request (step 1409), in order to determine if the data location information recorded in the DLT has the location cross reference information that is associated with the host I/O request (step 1411). If in the data location information recorded in the DLT of the RAID subsystem 30B (i.e., the RAID subsystem receiving the host I/O request), there is no the location cross reference information that is associated with the host I/O request, the OBLB module 40B (or other modules) in the RAID subsystem 30B (i.e., the RAID subsystem receiving the host I/O request) will inquire the RAID subsystem 30A (the master RAID subsystem) about the location cross reference information in order to update its data location information in the DLT (step 1413). Then, the RAID subsystem 30B (i.e., the RAID subsystem receiving the host I/O request) will handle and parse, according to the updated data location information in the DLT, the host I/O request into P number first sub-I/O request(s) and transfer the P number first sub-I/O request(s) to the associated RAID subsystem(s) (step 1415). On the other hand, if there is the location cross reference information that is associated with the host I/O request, in the data location information in the DLT of the RAID subsystem 30B (i.e., the RAID subsystem receiving the host I/O request), the RAID subsystem 30B (i.e., the RAID subsystem receiving the host I/O request) will directly handle and parse the host I/O request into the P number first sub-I/O request(s) and transfer the P number first sub-I/O request(s) to the associated RAID subsystem(s) (step 1415). Next, followed by the step 1415, the process flow enters into FIG. 13B through node A (step 13027) in order to execute the process shown in FIG. 13B. In addition, because the process of FIG. 13B, which is the second flowchart of the sixth embodiment, has already been explained above when introducing the first embodiment, please refer to the aforementioned descriptions regarding FIG. 13B and it will not be repeated here.

Please refer to FIG. 14 and FIG. 13C which show the seventh embodiment of the present invention that uses the VCSN to implement the I/O request validity verification method, where FIG. 14 is the first flowchart of the seventh embodiment for executing the data access load balance function; FIG. 13C is the second flowchart of the seventh embodiment for executing the data access load balance function. FIG. 14 and FIG. 13C, respectively illustrating the first and the second flowcharts of the seventh embodiment, together explain the seventh embodiment about how to perform the data access load balance function. Because the first flowchart of the seventh embodiment and the first flowchart of the sixth embodiment are the same and already illustrated in FIG. 14, and because the second flowchart of the seventh embodiment and the second flowchart of the second embodiment are the same and already illustrated in FIG. 13C, regarding the detailed descriptions of the first flowchart and the second flowchart of the seventh embodiment, please refer to above descriptions of FIG. 14 and FIG. 13C, which will not be repeated here.

Please refer to FIG. 14, FIG. 13D and FIG. 13E which show the eighth embodiment of the present invention that uses the VCSN to implement the I/O request validity verification method, where FIG. 14 is the first flowchart of the eighth embodiment for executing the data access load balance function; FIG. 13D is the second flowchart of the eighth embodiment for executing the data access load balance function; FIG. 13E is the third flowchart of the eighth embodiment for executing the data access load balance function in the storage system architecture of the present invention. FIG. 14, FIG. 13D and FIG. 13E, respectively illustrating the first, the second, and the third flowcharts of the eighth embodiment, together explain the eighth embodiment about how to perform the data access load balance function. Because the first flowchart of the eighth embodiment and the first flowchart of the sixth embodiment are the same and already illustrated in FIG. 14, and because the second flowchart of the eighth embodiment and the second flowchart of the third embodiment are the same and already illustrated in FIG. 13D and because the third flowchart of the eighth embodiment and the third flowchart of the third embodiment are the same and already illustrated in FIG. 13E, regarding the detailed descriptions of the first flowchart, the second flowchart, and the third flowchart of the eighth embodiment, please refer to above descriptions of FIG. 14, FIG. 13C, and FIG. 13E which will not be repeated here.

Please refer to FIG. 14, FIG. 13D and FIG. 13F which show the ninth embodiment of the present invention that uses the VCSN to implement the I/O request validity verification method, where FIG. 14 is the first flowchart of the ninth embodiment for executing the data access load balance function; FIG. 13D is the second flowchart of the ninth embodiment for executing the data access load balance function; FIG. 13F is the third flowchart of the ninth embodiment for executing the data access load balance function in the storage system architecture of the present invention. FIG. 14, FIG. 13D and FIG. 13F, respectively illustrating the first, the second, and the third flowcharts of the ninth embodiment, together explain the ninth embodiment about how to perform the data access load balance function in the storage system architecture of the present invention. Because the first flowchart of the ninth embodiment and the first flowchart of the sixth embodiment are the same and already illustrated in FIG. 14, and because the second flowchart of the ninth embodiment and the second flowchart of the third embodiment are the same and already illustrated in FIG. 13D, and because the third flowchart of the ninth embodiment and the third flowchart of the fourth embodiment are the same and already illustrated in FIG. 13F, regarding the descriptions of the first flowchart, the second flowchart, and the third flowchart of the ninth embodiment, please refer to above descriptions of FIG. 14, FIG. 13D, and FIG. 13F, which will not be repeated here.

Please refer to FIG. 14, FIG. 13D, FIG. 13E, and FIG. 13G which show the tenth embodiment of the present invention that uses the VCSN to implement the I/O request validity verification method, where FIG. 14 is the first flowchart of the tenth embodiment for executing the data access load balance function; FIG. 13D is the second flowchart of the tenth embodiment for executing the data access load balance function; FIG. 13G is the third flowchart of the tenth embodiment for executing the data access load balance function; FIG. 13E is the fourth flowchart of the tenth embodiment for executing the data access load balance function in the storage system architecture of the present invention. FIG. 14, FIG. 13D, FIG. 13G, and FIG. 13E, respectively illustrating the first, the second, the third, and the fourth flowchart of the tenth embodiment, together explain the tenth embodiment about how to perform the data access load balance function in the storage system architecture of the present invention. Because the first flowchart of the tenth embodiment and the first flowchart of the sixth embodiment are the same and already illustrated in FIG. 14, and because the second flowchart of the tenth embodiment and the second flowchart of the third embodiment are the same and already illustrated in FIG. 13D, and because the third flowchart of the tenth embodiment and the third flowchart of the fifth embodiment are the same and already illustrated in FIG. 13G, and because the fourth flowchart of the tenth embodiment and the third flowchart of the third embodiment are the same and already illustrated in FIG. 13E, regarding the descriptions of the first flowchart, the second flowchart, the third flowchart, and the fourth flowchart of the tenth embodiment, please refer to the above descriptions of FIG. 14, FIG. 13D, FIG. 13G, and FIG. 13E, which will not be repeated here.

The first, second, third, fourth, fifth, sixth, seventh, eighth, ninth, and tenth embodiments of the present invention fully explain the flexibility of the present invention in implementation and operation. Moreover, the detailed operations for checking the validity of the VCSN (i.e., step 13031 in FIG. 13B, step 13053 in FIG. 13C, and steps 13071-1 to step 13071-*n* in FIG. 13D) of the first, second, third, fourth, fifth, sixth, seventh, eighth, ninth, and tenth embodiments of the present invention will be explained in FIG. 15 and FIG. 16.

From these embodiments, it can be known that the present invention uses a specific implementation, which is about the VCI (for example, the VCSN), in order to achieve the I/O request validity verification method. However, the VCI is not only limited to the VCSN for implementation. Any marking method or naming method that can be used to identify each ME can be used as a method of implementing the VCI. According to one embodiment of the present invention, the VCI can be implemented through a set of alphabets, for example, A, B, C, D, . . . , Z, AA, AB, . . . , AZ, BA, . . . , BZ, CA, . . . , ZA, ZB, . . . , ZZ, AAA, AAB, . . . , ZZZ, AAAA, . . . , ZZZZ, AAAAA, . . . and so on. According to another embodiment of the present invention, the VCI can be implemented through a set of symbols, for example, alpha ($\alpha$), beta, ($\beta$), . . . and so on. According to another embodiment of the present invention, the VCI can be implemented through a set of numbers, for example, the VCSN. According to another embodiment of the present invention, the VCI can be implemented through a combination of at least two sets selected from a set of English alphabets, a set of symbols, and a set of numbers, for example, A0000000, A0000001, A0000002, . . . , A9999999, B0000000, B0000001, . . . and so on, or 00000000A, 00000001A, 00000002A, . . . , 99999999A, 00000000B, 00000001B, . . . and so on, or A000$\alpha$, A001$\alpha$, A002$\alpha$, . . . , A999$\alpha$, A000$\beta$, A001$\beta$, A002$\beta$, . . . , A999–, A000$\gamma$, A999$\gamma$, B000$\alpha$, B001$\alpha$, . . . and so on. Therefore, when one of the RAID subsystems receives a host I/O request from the host 10, the RAID subsystem will parse the host I/O request into at least one sub-I/O request and transfer the at least one sub-I/O request to associated RAID subsystem(s). After the associated RAID subsystem(s) respectively receive(s) one of the at least one sub-I/O request, each of the associated RAID subsystem(s) will compare and determine if the VCI comprised in the sub-I/O request received by it, is consistent with the VCI stored in the ME server module 90 of the associated RAID subsystem. If the determination result is consistent, the associated RAID subsystem will execute the sub-I/O request. On the other hand, if the determination result is not consistent, the associated RAID subsystem will not execute the sub-I/O request but will handle the sub-I/O request according to the implementation about the data access load balance function shown in FIG. 13A to FIG. 13E and FIG. 14.

In addition, because the quantity of available marking or naming ways used to identify the VCI (for example, the VCSN) of the ME is limited, a phenomenon of "wrap around" may happen due to the limited quantity; in other words, a naming expression of the VCI (for example, the VCSN) that has appeared before, will appear again. For example, a four-bit VCSN starts with 0001, and if the maximum value of the VCSNs that corresponds to all LBAs of a ME at time point T0 is 0011, this value will be successively incremented by 1 as any LBA data in the ME is moved. By time point T1, the number of times of moving LBA data in the ME reaches 1101 times, the maximum value of the VCSNs that corresponds to all LBAs in the ME will be 0000. In the above example, the maximum value of the VCSNs that corresponds to all LBAs in the ME at time point T0 (earlier time point) is larger than the maximum value of the VCSNs that corresponds to all LBAs in the ME at time point T1 (later time point). In this way, when the process flow goes into determination step 1501 in FIG. 15 (will be explained later) and into determination step 1603 in FIG. 16 (will be explained later), a misjudgement could happen. Therefore, in order to avoid such a misjudgement in the process flow due to VCSN's "wrap around" phenomenon, each of the VVs of the RAID subsystems is given with a lifetime to the VCI (for example, the VCSN), and the master RAID subsystem of the VVs or the slave RAID subsystems will monitor the VCI (for example, the VCSN) in order to determine if the VCI is in an effective lifetime, where the effective lifetime can be a pre-determined value, and the beginning of the lifetime of the VCI has to be calculated from the time point that the VCI is sent, not from the time point when the response is received. If the master RAID subsystem or the slave RAID subsystems find that the VCI (for example, the VCSN) is not within its effective lifetime, the original VCI will be regarded as invalid and will be updated to a valid VCI (for example, a VCSN). According to one embodiment of the present invention, if at time point T0, the VCSNs that corresponds to LBAs of a ME is expressed in 4 bits, and data migrates 10 times per second, then the effective lifetime of the VCSNs that corresponds to the LBAs of the ME will be some value smaller than $(24)/10$. Therefore, the misjudgement that may happens in step 1501 of FIG. 15 and in step 1603 of FIG. 16** due to the "wrap around" phenomenon can be solved.

Figure 15:
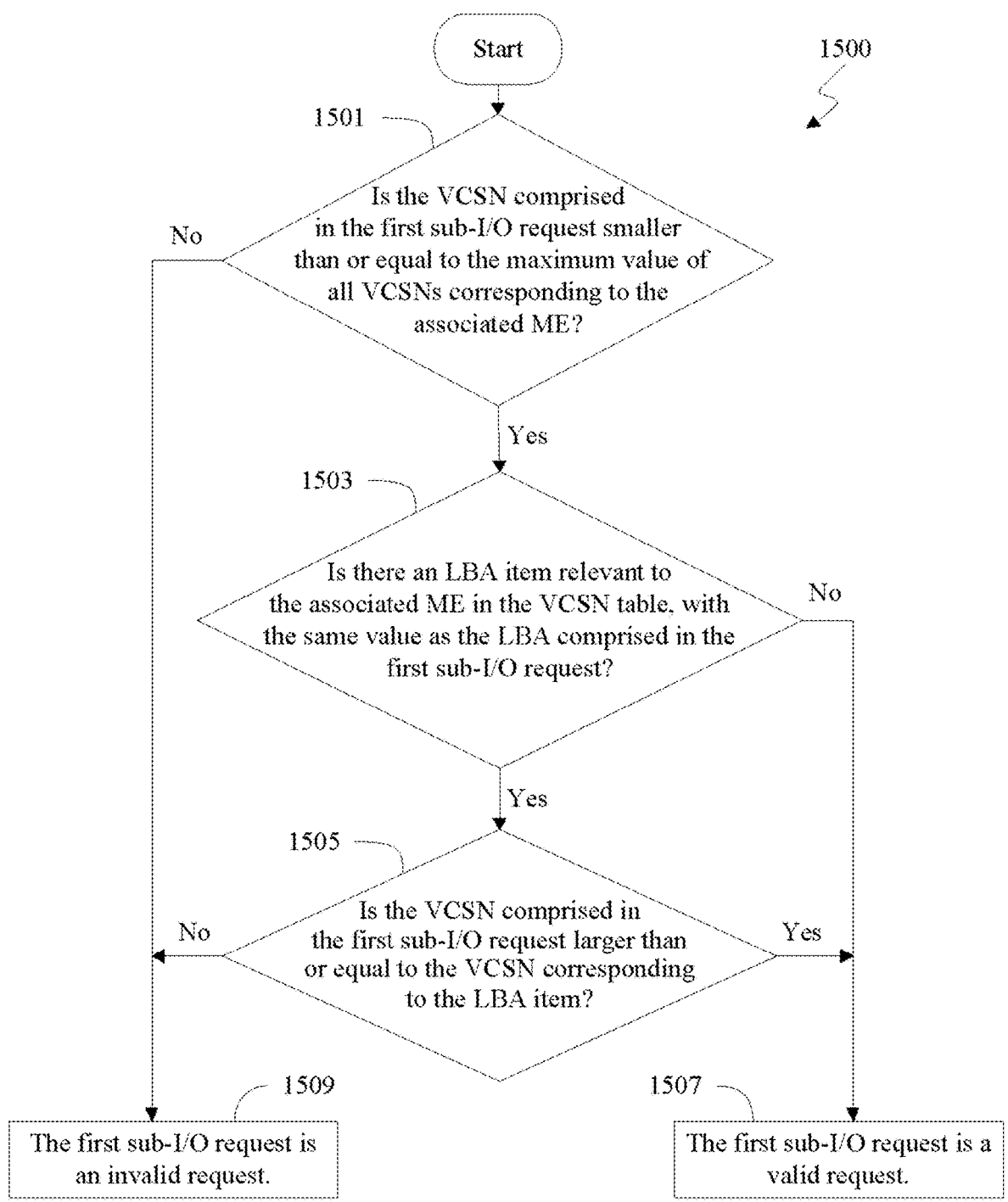
FIG. 15 is the flowchart 1500 about how to verify the validity of sub-I/O requests when performing the data access load balance function in the storage system architecture according to the first embodiment of the present invention.

Please refer to FIG. 15 which shows a flowchart 1500 that illustrates the first embodiment of a sub-I/O request validity verification method for verifying, when performing the data access load balance function, the validity of the VCI (for example, the VCSN) comprised in a sub-I/O request according to the storage system architecture of the present invention. The flowchart 1500 is used to explain the detailed operations in step 13031 of FIG. 13B, in step 13053 of FIG. 13C, in step 13071-1 to step 13071-*n* of FIG. 13D. When a RAID subsystem receives a host I/O request from the host 10 (for example, the RAID subsystem 30B), the RAID subsystem will handle the host I/O request according to the flowchart shown in FIG. 13A or FIG. 14. The host I/O request will be parsed into a first sub-I/O request 1, a first sub-I/O request 2, and a first sub-I/O request 3, and then these first sub-I/O requests will be transferred respectively to the RAID subsystem 30A (the master RAID subsystem), the RAID subsystem 30B (the slave RAID subsystem), and the RAID subsystem 30C (the slave RAID subsystem). When the RAID subsystem 30C receives the first sub-I/O request 3, the ME server module 90C of the RAID subsystem 30C will first interpret the first sub-I/O request 3 so as to know what the associated ME to be accessed by the first sub-I/O request 3 is and to determine if the VCSN comprised in the first sub-I/O request 3 is smaller than or equal to the maximum value of all VCSNs that correspond to the associated ME in the VCSN table 14C (step 1501). If the determination result in step 1501 is no (i.e., the VCSN comprised in the first sub-I/O request 3 is not smaller than or equal to the maximum value of all VCSNs that correspond to the associated ME in the VCSN table 14C), it means that the VCSN comprised in the first sub-I/O request 3 is an invalid VCSN, and thus the first sub-I/O request 3 with the invalid VCSN will be regarded as an invalid request (step 1509). Accordingly, the RAID subsystem 30C (the slave RAID subsystem) will not execute the first I/O request 3, but handles the first sub-I/O request 3 according to one of the flowcharts shown in FIG. 13B, FIG. 13C or FIG. 13D. If the determination result in step 1501 is yes (i.e., the VCSN comprised in the first sub-I/O request 3 is smaller than or equal to the maximum value of all VCSNs that correspond to the associated ME in the VCSN table 14C), it will be further determined if there is an LBA item relevant to the associated ME in the VCSN table 14C, with the same value as the LBA comprised in the first sub-I/O request 3 (step 1503). If the determination result in step 1503 is no, (i.e., in the VCSN table 14C, there is no LBA item relevant to the associated ME, with the same value as the LBA comprised in the first sub-I/O request 3), it means that the data associated with the LBA have not been moved, and thus, there is no such relevant information recorded in the VCSN table 14C. Accordingly, the VCSN comprised in the first sub-I/O request 3 will be regarded as a valid VCSN, and thus the first sub-I/O request 3 is a valid request (step 1507). Afterward, the RAID subsystem 30C (the slave RAID subsystem) will directly execute the first sub-I/O request 3 according to one of the flowcharts shown in FIG. 13B and FIG. 13C, or will further handle the first sub-I/O request 3 according to one of the flowcharts shown in FIG. 13D and FIG. 13E. If the determination result in step 1503 is yes (i.e., in the VCSN table 14C, there is an LBA item relevant to the associated ME, with the same value as the LBA comprised in the first sub-I/O request 3), it means that the data associated with the LBA have been moved, and it will be further determined if the VCSN comprised in the first sub-I/O request 3 is larger than or equal to the VCSN corresponding to the LBA item of the associated ME (step 1505). If the determination result in step 1505 is yes (i.e., the VCSN comprised in the first sub-I/O request 3 is larger than or equal to the VCSN corresponding to the LBA item of the associated ME), then the VCSN comprised in the first sub-I/O request 3 will be regarded as a valid VCSN, and thus the first sub-I/O request 3 is a valid request (step 1507). Accordingly, the RAID subsystem 30C will directly execute the first sub-I/O request 3. On the other hand, if the determination result in step 1505 is no (i.e., the VCSN comprised in the first sub-I/O request 3 is not larger than or equal to the VCSN corresponding to the LBA item of the associated ME), then the VCSN comprised in the first sub-I/O request 3 will be regarded as an invalid VCSN, and thus the first sub-I/O request 3 is an invalid request (step 1509). Accordingly, the RAID subsystem 30C will not execute the first sub-I/O request 3 but transfers the first sub-I/O request 3 to the RAID subsystem 30A (the master RAID subsystem) for further processing.

Figure 16:
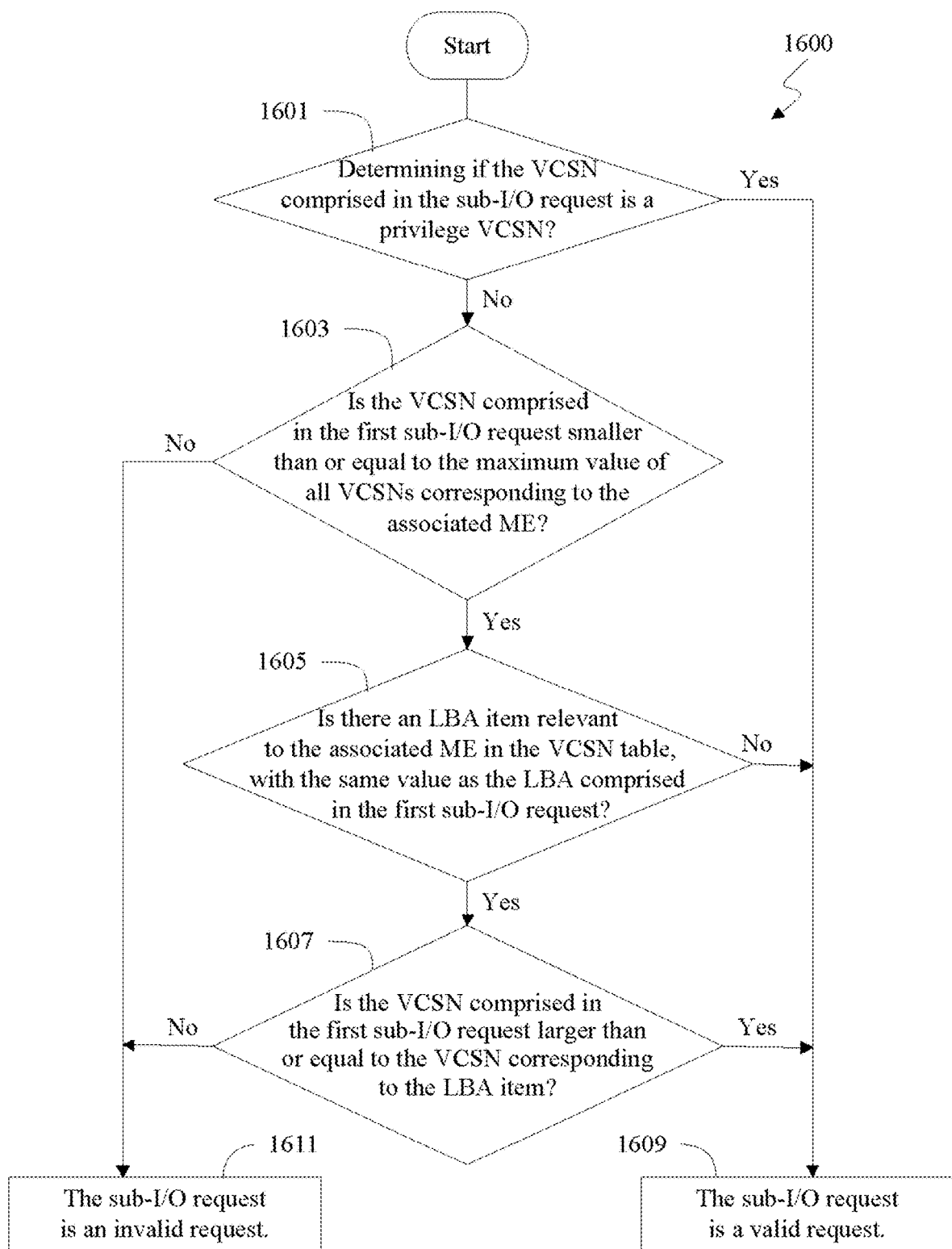
FIG. 16 is the flowchart 1600 about how to verify the validity of sub-I/O requests when performing the data access load balance function in the storage system architecture according to the second embodiment of the present invention.

Please refer to FIG. 16 which shows a flowchart 1600 that illustrates the second embodiment of a sub-I/O request validity verification method for verifying, when performing the data access load balance function, the validity of the VCSN comprised in a sub-I/O request according to the storage system architecture of the present invention. The flowchart 1600 is used to explain the detailed operations in step 13031 of FIG. 13B, in step 13053 of FIG. 13C, in step 13071-1 to step 13071-n of FIG. 13D. In the second embodiment of a sub-I/O request validity verification method for verifying, when performing the data access load balance function, the validity of the VCSN comprised in a sub-I/O request according to the storage system architecture of the present invention, it is taken into consideration that any sub-I/O requests that are parsed by the master RAID subsystem must be correct sub-I/O requests. This is because when the master RAID subsystem 30 (for example, the RAID subsystem 30A) receives a host I/O request B and a host I/O request C transferred from the slave subsystems 30 (for example, the RAID subsystem 30B and the RAID subsystem 30C), and data in the associated MEs are migrating or are going to migrate, then the RAID subsystem 30A (the master RAID subsystem 30) will enquire the host I/O request B and the host I/O request C for later execution. According to one of the embodiments of the present invention, assuming that the RAID subsystem 30A (the master RAID subsystem) first receives the host I/O request B transferred from the RAID subsystem B (the slave RAID subsystem), and assuming that the RAID subsystem 30A (the master RAID subsystem 30) uses "first in first out (FIFO)" manner to process the waiting commands on the queue, it means that the host I/O request B will be executed before the host I/O request C. When the data migration is complete, the RAID subsystem 30A (the master RAID subsystem) will process the host I/O request B and the host I/O request C in order according to the previously enquired order. Because the RAID subsystem 30A (the master RAID subsystem) manages the virtual volume (VV) to be accessed by the host I/O request B and by the host I/O request C, and manages the virtual pool (VP) mapping the VVs; in other words, the RAID subsystem 30A (the master RAID subsystem) knows everything of the associated data, and it means that the RAID subsystem 30A must also know the corresponding relationships between the virtual addresses, to be accessed by the host I/O request B and by the host I/O request C, and the correct physical addresses. Therefore, the sub-I/O request(s) that is(are) parsed by the RAID subsystem 30A (the master RAID subsystem) must be correct without any mistake. Accordingly, in one embodiment of the present invention, as long as sub-I/O request(s) is(are) parsed by the master RAID subsystem, each of the sub-I/O request(s) will be provided with a privilege VCSN which will be given with a reserved number (for example, 0000, 1111, but not limited to here). Therefore, the ME server modules 90 of each of the RAID subsystems 30 will directly regarded the sub-I/O request(s) provided with the privilege VCSN(s), as valid I/O request(s). That is, when the ME server modules 90 in each of the RAID subsystem 30 receive the sub-I/O requests provided with the privilege VCSNs, the ME server modules 90 will realize that the sub-I/O requests provided with the privilege VCSNs are parsed by the master RAID subsystem and thus must be valid sub-I/O requests. Referring to FIG. 16, when the RAID subsystem 30B (the slave RAID subsystem) receives a host I/O request from the host 10, the RAID subsystem 30B will handle the host I/O request according to the flowcharts shown in FIG. 13A or FIG. 14, in which the host I/O request will be parsed into a first sub-I/O request 1, a first sub-I/O request 2, and a first sub-I/O request 3, and these first sub-I/O requests will be transferred to the RAID subsystem 30A (the master RAID subsystem), the RAID subsystem 30B (the slave RAID subsystem), and the RAID subsystem 30C (the slave RAID subsystem). Then, when the RAID subsystem 30C receives the first sub-I/O request 3, the ME server module 90C in the RAID subsystem 30C will determine if the VCSN comprised in the sub-I/O request 3 is a privilege VCSN (step 1601). If the determination result in step 1601 is yes, then the first sub-I/O request 3 is valid (step 1609); if the determination result in step 1601 is no, then it will be further determined if the VCSN comprised in the first sub-I/O request 3 is smaller than or equal to the maximum value of all VCSNs that correspond to the associated ME in the VCSN table 14C (step 1603). If the determination result in step 1603 is no (i.e., the VCSN comprised in the first sub-I/O request 3 is not smaller than or equal to the maximum value of all VCSNs that correspond to the associated ME in the VCSN table 14C), it means that the VCSN comprised in the first sub-I/O request 3 is an invalid VCSN, and thus the first sub-I/O request 3 will be regarded as an invalid request (step 1611). Accordingly, the RAID subsystem 30C (the slave RAID subsystem) will not execute the first sub-I/O request 3 but transfers the first sub-I/O request 3 to the RAID subsystem 30A (the master RAID subsystem) for further processing. If the determination result in step 1603 is yes (i.e., the VCSN comprised in the first sub-I/O request 3 is smaller than or equal to the maximum value of all VCSNs that correspond to the associated ME in the VCSN table 14C), then it will be further determined if in the VCSN table 14C, there is an LBA item relevant to the associated ME, with the same value as the LBA comprised in the first sub-I/O request 3. If the determination result in step 1605 is no (i.e., in the VCSN table 14C, there is no LBA item relevant to the associated ME, with the same value as the LBA comprised in the first sub-I/O request 3), it means that data which correspond to the LBA have never been moved, and thus there is no relevant information recorded in the VCSN table 14C. Accordingly, the VCSN comprised in the first sub-I/O request 3 will be regarded as a valid VCSN, and thus the first sub-I/O request 3 is a valid request (step 1609). Afterward, the RAID subsystem 30C (the slave RAID subsystem) will directly execute the first sub-I/O request 3. If the determination result in step 1605 is yes (i.e., in the VCSN table 14C, there is an LBA item relevant to the associated ME, with the same value as the LBA comprised in the first sub-I/O request 3), it means that the data which corresponds to the LBA have been moved, and then it will be further determined if the VCSN comprised in the first sub-I/O request 3 is larger than or equal to the VCSN that corresponds to the LBA item of the associated ME (step 1607). If the determination result in step 1607 is yes (i.e., the VCSN comprised in the first sub-I/O request 3 is larger than or equal to the VCSN that corresponds to the LBA item of the associated ME), then the VCSN comprised in the first sub-I/O request 3 will be regarded as a valid VCSN, and thus, the first sub-I/O request 3 is a valid request (step 1609). Accordingly, the RAID subsystem 30C will directly execute the first sub-I/O request 3. On the other hand, if the determination result in step 1607 is no (i.e., the VCSN comprised in the first sub-I/O request 3 is not larger than or equal to the VCSN that corresponds to the LBA item of the associated ME), then the VCSN comprised in the first sub-I/O request 3 will be regarded as an invalid VCSN, and thus the first sub-I/O request 3 is an invalid request (step 1611). Accordingly, the RAID subsystem 30C (the slave RAID subsystem) will not execute the first sub-I/O request 3, but transfers the first sub-I/O request 3 to the RAID subsystem 30A (the master RAID subsystem) for further processing.

Figure 17:
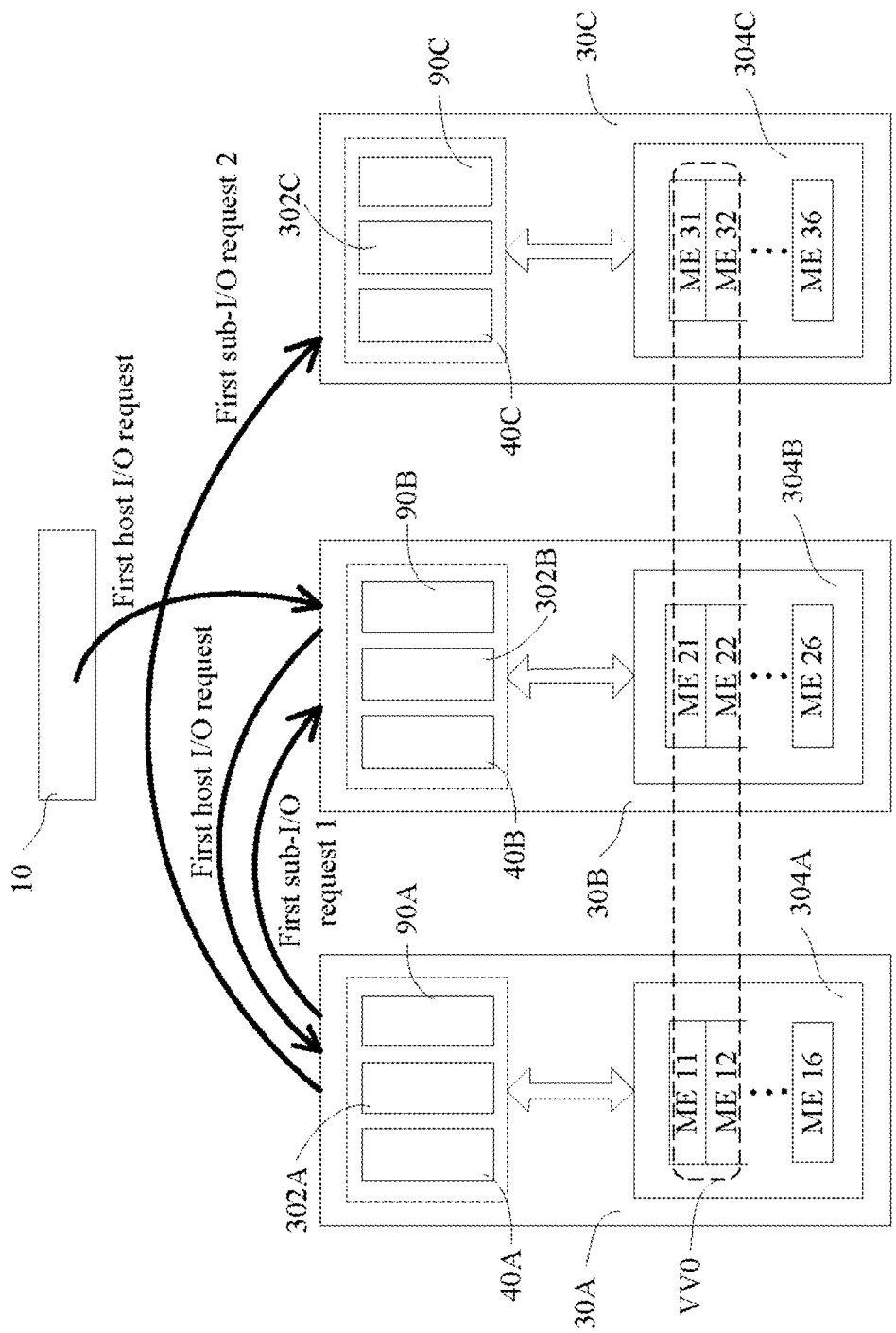
FIG. 17 is the diagram of the first embodiment about how to transfer I/O and sub-I/O requests when performing the data access load balance function in the storage system architecture of the present invention.
Figure 18:
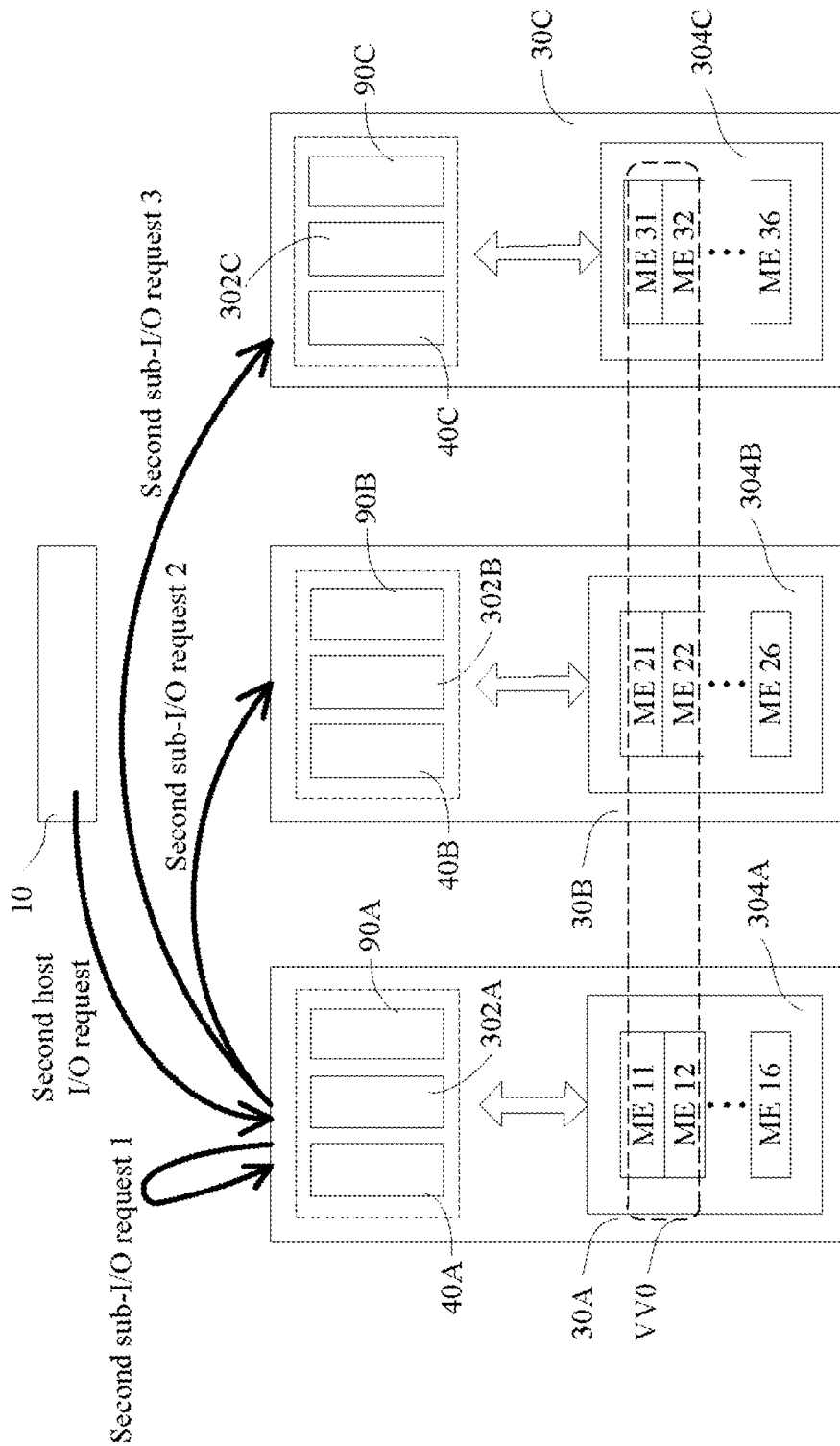
FIG. 18 is the diagram of the second embodiment about how to transfer I/O and sub-I/O requests when performing the data access load balance function in the storage system architecture of the present invention.

Please refer to FIG. 17, FIG. 18 and FIG. 19A to FIG. 19D, where FIG. 17 is the first schematic diagram that shows how to transfer the sub-I/O requests when executing the data access load balance function in the storage system architecture of the present invention; FIG. 18 is the second schematic diagram that shows how to transfer the sub-I/O requests when executing the data access load balance function in the storage system architecture of the present invention; FIG. 19A to FIG. 19D show the schematic diagrams of internal data changes in the DLTs when executing the data access load balance function by using the VCSN to implement the I/O request validity verification method shown in FIG. 17 and in FIG. 18. Here, the first schematic diagram shown in FIG. 17 and the second schematic diagram shown in FIG. 18 take the storage system architecture 3 in FIG. 3 as an example to illustrate the details.

Figure 19A:
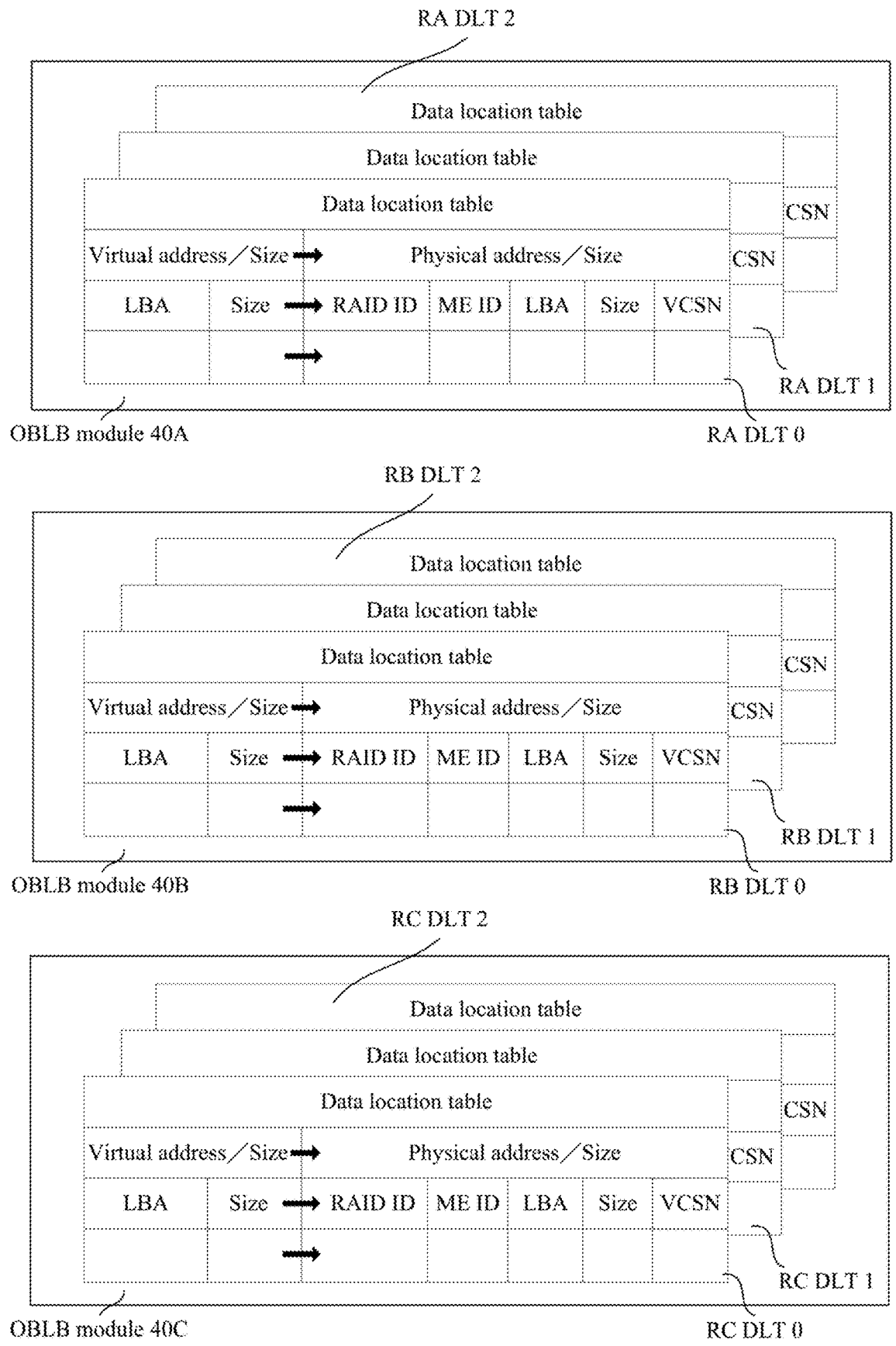

Please refer to FIG. 17 and FIG. 19A, where FIG. 19A shows all fields of the DLTs (data location tables) in each of the RAID subsystems. In this embodiment, the above embodiments will be used to explain. As soon as all RAID subsystems of the present invention are switched on, the data location tables (DLTs) (for example, RA DLT0, RA DLT1, RA DLT2, RB DLT0, RB DLT1, RB DLT2, and RC DLT0, RC DLT1, RC DLT2) in the OBLB module 40A of the RAID subsystem 30A (the master RAID subsystem), in the OBLB module 40B of the RAID subsystem 30B (the slave RAID subsystem), and in the OBLB module 40C of the RAID subsystem 30C (the slave RAID subsystem) have not stored any data location information as shown in FIG. 19A, where the DLTs including RA DLT0, RA DLT1, RA DLT2, RB DLT0, RB DLT1, RB DLT2, and RC DLT0, RC DLT1, RC DLT2 are used by the OBLB module 40A of the RAID subsystem 30A (the master RAID subsystem), by the OBLB module 40B of the RAID subsystem 30B (the slave RAID subsystem), and by the OBLB module 40C of the RAID subsystem 30C (the slave RAID subsystem) to store the data location information related to the data distribution status of the virtual volumes VV0, VV1, VV2.

Please refer to FIG. 17 and FIG. 19B, where FIG. 19B shows that the data location tables RA DLT0, RB DLT0 and RC DLT0 have not stored any data location information related to the data distribution status of the virtual volume VV0. Therefore, when the OBLB module 40B in the RAID subsystem 30B (the slave RAID subsystem) receives a first host I/O request from the host 10 (for example, the virtual address and size of the first host I/O request are VV ID=VV0, LBA=0, and size=20000), and determines that the first host I/O request is a read/write request (step 13003 or step 1403), the OBLB module 40B will determine, according to step 13011 shown in FIG. 13A or step 1411 shown in FIG. 14, whether or not the data location information stored in the DLTs, records the location cross reference information that is associated with the first host I/O request, so as to parse the first host I/O request. Because the data location information stored in the data location table RB DLT0 does not have any location cross reference information related to the VV0, the OBLB 40B in the RAID subsystem 30B (the slave RAID subsystem) cannot parse the first host I/O request. In this situation, as shown in step 13013 of FIG. 13A, the first host I/O request will be transferred, through the second channel CH2, the switch 15 and the first channel CH1, to the RAID subsystem 30A that plays a master role for the VV0 which is associated with the first host I/O request. Because the RAID subsystem 30A (the master RAID subsystem) plays the master role for the VV0, the RAID subsystem 30A is able to parse the first host I/O request into a first sub-I/O request 1 and a first sub-I/O request 2 after receiving the first host I/O request, and further transfers, through the first channel CH1, the switch 15, the second channel CH2 and the third channel CH3 shown in FIG. 3, the first sub-I/O request 1 and the first sub-I/O request 2 respectively to the RAID subsystem 30B (the slave RAID subsystem) and the RAID subsystem 30C (the slave RAID subsystem) for the following execution (step 13015 in FIG. 13A). At the same time, the OBLB module 40B of the RAID subsystem 30B (the slave RAID subsystem) will inquire the virtualization layer 302A in the RAID subsystem 30A (the master RAID subsystem), about the location cross reference information related to the first host I/O request (for example, VV ID=VV0, LBA=0, and Size=20000 corresponds to RAID ID=RB, ME ID=ME22, LBA=20000, Block Size=10000, VCSN=11 and RAID ID=RC, ME ID=ME32, LBA=10000, Block Size=10000, VCSN=02), and updates the data location information stored in its RB DLT0 of the RAID subsystem 30B. Thus, the data location table RB DLT0 will records the location cross reference information which may be used next time, as shown in the data location table RB DLT0 of FIG. 19C. Afterwards, if the RAID subsystem 30B (the slave RAID subsystem) receives, from the host 10, another host I/O request (a read/write request) that has the same virtual address, the OBLB module 40B in the RAID subsystem 30B (the slave RAID subsystem) can directly parse the host I/O request into one or more sub-I/O requests according to the updated data location information stored in the RB DLT0 as shown in FIG. 19C, and then transfer the one or more sub-I/O requests to associated RAID subsystem(s), thus no need to transfer the host I/O request to the RAID subsystem 30A (the master RAID subsystem) for further processing. Next, please refer to FIG. 18. When the OBLB module 40A in the RAID subsystem 30A (the master RAID subsystem) receives a second host I/O request (for example, the virtual address and size of the second host I/O request is VV ID=VV0, LBA=20000, Size=30000) from the host 10, and determines that the second host I/O request is a read/write request (step 13003 or step 1403), then the OBLB module 40A will determine, according to step 13011 shown in FIG. 13A or step 1411 shown in FIG. 14, whether or not the OBLB 40A is able to parse the second host I/O request. However, at this moment, because the data location information recorded in the data location table RA DLT0 in the RAID subsystem 30A (the master RAID subsystem), has no associated information about the second host I/O request (VV ID=VV0, LBA=20000, Size=30000), the OBLB module 40A in the RAID subsystem 30A (the master RAID subsystem) will transfer the second host I/O request to the virtualization layer of the master RAID subsystem (i.e., the virtualization layer 302A of the RAID subsystem 30A) which plays the master role for the virtual volume VV0, for further processing the second host I/O request, as shown in step 13013 of FIG. 13A. That is, because the RAID subsystem 30A (the master RAID subsystem) plays the master role for the virtual volume VV0, the RAID subsystem 30A is able to parse the second host I/O request into a second sub-I/O request 1, a second sub-I/O request 2, and a second sub-I/O request 3 when receiving the second host I/O request, and then transfers, through the first channel CH1, the switch 15, the second CH2, and the third CH3, the second sub-I/O request 1, the second sub-I/O request 2, and the second sub-I/O request 3 respectively to the RAID subsystem 30A (the master RAID subsystem), the RAID subsystem 30B (the slave subsystem) and the RAID subsystem 30C (the slave subsystem) for the following execution (as shown in step 13015 in FIG. 13A).

Then, the OBLB module 40A of the RAID subsystem 30A (the master RAID subsystem) will inquire the virtualization layer 302A of the RAID subsystem 30A about the location cross reference information that is associated with the second host I/O request (for example, VV ID=VV0, LBA=20000, and Size=30000 corresponds to RAID ID=RA, ME ID=ME11, LBA=07000, Block Size=10000, VCSN=07, RAID ID=RB, ME ID=ME21, LBA=20000, Block Size=10000, VCSN=52, and RAID ID=RC, ME ID=ME31, LBA=30000, Block Size=10000, VCSN=31). Afterwards, the OBLB module 40A of the RAID subsystem 30A will update its data location information recorded in the data location table RA DLT0 according to the inquired location cross reference information as shown in the data location table RA DLT0 of FIG. 19D. Later, if the OBLB module 40A in the RAID subsystem 30A receives another host I/O request having the same virtual address again, the OBLB module 40A in the RAID subsystem 30A (the master RAID subsystem) can directly parse, according to the updated data location information recorded in the data location table RA DLT0, the host I/O request into one or more sub-I/O requests, and then transfer the one or more sub-I/O requests to the associated RAID subsystem(s) for the following execution, without the need to deliver the host I/O request to the virtualization layer 302A of the RAID subsystem 30A (the master RAID subsystem) for further processing.

In addition, the VCSN fields in all DLTs shown in FIG. 19A to FIG. 19D are optional and can be removed as needed. Taking FIG. 19D as an example, after removing the VCSN fields of the data location tables RA DLT0, RB DLT0, and RC DLT0, the data location tables will be ones as shown in FIG. 22. In other words, the difference between FIG. 19A to FIG. 19D and FIG. 22 is that all DLTs in FIG. 22 do not include the VCSN fields; therefore, regarding detailed descriptions of FIG. 22, please refer to FIG. 19A to FIG. 19D, which are not repeated here. Thus, FIG. 22 is a schematic diagram that shows another embodiment of the DLTs for executing the data access load balance function in the storage system architecture of the present invention.

Figure 20:
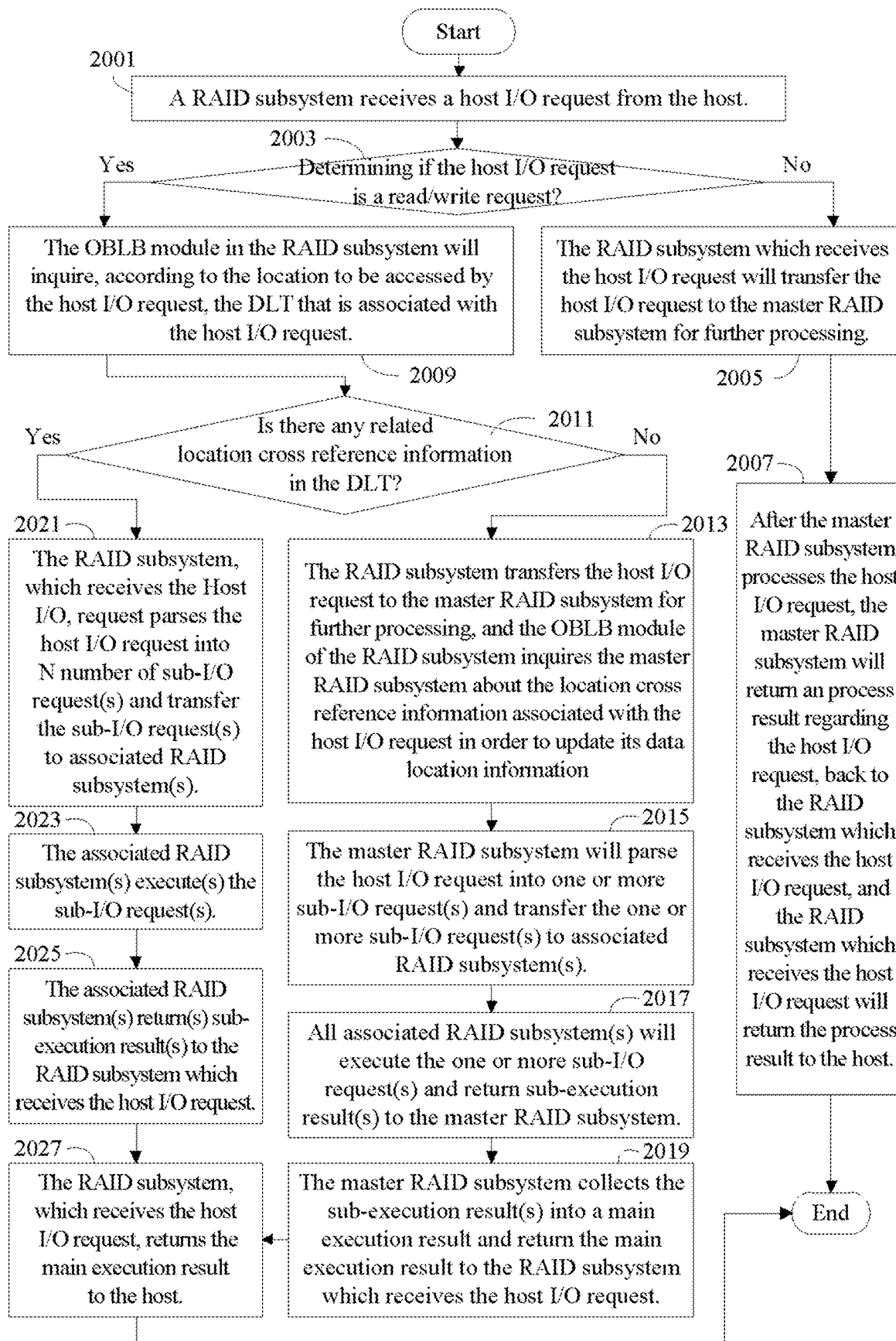
FIG. 20 is a flowchart of the eleventh embodiment that shows how the data access load balance function is performed in the storage system architecture of the present invention, where the main difference between the first to tenth embodiments, and the eleventh embodiment is that in the eleventh embodiment, the DLTs do not have a VCSN field.

Please refer to FIG. 20 and FIG. 22 which show the eleventh embodiment for performing the data access load balance function in the storage system architecture of the present invention, where the difference between the aforesaid first to tenth embodiments and the eleventh embodiment is that in the eleventh embodiment, all DLTs do not include the VCSN field; in other words, the validity of the VCSN is not taken into consideration as shown in FIG. 22. Here, it is also taking the storage system architecture 3 as an example. Please refer to FIG. 20. When the RAID subsystem 30B (i.e., the RAID subsystem receiving a host I/O request and being a slave RAID subsystem) receives a host I/O request (for example, a SCSI command) from the host 10 (step 2001), the RAID subsystem 30B will first determine if the host I/O request is a read/write request (for example, a read request or a write request) (step 2003). If in step 2003, it is determined that the host I/O request is not a read/write request, then the OBLB module 40B in the RAID subsystem 30B (i.e., the RAID subsystem receiving the host I/O request) will transfer the host I/O request to the RAID subsystem 30A (the master RAID subsystem), and the RAID subsystem 30A (the master RAID subsystem) will further process it (step 2005), After the RAID subsystem 30A (the master RAID subsystem) processes the host I/O request, the RAID subsystem 30A will return an process result regarding the host I/O request, to the RAID subsystem 30B (i.e., the RAID subsystem receiving the host I/O request), and then the RAID subsystem 30B will return the process result to the host 10 (step 2007). On the other hand, if in step 2003, it is determined that the host I/O request is a read/write request, then the OBLB module 40B in the RAID subsystem 30B (i.e., the RAID subsystem receiving the host I/O request) will inquire, according to the location to be accessed by the host I/O request, the DLT that is associated with the host I/O request (step 2009) in order to determine if the data location information recorded in the DLT has any location cross reference information that is associated with the host I/O request (step 2011).

If it is determined that, the data location information recorded in the DLT of the RAID subsystem 30B (i.e., the RAID subsystem receiving the host I/O request) does not have the location cross reference information associated with the host I/O request, the RAID subsystem 30B (i.e., the RAID subsystem receiving the host I/O request) will transfer the host I/O request to the RAID subsystem 30A (the master RAID subsystem), and the RAID subsystem 30A will further process it (step 2013). At the same time, because the data location information in the DLT of the RAID subsystem 30B (i.e., the RAID subsystem receiving the RAID subsystem) does not have related location cross reference information that is associated with the host I/O request, the OBLB module 40B of the RAID subsystem 30B (i.e., the RAID subsystem receiving the RAID subsystem) will inquire the RAID subsystem 30A (the master RAID subsystem) about the location cross reference information in order to update its information (for example, the data location information) (step 2013). Then, the RAID subsystem 30A (the master RAID subsystem) parses, according to the V2P table stored in the virtualization layer 302A, the host I/O request into one or more sub-I/O requests and transfers the one or more sub-I/O requests to associated RAID subsystem(s) (step 2015) for further executing the one or more sub-I/O requests (step 2017). Afterwards, all associated RAID subsystem(s) will return execution result(s) to the RAID subsystem 30A (the master RAID subsystem) (step 2017), and the RAID subsystem 30A (the master RAID subsystem) will collect the execution result(s) and return a main execution result regarding the execution result(s) to the RAID subsystem 30B (which receives the host I/O request) (step 2019), and the RAID subsystem 30B (which receives the host I/O request) will return the main execution result to the host 10 (step 2027).

On the other hand, if the data location information recorded in the DLT of the RAID subsystem 30B (which receives the host I/O request) has the location cross reference information that is associated with the host I/O request, the OBLB module 40B in the RAID subsystem 30B (i.e., the RAID subsystem receiving the host I/O request) will parse, according to its data location information, the host I/O request into one or more sub-I/O requests (for example, sub-I/O request 1, sub-I/O request 2, sub-I/O request n), and then transfer the sub-I/O request(s) to associated RAID subsystem(s) (step 2021). After all associated RAID subsystem(s) receive(s) the sub-I/O request(s), the associated RAID subsystem(s) will execute the sub-I/O request(s) (step 2023), and return sub-execution result(s) to the RAID subsystem 30B (i.e., the RAID subsystem receiving the host I/O request) (step 2025). Last, the RAID subsystem 30B (i.e., the RAID subsystem receiving the host I/O request) collects the sub-execution result(s) regarding the sub-I/O request(s), into a main execution result, and returns the main execution result to the host 10 (step 2027).

Figure 21:
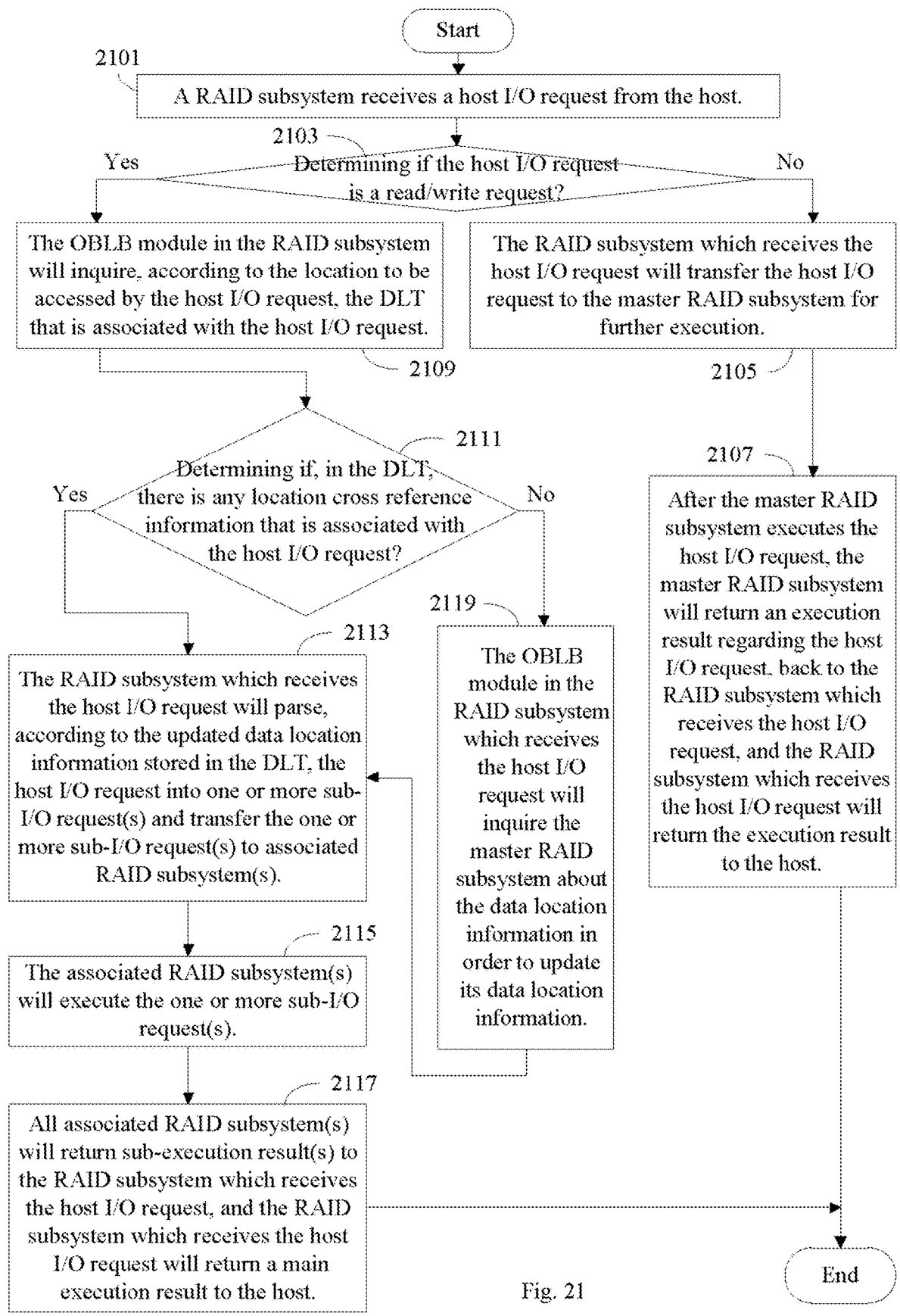
FIG. 21 is a flowchart of the twelfth embodiment that shows how the data access load balance function is performed in the storage system architecture of the present invention, where the main difference between the first to tenth embodiments, and the twelfth embodiment is that in the twelfth embodiment, the DLTs do not have a VCSN field.

Please refer to FIG. 21 and FIG. 22 which show the twelfth embodiment for performing the data access load balance function in the storage system architecture of the present invention, where the difference between the aforesaid first to tenth embodiments and the twelfth embodiment is that in the twelfth embodiment, all DLTs do not include the VCSN field; in other words, the validity of the VCSN is not taken into consideration as shown in FIG. 22. Here, it is also taking the storage system architecture 3 as an example. Please refer to FIG. 21. When the RAID subsystem 30B (i.e., the RAID subsystem receiving a host I/O request and being a slave RAID subsystem) receives a host I/O request (for example, a SCSI command) from the host 10 (step 2101), the RAID subsystem 30B will first determine if the host I/O request is a read/write request (for example, a read request or a write request) (step 2103). If in step 2103, it is determined that the host I/O request is not a read/write request, then the OBLB module 40B in the RAID subsystem 30B (i.e., the RAID subsystem receiving the host I/O request) will transfer the host I/O request to the RAID subsystem 30A (the master RAID subsystem), and the RAID subsystem 30A (the master RAID subsystem) will further process it (step 2105), After the RAID subsystem 30A (the master RAID subsystem) processes the host I/O request, the RAID subsystem 30A will return an process result regarding the host I/O request, to the RAID subsystem 30B (i.e., the RAID subsystem receiving the host I/O request), and the RAID subsystem 30B returns the process result to the host 10 (step 2107). On the other hand, if in step 2103, it is determined that the host I/O request is a read/write request, then the OBLB module 40B in the RAID subsystem 30B (i.e., the RAID subsystem receiving the host I/O request) will inquire, according to the location to be accessed by the host I/O request, the DLT that is associated with the host I/O request (step 2109) in order to determine if the data location information recorded in the DLT has any location cross reference information that is associated with the host I/O request (step 2111).

If it is determined that, the data location information recorded in the DLT of the RAID subsystem 30B (i.e., the RAID subsystem receiving the host I/O request) does not have the location cross reference information associated with the host I/O request, the OBLB module 40B in the RAID subsystem 30B (i.e., the RAID subsystem receiving the host I/O request) will inquire the RAID subsystem 30A (the master RAID subsystem) about the location cross reference information in order to update its information (for example the data location information) (step 2119). Then, the RAID subsystem 30B (i.e., the RAID subsystem receiving the host I/O request) will parse, according to the updated data location information stored in the DLT, the host I/O request into one or more sub-I/O requests and transfers the sub-I/O request(s) to associated RAID subsystem(s) (step 2113) for further executing the one or more sub-I/O requests (step 2115). Afterwards, all associated RAID subsystem(s) will execute the sub-I/O request(s) and return sub-execution result(s) to the RAID subsystem 30B (i.e., the RAID subsystem receiving the host I/O request), and the RAID subsystem 30B (i.e., the RAID subsystem receiving the host I/O request) will collect the sub-execution result(s) into a main execution result, and return the main execution result to the host 10 (step 2117). On the other hand, if the data location information recorded in the OBLB module 40B of the RAID subsystem 30B (i.e., the RAID subsystem receiving the host I/O request) has the location cross reference information that is associated with the host I/O request, the RAID subsystem 30B (i.e., the RAID subsystem receiving the host I/O request) will directly parse, according to the data location information recorded in the DLT, the host I/O request into one or more sub-I/O requests and transfer the one or more sub-I/O requests to the associated RAID subsystem(s) (step 2113) for further execution (step 2115). Afterwards, the associated RAID subsystem(s) return(s) sub-execution result(s) to the RAID subsystem 30B (i.e., the RAID subsystem receiving the host I/O request), and then the RAID subsystem 30B (i.e., the RAID subsystem receiving the host I/O request) collects these sub-execution result(s) into a main execution result and returns the main execution result to the host 10 (step 2117).

In conclusion, the multi-platform compatible module of the present invention provide a data access load balance function for evenly distributing one or more host I/O requests from the host that is coupled to these RAID subsystems, onto these RAID subsystems. In addition, since characteristics of the multi-platform compatible module of the present invention neither need to install any softwares and firmware on the host for above function, nor need to develop any softwares and firmware compatible with the operating system of the host that is coupled to these RAID subsystems; therefore, there is no doubt that the present invention's RAID subsystems with the multi-platform compatible module provide the data access load balance function that can be across platforms and be fast developed and does not need to be installed on the host.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims, and the appended claims are intended to cover any and all such modifications, enhancements, and other embodiments that fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing data in a storage system architecture comprising a plurality of data storage subsystems, the method comprising steps of:
   providing an on-board load balance (OBLB) module in each of the plurality of data storage subsystems;
   receiving, by one data storage subsystem of the plurality of data storage subsystems, an I/O request issued from a host;
   determining whether the one storage subsystem that receives the I/O request, is able to parse the I/O request according to data location information in the OBLB module of the one storage subsystem that receives the I/O request; and
   when the one storage subsystem that receives the I/O request is able to parse the I/O request according to the data location information in the OBLB module of the one data storage subsystem that receives the I/O request, the method further comprises steps of:
   parsing, by the one data storage subsystem that receives the I/O request, the I/O request into at least one first sub-I/O request according to the data location information in the OBLB module of the one data storage subsystem that receives the I/O request;
   dispatching, by the one data storage subsystem that receives the I/O request, the at least one first sub-I/O request to at least one first data storage subsystem of the plurality of data storage subsystems, which is associated with the at least one first sub-I/O request;
   executing, by the at least one first data storage subsystem associated with the at least one first sub-I/O request, the at least one first sub-I/O request;
   returning, by the at least one first data storage subsystem associated with the at least one first sub-I/O request, at least one first sub-execution result back to the one data storage subsystem that receives the I/O request;
   collecting, by the one data storage subsystem that receives the I/O request, the at least one first sub-execution result from the at least one first data storage subsystem; and
   returning, by the one data storage subsystem that receives the I/O request, a main execution result comprising the at least one first sub-execution result from the at least one first data storage subsystem, back to the host;
   wherein a master data storage subsystem of the plurality of data storage subsystems updates the data location information in the OBLB module in each of the plurality of data storage subsystems regularly or on demand.

2. A method for accessing data in a storage system architecture comprising a plurality of data storage subsystems, the method comprising steps of:
   providing an on-board load balance (OBLB) module in each of the plurality of data storage subsystems;
   receiving, by one data storage subsystem of the plurality of data storage subsystems, an I/O request issued from a host;
   determining whether the one storage subsystem that receives the I/O request, is able to parse the I/O request according to data location information in the OBLB module of the one storage subsystem that receives the I/O request; and
   when the one data storage subsystem that receives the I/O request is not able to parse the I/O request according to the data location information in the OBLB module of the one data storage subsystem that receives the I/O request, the method further comprises steps of:
   dispatching, by the one data storage subsystem that receives the I/O request, the I/O request to a master data storage subsystem for the I/O request;
   parsing, by the master data storage subsystem, the I/O request into at least one second sub-I/O request and dispatching the at least one second sub-I/O request to at least one second data storage subsystem of the plurality of data storage subsystems, which is associated with the at least one second sub-I/O request;
   executing, by the at least one second data storage subsystem associated with the at least one second sub-I/O request, the at least one second sub-I/O request;
   returning, by the at least one second data storage subsystem associated with the at least one second sub-I/O request, at least one second sub-execution result back to the master data storage subsystem in response to the at least one second sub-I/O request;
   collecting, by the master data storage subsystem, the at least one second sub-execution result from the at least one second data storage subsystem;
   returning, by the master data storage subsystem, a main execution result comprising the at least one second sub-execution result from the at least one second data storage subsystem back to the one data storage subsystem that receives the I/O request; and
   returning, by the one data storage subsystem that receives the I/O request, the main execution result back to the host.

3. The method according to claim 2, further comprising step of: inquiring, by the one data storage subsystem that receives the I/O request, information from the master data storage subsystem for the I/O request in order to update the data location information in the OBLB module of the one data storage subsystem that receives the I/O request.

4. The method according to claim 3, wherein the information from the master data storage subsystem is location cross reference information.

5. A method for accessing data in a storage system architecture comprising a plurality of data storage subsystems, the method comprising steps of:
   providing an on-board load balance (OBLB) module in each of the plurality of data storage subsystems;
   receiving, by one data storage subsystem of the plurality of data storage subsystems, an I/O request issued from a host;

determining whether the one storage subsystem that receives the I/O request, is able to parse the I/O request according to data location information in the OBLB module of the one storage subsystem that receives the I/O request; and when the one data storage subsystem that receives the I/O request is not able to parse the I/O request according to the data location information in the OBLB module of the one data storage subsystem that receives the I/O request, the method further comprises steps of:

inquiring, by the one data storage subsystem that receives the I/O request, information from a master data storage subsystem for the I/O request in order to update the data location information in the OBLB module of the one data storage subsystem that receives the I/O request;

updating, by the one data storage subsystem that receives the I/O request, the data location information in the OBLB module of the one data storage subsystem that receives the I/O request according to the inquired information from the master data storage subsystem;

parsing, via the updated data location information in the OBLB module of the one storage subsystem that receives the I/O request, the I/O request into at least one third sub-I/O request and dispatching the at least one third sub-I/O request to at least one third data storage subsystem of the plurality of data storage subsystems, which is associated with the at least one third sub-I/O request;

executing, by the at least one third data storage subsystem associated with the at least one third sub-I/O request, the at least one third sub-I/O request;

returning, by the at least one third data storage subsystem associated with the at least one third sub-I/O request, at least one third sub-execution result back to the one data storage subsystem that receives the I/O request;

collecting, by the one data storage subsystem that receives the I/O request, the third sub-execution result from the at least one third data storage subsystem; and returning, by the one data storage subsystem that receives the I/O request, a main execution result comprising the at least one third sub-execution result back to the host.

6. The method according to claim 1, wherein the data location information comprises a VV ID (virtual volume identification), a virtual LBA, a size, a RAID ID (RAID identification), a ME ID(media extent identification), a physical LBA, and a block size.

7. A method for accessing data in a storage system architecture comprising a plurality of data storage subsystems, the method comprising steps of:

providing an on-board load balance (OBLB) module in each of the plurality of data storage subsystems;

receiving, by one data storage subsystem of the plurality of data storage subsystems, an I/O request issued from a host;

determining, by the one data storage subsystem that receives the I/O request, whether the one data storage subsystem is able to parse the I/O request according to data location information in the OBLB module of the one data storage subsystem that receives the I/O request; and when the one data storage subsystem that receives the I/O request is able to parse the I/O request according to the data location information in the OBLB module of the one data storage subsystem that receives the I/O request, the method further comprises steps of:

parsing, by the one data storage subsystem that receives the I/O request, the I/O request into at least one first sub-I/O request according to the data location information in the OBLB module of the one data storage subsystem that receives the I/O request;

dispatching, by the one data storage subsystem that receives the I/O request, the at least one first sub-I/O request to at least one first data storage subsystem of the plurality of data storage subsystems, which is associated with the at least one first sub-I/O request;

determining, by each one of the at least one first data storage subsystem associated with the at least one first sub-I/O request, whether a Validity Check Information (VCI) contained in a corresponding one of the at least one first sub-I/O request is valid or not;

when it is determined that the VCI contained in the corresponding one of the at least one first sub-I/O request is valid, the method further comprises steps of:

executing, by one of the at least one first data storage subsystem associated with the valid first sub-I/O request, the corresponding valid first sub-I/O request;

returning, by the one of the at least one first data storage subsystem associated with the valid first sub-I/O request, a first sub-execution result back to the one data storage subsystem that receives the I/O request from the host;

collecting, by the one data storage subsystem that receives the I/O request, the first sub-execution result from the one of the at least one first data storage subsystem; and returning, by the one data storage subsystem that receives the I/O request, a main execution result comprising the first sub-execution result back to the host;

wherein a master data storage subsystem of the plurality of data storage subsystems updates the data location information in the OBLB module in each of the plurality of data storage subsystems regularly or on demand.

8. The method according to claim 7, wherein the VCI is a Validity Check Sequence Number (VCSN).

9. The method according to claim 7, further comprising, when it is determined that the VCI contained in the corresponding one of the at least one first sub-I/O request is not valid, steps of:

dispatching, by one of the at least one first data storage subsystem associated with the invalid first sub-I/O request, the invalid first sub-I/O request corresponding to the one of the at least one first data storage subsystem associated with the invalid first sub-I/O request, to the master data storage subsystem for the I/O request; and handling, by the master data storage subsystem, the invalid first sub-I/O request from the one of the at least one first data storage subsystem associated with the invalid first sub-I/O request.

10. The method according to claim 9, where that the VCI contained in the invalid first sub-I/O request is not valid is due to a reason selected from a group comprising: a data migration or a snapshot.

11. The method according to claim 9, wherein the step of handling, by the master data storage subsystem, the invalid first sub-I/O request from the one of the at least one first data storage subsystem associated with the invalid first sub-I/O request, further comprises steps of:

parsing, by the master data storage subsystem, the invalid first sub-I/O request into at least one fourth sub-I/O request;

dispatching, by the master data storage subsystem, the at least one fourth sub-I/O request to at least one fourth data storage subsystem of the plurality of data storage subsystems, which is associated with the at least one fourth sub-I/O request;

executing, by the at least one fourth data storage subsystem associated with the at least one fourth sub-I/O request, the at least one fourth sub-I/O request;

returning, by the at least one fourth data storage subsystem associated with the at least one fourth sub-I/O request, at least one fourth sub-execution result back to the master data storage subsystem in response to the at least one fourth sub-I/O request; and collecting, by the master data storage subsystem, the at least one fourth sub-execution result from the at least one fourth data storage subsystem into an execution result of the invalid first sub-I/O request.

12. The method according to claim 11, further comprising steps of:

returning, by the master data storage subsystem, the execution result of the invalid first sub-I/O request back to the one data storage subsystem that receives the I/O request from the host; and returning, by the one data storage subsystem that receives the I/O request from the host, the main execution result comprising the execution result of the invalid first sub-I/O request back to the host.

13. The method according to claim 11, further comprising steps of:

returning, by the master data storage subsystem, the execution result of the invalid first sub-I/O request back to the first data storage subsystem associated with the invalid first sub-I/O request;

returning, by the first data storage subsystem associated with the invalid first sub-I/O request, the execution result of the invalid first sub-I/O request back to the one data storage subsystem that receives the I/O request from the host; and returning, by the one data storage subsystem that receives the I/O request from the host, the main execution result comprising the execution result of the invalid first sub-I/O request back to the host.

14. The method according to claim 11, further comprising steps of:

returning, by the master data storage subsystem, the execution result of the invalid first sub-I/O request back to the one data storage subsystem that receives the I/O request from the host;

collecting, by the one data storage subsystem that receives the I/O request, the first sub-execution result from the one of the at least one first data storage subsystem and the execution result of the invalid first sub-I/O request from the master data storage subsystem; and returning, by the one data storage subsystem that receives the I/O request from the host, the main execution result comprising the first sub-execution result of the valid first sub-I/O request and the execution result of the invalid first sub-I/O request back to the host.

15. The method according to claim 11, further comprising steps of:

returning, by the master data storage subsystem, the execution result of the invalid first sub-I/O request back to the first data storage subsystem associated with the invalid first sub-I/O request;

returning, by the first data storage subsystem associated with the invalid first sub-I/O request, the execution result of the invalid first sub-I/O request back to the one data storage subsystem that receives the I/O request from the host;

collecting, by the one data storage subsystem that receives the I/O request, the first sub-execution result from the one of the at least one first data storage subsystem associated with the valid first sub-I/O request and the execution result of the invalid first sub-I/O request from the first data storage subsystem associated with the invalid first sub-I/O request; and returning, by the one data storage subsystem that receives the I/O request from the host, the main execution result comprising the first sub-execution result of the valid first sub-I/O request and the execution result of the invalid first sub-I/O request back to the host.

16. The method according to claim 7, further comprising a step of:

informing, by each one of the at least one first data storage subsystem associated with the at least one first sub-I/O request, the one data storage subsystem that receives the I/O request, of whether the VCI contained in a corresponding one of the at least one first sub-I/O request is valid or not.

17. The method according to claim 7, further comprising steps of:

informing, by the one data storage subsystem that receives the I/O request, the one of the at least one first data storage subsystem associated with the valid first sub-I/O request, to execute the corresponding valid first sub-I/O request, when the VCI contained in the corresponding one of the at least one first sub-I/O request is valid; and informing, by the one data storage subsystem that receives the I/O request, the one of the at least one first data storage subsystem associated with the invalid first sub-I/O request, not to execute the corresponding invalid first sub-I/O request, when the VCI contained in the corresponding one of the at least one first sub-I/O request is not valid.

18. The method according to claim 7, further comprising, when it is determined that any of the VCI contained in the at least one first sub-I/O request is not valid, steps of:

informing, by the one data storage subsystem that receives the I/O request, the at least one first data storage subsystem associated with the at least one first sub-I/O request, not to execute the at least one first sub-I/O request;

dispatching, by the one data storage subsystem, the I/O request to the master data storage subsystem for the I/O request;

parsing, by the master data storage subsystem, the I/O request into at least one fifth sub-I/O request, and dispatching the at least one fifth sub-I/O request to at least one fifth data storage subsystem of the plurality of data storage subsystems, which is associated with the at least one of fifth sub-I/O request;

executing, by each one of the at least one fifth data storage subsystem associated with the at least one fifth sub-I/O request, corresponding one of the at least one fifth sub-I/O request to obtain at least one fifth sub-execution result corresponding to the at least one fifth sub-I/O request, and returning the at least one fifth sub-execution result back to the master data storage subsystem;

collecting, by the master data storage subsystem, the at least one fifth sub-execution result from the at least one fifth data storage subsystem;

returning, by the master data storage subsystem, the at least one fifth sub-execution result back to the one data storage subsystem that receives the I/O request from the host; and returning, by the one data storage subsystem that receives the I/O request from the host, the main execution result comprising the at least one fifth sub-execution result back to the host.

19. The method according to claim 18, where that the VCI contained in the at least one first sub-I/O request is not valid is due to a reason selected from a group comprising: a data migration or a snapshot.

20. The method according to claim 7, further comprising, when it is determined that any of the VCI contained in the at least one first sub-I/O request is not valid, steps of:

informing, by the one data storage subsystem that receives the I/O request, the at least one first data storage subsystem associated with the at least one first sub-I/O request, not to execute the at least one first sub-I/O request;

inquiring, by the one data storage subsystem that receives the I/O request, information from the master data storage subsystem for the I/O request in order to update the data location information in the OBLB module of the one data storage subsystem;

updating, by the one data storage subsystem that receives the I/O request, the data location information in the OBLB module of the one data storage subsystem according to the inquired information from the master data storage subsystem;

parsing, via the updated data location information in the OBLB module of the one storage subsystem that receives the I/O request, the I/O request into at least one sixth sub-I/O request and dispatching the at least one sixth sub-I/O request to at least one sixth data storage subsystem of the plurality of data storage subsystems, which is associated with the at least one sixth sub-I/O request;

executing, by the at least one sixth data storage subsystem associated with the at least one sixth sub-I/O request, the at least one sixth sub-I/O request to obtain at least one sixth sub-execution result, when it is determined that the VCI contained in the at least one sixth sub-I/O request is valid;

returning, by the at least one sixth data storage subsystem associated with the at least one sixth sub-I/O request, the at least one sixth sub-execution result back to the one data storage subsystem in response to the at least one sixth sub-I/O request;

collecting, by the one data storage subsystem that receives the I/O request, the at least one sixth sub-execution result from the at least one sixth data storage subsystem; and returning, by the one data storage subsystem that receives the I/O request, a main execution result comprising the at least one sixth sub-execution result back to the host.

21. The method according to claim 7, further comprising, when it is determined that any of the VCI contained in the at least one first sub-I/O request is not valid, steps of:

informing, by the one data storage subsystem that receives the I/O request, the at least one first data storage subsystem associated with the at least one first sub-I/O request, not to execute the corresponding at least one first sub-I/O request;

inquiring, by the one data storage subsystem that receives the I/O request, information from the master data storage subsystem for the I/O request in order to update the data location information in the OBLB module of the one data storage subsystem;

updating, by the one data storage subsystem that receives the I/O request, the data location information in the OBLB module of the one data storage subsystem according to the inquired information from the master data storage subsystem;

parsing, via the updated data location information in the OBLB module of the one storage subsystem that receives the I/O request, the I/O request into at least one sixth sub-I/O request and dispatching the at least one sixth sub-I/O request to at least one sixth data storage subsystem of the plurality of data storage subsystems, which is associated with the at least one sixth sub-I/O request;

dispatching, by the one data storage subsystem, the I/O request to the master data storage subsystem, when it is determined that the VCI contained in the at least one sixth sub-I/O request is not valid;

parsing, by the master data storage subsystem, the I/O request into at least one seventh sub-I/O request, and dispatching the at least one seventh sub-I/O request to at least one seventh data storage subsystem of the plurality of data storage subsystems, which is associated with the at least one seventh sub-I/O request;

executing, by the at least one seventh data storage subsystem associated with the at least one of seventh sub-I/O request, the at least one seventh sub-I/O request to obtain at least one seventh sub-execution result, and returning the at least one seventh sub-execution result back to the master data storage subsystem;

collecting, by the master data storage subsystem, the at least one seventh sub-execution result from the at least one seventh data storage subsystem;

returning, by the master data storage subsystem, the at least one seventh sub-execution result back to the one data storage subsystem that receives the I/O request from the host; and returning, by the one data storage subsystem that receives the I/O request from the host, a main execution result comprising the at least one seventh sub-execution result back to the host.

22. The method according to claim 21, where that the VCI contained in the at least one first sub-I/O request is not valid is due to a reason selected from a group comprising: a data migration or a snapshot.

23. The method according to claim 20, wherein the information from the master data storage subsystem is location cross reference information.

24. The method according to claim 21, wherein the information from the master data storage subsystem is location cross reference information.

25. The method according to claim 7, wherein the data location information comprises a VV ID (virtual volume identification), a virtual LBA, a size, a RAID ID (RAID identification), a ME ID(media extent identification), a physical LBA, a block size, and the VCI.

26. A storage system architecture for accessing data, the storage system architecture comprising a plurality of data storage subsystems, each of which is coupled to a host for receiving an I/O request issued from the host, the storage system architecture comprising:

a redundant array of independent disks layer (RAID layer) provided in each of the data storage subsystems to map a plurality of physical storage devices (PSDs) into a plurality of media extents (MEs);

a virtualization module provided in at least one of the data storage subsystems to manage the media extents (MEs) to form a virtual pool that comprises one or more virtual volumes (VVs) which are generated and presented to the host;
an on-board load balance (OBLB) module provided in each of the data storage subsystems to offer a data access interface for the host where the on-board load balance (OBLB) module has data location information used to parse the I/O request issued from the host into at least one sub-I/O request; and
a media extent server (ME server) module provided in each of the data storage subsystems to receive the at least one sub-I/O request and to determine the validity of the at least one sub-I/O request;
wherein the I/O request issued from the host is received and parsed by one data storage subsystem of the plurality of data storage subsystems, and the at least one sub-I/O request is sent to and executed by one or more first data storage subsystems which have data targeted by the sub-I/O request; and
wherein a master data storage subsystem of the plurality of data storage subsystems updates the data location information in the OBLB module in each of the plurality of data storage subsystems regularly or on demand.

27. The architecture according to claim 26, wherein the on-board load balance (OBLB) module further has one or more data location tables (DLTs), respectively corresponding to the virtual volumes (VVs), to store the data location information.

28. The architecture according to claim 26, wherein the one of the data storage subsystems having the virtualization module is the master data storage subsystem used for managing the one or more virtual volumes (VVs).

29. The architecture according to claim 26, wherein the virtualization module, the on-board load balance (OBLB) module, and the media extent server (ME server) module are three independent modules.

30. The architecture according to claim 26, wherein the on-board load balance (OBLB) module is integrated with the virtualization module.

31. The architecture according to claim 26, wherein the media extent server (ME server) module is integrated with the virtualization module.

32. The architecture according to claim 26, wherein the media extent server (ME server) module is integrated with the on-board load balance (OBLB) module.

33. The architecture according to claim 26, wherein the virtualization module, the media extent server (ME server) module, and the on-board load balance (OBLB) module are integrated into the same module.

34. The architecture according to claim 26, wherein the media extent server (ME server) module has one or more data location validity tables used to determine whether a validity check information (VCI) contained in the at least one sub-I/O request is valid or not.

35. The architecture according to claim 34, wherein the one or more data location validity tables are respectively corresponding to the one or more virtual volumes (VVs).

36. The architecture according to claim 34, wherein the VCI is a validity check sequence number (VCSN).

37. The architecture according to claim 26, wherein the one data storage subsystem is different from one of the one or more first data storage subsystems.

38. The architecture according to claim 26, wherein the one data storage subsystem is included in the one or more first data storage subsystems.

39. The architecture according to claim 26, wherein an execution result of the I/O request is returned by the one data storage subsystem to the host through collecting at least one sub-execution result of the at least one sub-I/O request from the one or more first data storage subsystems.

40. The method according to claim 2, wherein the data location information comprises a VV ID (virtual volume identification), a virtual LBA, a size, a RAID ID (RAID identification), a ME ID(media extent identification), a physical LBA, and a block size.

41. The method according to claim 5, wherein the data location information comprises a VV ID (virtual volume identification), a virtual LBA, a size, a RAID ID (RAID identification), a ME ID(media extent identification), a physical LBA, and a block size.

* * * * *